United States Patent [19]
Nishihara et al.

[11] Patent Number: 6,093,760
[45] Date of Patent: *Jul. 25, 2000

[54] FLAME RETARDANT FOR STYRENE RESIN AND RESIN COMPOSITION COMPRISING THE SAME

[75] Inventors: Hajime Nishihara, Yokohama; Susumu Tanji, Kawasaki, both of Japan

[73] Assignee: Asahi Kasei Kogyo Kabushiki Kaisha, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/913,559

[22] PCT Filed: Nov. 20, 1995

[86] PCT No.: PCT/JP95/02368

§ 371 Date: Sep. 2, 1997

§ 102(e) Date: Sep. 2, 1997

[87] PCT Pub. No.: WO96/27637

PCT Pub. Date: Sep. 12, 1996

[30] Foreign Application Priority Data

Mar. 3, 1995 [JP] Japan ................................. 7-043769

[51] Int. Cl.⁷ .............................. C08K 5/52; C08K 3/10; C09K 21/00
[52] U.S. Cl. .......................... 524/145; 524/409; 524/434; 524/436; 252/609
[58] Field of Search .................... 252/609; 524/145, 524/409, 434, 436

[56] References Cited

U.S. PATENT DOCUMENTS

| | | | |
|---|---|---|---|
| 3,867,298 | 2/1975 | Malec | 252/49.8 |
| 4,332,714 | 6/1982 | Haaf et al. | 524/141 |
| 4,370,281 | 1/1983 | Clubley et al. | 260/966 |
| 4,645,615 | 2/1987 | Drake | 252/78.5 |
| 5,189,110 | 2/1993 | Ikematu et al. | 525/314 |
| 5,219,907 | 6/1993 | Niessner et al. | 524/140 |
| 5,461,096 | 10/1995 | Bopp et al. | 524/145 |

FOREIGN PATENT DOCUMENTS

| | | |
|---|---|---|
| 1136307 | 11/1982 | Canada . |
| 0324716 | 7/1989 | European Pat. Off. . |
| 550204 | 7/1993 | European Pat. Off. . |
| 611798 | 8/1994 | European Pat. Off. . |
| 4016417 | 11/1991 | Germany . |
| 63-305161 | 12/1988 | Japan . |
| 1-48844 | 2/1989 | Japan . |
| 3-294284 | 12/1991 | Japan . |
| 6-299060 | 10/1994 | Japan . |

*Primary Examiner*—Kriellion Sanders
*Attorney, Agent, or Firm*—Pennie & Edmonds, LLP

[57] ABSTRACT

A low volatility flame retardant for a styrene resin comprising an aromatic phosphate represented by formula (I):

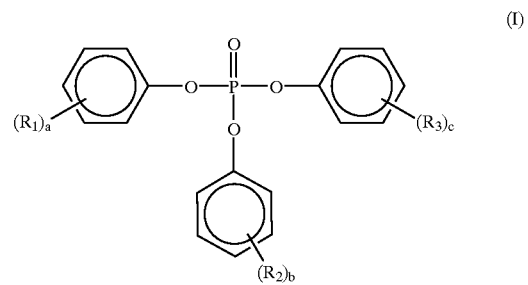

(I) wherein a, b, and c each independently represent an integer of 1–3; and $R_1$, $R_2$, $R_3$ each independently represent a hydrogen atom or a halogen-free alkyl group having from 1 to 30 carbon atoms, which is not an isopropyl group, the total number of carbon atoms in the substituents represented by $R_1$, $R_2$ and $R_3$ being from 12 to 25 on a average in one molecule of said aromatic phosphate.

24 Claims, 12 Drawing Sheets

FLAME RETARDANT FOR STYRENE RESIN AND RESIN COMPOSITION COMPRISING THE SAME

TECHNICAL FIELD

The present invention relates to a low volatility flame retardant for a styrene resin. More particularly, the present invention relates to a low volatility flame retardant for a styrene resin which forms no mold deposit even after a prolonged continuous molding, and a resin composition comprising such a flame retardant.

BACKGROUND ART

Because of its excellent impact resistance in addition to excellent moldability, a styrene resin has found wide application in many fields such as automobile parts, household appliance and OA (office automation) equipment parts. However, the styrene resin has restricted usage due to its flammability.

A known method for flame-retarding the styrene resin is to incorporating a halogen, phosphorus or inorganic flame retardant in the styrene resin. This method can attain flame retardation to some extent. However, the use of a halogen flame retardant disadvantageously causes environmental hazard. The use of a phosphorus or inorganic flame retardant is not satisfactory in the resulting impact strength, melt flowability and heat resistance. Further, a non-volatile organic phosphorus compound can cause staining of mold, i.e., so-called mold deposit during molding, reducing the productivity. The mold staining may be transferred to molded products, causing stress crack thereof. Thus, the industrial use is restricted.

As an approach for improving the volatility there is disclosed a resin composition for laminate comprising a phenolic resin and a specific monomeric alkyl-substituted phosphate (JP-A-1-95149 (The term "JP-A" as used herein means an "unexamined published Japanese patent application"), JP-A-1-242633, JP-A-1-193328). The flame retardants disclosed in these documents apply to thermosetting resins. Thus, these flame retardants are not those for the styrene resin of the present invention.

An antistatic agent comprising a sulfonate and a phosphate such as dinonylphenyl phenylphosphate (JP-A-3-64368) and a lubricant comprising a polyol ester and a triaryl phosphate such as bisnonylphenyl phehylphosphate (U.S. Pat. No. 4,780,229) are disclosed. However, these compounds disclosed in these documents are not flame retardants and differ essentially from the present invention.

There have been known a resin composition comprising a polycarbonate, an ABS resin, a halogenated phosphate and a polytetrafluoroethylene (WO9106598), a resin composition comp-rising a polycarbonate, an AAS resin, a phosphate and a polytetrafluoroethylene (EP534297), a resin composition comprising a polycarbonate, an ABS resin, a phosphate and a polytetrafluoroethylene (DE4309142), a resin composition comprising a polycarbonate, an ABS resin, an aromatic phosphate and a metal salt of aromatic sulfinic acid (JP-A-6-299060), a resin composition comprising a polycarbonate, a polyester polycarbonate, an ABS resin, a phosphate and a polytetrafluoroethylene (EP482451), and a resin composition comprising a polycarbonate, an ABS resin, a phosphate and a polycarbonate-siloxane block copolymer (DE4016417). The phosphate to be incorporated in the foregoing polycarbonate resin composition comprises no phosphate having a specific substituent and thus exhibits a poor balance between non-volatility and flame retardance.

Further, there have been disclosed a flame retardant comprising a phosphate having a phenyl group, an isopropylphenyl group and a $C_{4-2}$ alkyl-substituted phenyl group (JP-A-2-792 corresponding to EP324716), a flame retardant resin comprising a polyphenylene ether, a styrene resin and tris(isopropylphenyl)phosphate (JP-A-1-48844), and a functional fluid composition comprising a polystyrene, t-butylphenyl phenylphosphate and a polyol ester (U.S. Pat. No. 4,645,615). The total number of carbon atoms in the substituents in the phosphate of these documents on the number average falls below 12 based on the definition in the present invention described later. Thus, these compounds are insufficient in non-volatility.

The expression "$C_{x-y}$ alkyl" and the like used herein means "alkyl having from x to y carbon atoms" and the like.

Further, there has been disclosed a flame retardant resin composition comprising a phosphate wherein the substituents $R_1$, $R_2$ and $R_3$ in formula (I) of the present invention described later each represent an aromatic hydrocarbon, such as tris(4-phenylphenyl)phosphate and tris(benzylphenyl)phosphate (DE4016417, EP534297, EP534297). The flame retardant comprising such a phosphate exhibits an excellent heat resistance but a poor melt flowability and flame retardance.

As approaches for flame-retarding the styrene resin there have been disclosed a flame retardant resin composition comprising a polyphenylene ether, a styrene resin, a metal salt of phosphoric acid and a phosphate such as tris(nonylphenyl)phosphate (JP-A-63-305161), a polyphenylene ether resin composition comprising a polyphenylene ether and a high molecular weight polyethylene as essential components, and optionally a phosphate such as tris(nonylphenyl)phosphate (EP550204), and a flame retardant resin composition comprising an aromatic polycarbonate, an ABS resin, an AS resin, a phosphate such as tris(nonylphenyl)phosphate, an aromatic sulfonate and a fibrous reinforcement (JP-A-6-299060). The resin compositions disclosed in the foregoing three documents comprise a phosphate such as tris(nonylphenyl)phosphate and thus exhibit a low flame retardance. These resin compositions exhibit a remarkably reduced heat resistance when a large amount of the foregoing phosphate is incorporated therein in an attempt to enhance the flame retardance thereof. Further, these documents do not disclose the fact that the combination of tris(nonylphenyl)phosphate, bis(nonylphenyl)phenylphosphate and nonylphenyl diphenylphosphate in predetermined proportions provides remarkable improvements in the balance of flame retardance, melt flowability, heat resistance, impact strength and water-resistant gloss retention.

As a further approach for flame-retarding the styrene resin there has been disclosed a process for the preparation of a triester phosphate comprising a hydrocarbon group selected from the group consisting of $C_{4-22}$ alkyl group, $C_{12-22}$ alkenyl group, phenyl group and $C_{7-15}$ alkylphenyl group (alkyl moiety has from 1 to 9 carbon atoms) (JP-A-3-294284). The document not only differs from the present invention in that it relates to a preparation process but also neither discloses nor suggests the fact that the use of a specific substituent-containing monomeric aromatic phosphate provides a remarkable improvement in the continuous moldability (non-volatility) while keeping a styrene resin in particular flame retardant.

A monomeric phosphate comprising a plurality of isopropyl groups and a flame retardant composition comprising the same are disclosed (GB2027712 corresponding to US4370281 and JP-B-63-61313) (The term "JP-B" as used herein means an "examined Japanese patent publication") The total number of carbon atoms in the substituents in the phosphate of these documents is as large as from 6 to 47 based on the definition in the present invention. Further, these documents do not disclose the fact that only the substituent having a specific total number of carbon atoms on the number average can give a sufficient balance between flame retardance and non-volatility. Moreover, these documents do not refer to the fact that the incorporation of the specific substituent of the present invention can provide an enhancement of flame retardance, particularly dripping flame retardance. Further, the flame retardant according to these patents comprise a plurality of isopropyl group as substituents and thus not only exhibits too high a viscosity to be easily handled but also exhibits too low a light resistance to be put into practical use.

DISCLOSURE OF THE INVENTION

An object of the present invention is to provide a flame retardant for styrene resin free from the foregoing problems, i.e., which causes no mold deposit even after a prolonged continuous molding (low volatility), and a resin composition comprising such a flame retardant.

The present inventors have made extensive studies of technique for inhibiting mold deposit as an index of non-volatility. As a result, it has been found that the use of an aromatic phosphate containing a specific substituent as a flame retardant surprisingly provides a drastic enhancement of flame retardance of a styrene resin while inhibiting mold deposit. Thus, the present invention has been worked out.

The present invention relates to, as a main aspect, a low volatility flame retardant for styrene resin comprising an aromatic phosphate represented by formula (I):

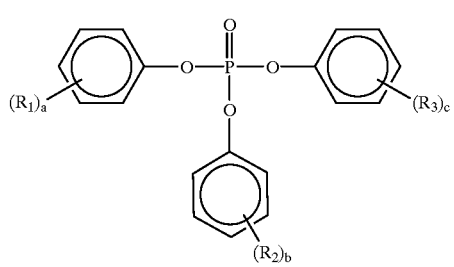

wherein a, b, and c each independently represent an integer of from 1 to 3; and $R_1$, $R_2$, and $R_3$ each independently represent a hydrogen atom or a halogen-free alkyl group having from 1 to 30 carbon atoms, which is not an isopropyl group, the total number of carbon atoms in the substituents represented by $R_1$, $R_2$ and $R_3$ being from 12 to 25 on an average in one molecule of the aromatic phosphate, provided that when the flame retardant comprises a plurality of aromatic phosphates having different substituents, the total number of carbon atoms in the substituents $R_1$, $R_2$ and $R_3$ of the flame retardant is represented by a number average in the whole of the flame retardant, which is the sum of the products of the weight fraction of respective aromatic phosphate and the total number of carbon atoms in the substituents in respective aromatic phosphate.

The present invention also relates to a resin composition comprising 100 parts by weight of a styrene resin and from 1 to 50 parts by weight of the flame retardant of the present invention.

BEST MODE FOR PRACTICING INVENTION

Figure 1:
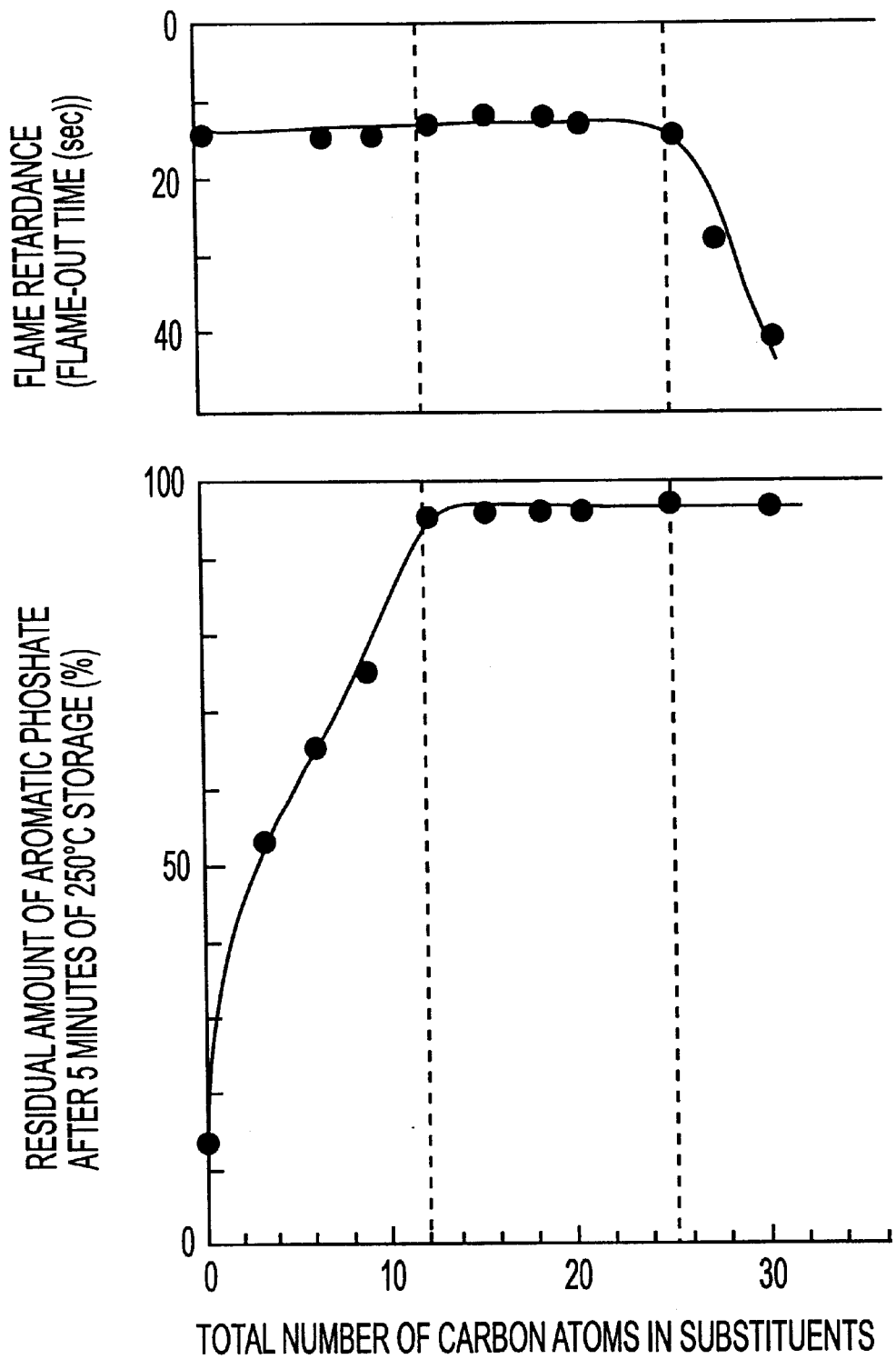
FIG. 1 illustrates the relationship of the total number of carbon atoms in the substituents of the monomeric aromatic phosphate on the number average with the remaining amount of the monomeric aromatic phosphate after 5 minutes of storage at 250° C. determined by thermogravimetric analysis test (TGA method) and the flame retardance (flame-out time: second) of the molded product of resin composition set forth in Table 2.

The low volatility flame retardant (Component A) for styrene resin of the present invention comprises a monomeric aromatic phosphate having a specific substituent.

It is important that the foregoing monomeric aromatic phosphate be a monomeric type rather than a oligomeric product. Since the monomeric aromatic phosphate is in the form of a monomer, it can efficiently evaporate during the initial stage of combustion. In particular, in the case of a dripping flame retardant styrene resin, the monomeric aromatic phosphate, because of being a monomer, accelerates the plasticity of the styrene resin to enhance the dripping properties thereof during combustion.

The substituents $R_1$, $R_2$ and $R_3$ in the monomeric aromatic phosphate each represent a hydrogen atom or a $C_{1-30}$ alkyl group. It is important that the total number of carbon atoms in the substituents $R_1$, $R_2$ and $R_3$ be from 12 to 25 on the number average as the whole compound. If the number-average total number of carbon atoms falls below 12, an excellent flame retardance can be obtained but a high volatility is given. If the number-average total number of carbon atoms exceeds 25, a reduced flame retardance is given.

The aromatic phosphate satisfying the foregoing requirements exhibits a weight loss of from 0 to 10% by weight at a temperature of 300° C. and a weight loss of from 30 to 100% by weight, preferably from 50 to 100% by weight at a temperature of 400° C. in a heating test in nitrogen (temperature rising rate: 40° C./min.). In other words, since the weight loss at 300° C. is not more than 10% by weight, no mold deposit occurs during molding of styrene resin. Thus, the present invention also relates to a low volatility aromatic phosphate flame retardant, which exhibits a weight loss of from 0 to 10% by weight at a temperature of 300° C. and from 50 to 100% by weight at a temperature of 400° C., in a heating test in nitrogen, with a temperature rising rate of 40° C./min. Since the aromatic phosphate suddenly evaporate at a temperature of 400° C. during the initial stage of combustion, the resulting gas phase effect develops flame retardance. It was further found that since the incorporation of a specific substituent provides an enhancement of compatibility with styrene resin, the dripping properties of the resin can be remarkably accelerated. Thus, the present invention has been worked out.

The monomeric aromatic phosphate constituting the low volatility flame retardant (Component A) for styrene resin of the present invention is represented by formula (I):

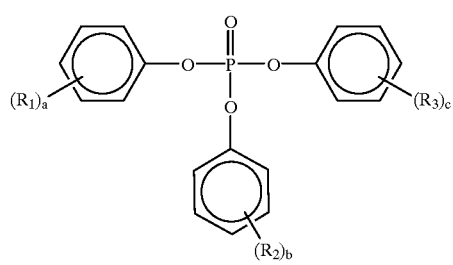

(I)

wherein a, b, and c each independently represent an integer of from 1 to 3; and $R_1$, $R_2$, and $R_3$ each independently represent a hydrogen atom or a halogen-free alkyl group having from 1 to 30 carbon atoms, which is not an isopropyl group, the total number of carbon atoms in the substituents represented by $R_1$, $R_2$ and $R_3$ being from 12 to 25 on an average in one molecule of the aromatic phosphate, provided that when the flame retardant comprises a plurality of aromatic phosphates having different substituents, the total number of carbon atoms in the substituents $R_1$, $R_2$ and $R_3$ of the flame retardant is represented by a number average in the whole of the flame retardant, which is the sum of the products of the weight fraction of respective aromatic phosphate and the total number of carbon atoms in the substituents in respective aromatic phosphate.

In the monomeric aromatic phosphate of the present invention, the total number of carbon atoms in the substituents $R_1$, $R_2$ and $R_3$ is preferably from 14 to 22, more preferably from 16 to 20, most preferably from 17 to 19, on the number average.

Specific examples of these substituents include a nonyl group, a butyl group such as t-butyl, a t-amyl group, a hexyl group, a cyclohexyl group, a heptyl group, an octyl group, a decyl group, an undecyl group, a dodecyl group, a tridecyl group, a tetradecyl group, a pentadecyl group, a hexadecyl group, a heptadecyl group, an octadecyl group, a nonadecyl group, and an octadodecyl group. One or a plurality of substituents may substitute for one aromatic ring on any position of ortho, meta or para, preferably the para position. It is most preferred that the total number of carbon atoms in the alkyl group which substitutes on one monomeric phosphate be from 12 to 25. A monomeric phosphate having a plurality of aromatic rings substituted by one alkyl group has better heat resistance and water resistance than a monomeric phosphate having only one aromatic ring substituted by only one long-chain alkyl group. For example, even if the total number of carbon atoms in the alkyl group as a substituent is 18, bis(nonylphenyl) phenylphosphate has a higher heat resistance and is more preferred than octadecylphenyl dinhenylphosphate.

Particularly preferred among the flame retardants of the present invention is a monomeric phosphate wherein at least one of $R_1$, $R_2$ and $R_3$ is a nonyl group. The most preferred among the flame retardants of the present invention is bis(nonylphenyl)phenylphosphate wherein $R_1$ and $R_2$ each are a nonyl group and $R_3$ is a hydrogen atom. These monomeric phosphates can exert a great effect particularly when incorporated in the flame retardant in an amount-of not less than 50% by weight. Further, these monomeric phosphates exhibit excellent flame dripping properties. The monomeric phosphates are extremely excellent as V-2 rank flame retardant in accordance with the flame retardance standard based on UL-94. This fact has never been known heretofore.

From the standpoint of non-volatility, it is necessary that the total number of carbon atoms in the substituents satisfy the requirements of the present invention. If the content of the compounds wherein the total number of carbon atoms in the substituents falls below 12 is not more than 20% by weight, a higher non-volatility can be exerted.

From the standpoint of thermal stability, particularly thermal discoloration resistance, of the flame retardant, it is preferred that the acid value as defined in JIS-K6751 as an index of remaining acidic substance be not more than 1 mgKOH/g, more preferably not more than 0.5 mgKOH/g, and/or the alkylphenol content be nor more than 1% by weight, more preferably not more than 0.5% by weight. It is further preferred that the total content of aluminum, magnesium, sodium and antimony be not more than 1,000 ppm by weight. It is also preferred to incorporate a hindered phenol antioxidant in the flame retardant in an amount of from 1 to 1,000 ppm by weight, since the thermal stability can be drastically enhanced.

From the standpoint of light resistance, it is preferred that the substituents $R_1$, $R_2$ and $R_3$ be an alkyl group which is little branched, particularly a linear alkyl group or an alkyl group having only one branch, rather than an aryl group. Even if branched at one position, an alkyl group having not more than 5 carbon atoms exhibits a poor light resistance. A monomeric phosphate having an isopropyl group exhibits an extremely poor light resistance.

Moreover, the number of substituents on one aromatic ring in the aromatic phosphate is preferably one. A monomeric phosphate having a plurality of substituents on one aromatic ring exhibits a high viscosity. This viscosity rises with the number of substituents on one aromatic ring. If the viscosity of the monomeric phosphate is raised, the compound not only suffers a handling problem but also can hardly be purified, causing the foregoing impurities to be left and hence deteriorating the light resistance and thermal discoloration resistance thereof.

The most preferred combination of monomeric aromatic phosphates of the present invention comprises nonylphenyl diphenylphosphate (NPDP, represented by formula (I) where $R_1$ and $R_2$ each represent a hydrogen atom and $R_3$ represents a nonyl group), bis(nonylphenyl) phenylphosphate (BNPP, represented by formula (I) where $R_1$ represents a hydrogen atom and $R_2$ and $R_3$ each represent a nonyl group) and tris(nonylphenyl)phosphate (TNPP, represented by formula (I) where $R_1$, $R_2$, and $R_3$ each represent a nonly group), wherein the total number of the substituents $R_1$, $R_2$ and $R_3$ is from 12 to 25, preferably from 14 to 22, more preferably from 16 to 20, most preferably from 17 to 19 on the number average. In order to satisfy the foregoing number average of the total number of carbon atoms, NPDP content is generally from 1 to 80% by weight, preferably from 1 to 50% by weight, more preferably from 1 to 30% by weight, most preferably from 1 to 10% by weight, BNPP content is generally from 1 to 98% by weight, preferably from 20 to 90% by weight, more preferably from 30 to 80% by weight, most preferably from 40 to 80% by weight, and TNPP content is generally from 1 to 98% by weight, preferably from 1 to 70% by weight, more preferably from 5 to 60% by weight, most preferably from 5 to 50% by weight. The flame retardant having such a combination is excellent particularly in the balance of flame retardance, melt flowability, heat resistance, impact strength, water-resistant gloss retention, and surface hardness of the molded product thus obtained. The mixing of monomeric aromatic phosphates having different numbers of substituted nonyl groups in predetermined amounts can exert a specific effect. NPDP exerts a high plasticizing effect. NPDP not only acts as a melt flowability improver but also exerts a very high effect of enhancing flame retardance. TNPP not only exerts a high effect of providing non-volatility and heat resistance but also exhibits an extremely excellent water-resistant gloss retention. BNPP can well balance the foregoing properties. The compounding of the three components in predetermined amounts can provide well-balanced properties which cannot be obtained by single use of one of these components. In particular, the enhancement of water-resistant gloss retention and surface hardness of molded products cannot be expected from the conventional knowledge.

The preparation of the monomeric aromatic phosphate of the present invention can be accomplished by a known method disclosed, e.g., in JP-A-1-95149 and JP-A-3-294284. Examples of the known method include a method which comprises the reaction of an alkylphenol with phosphorus oxychloride in the presence of aluminum chloride anhydride as a catalyst under heating, and a method which comprises the oxidation of triester phosphite with oxygen to convert it to the corresponding aromatic phosphate.

In the case where the low volatility flame retardant for styrene resin of the present invention is added to a styrene resin to prepare a resin composition, it is preferred that the flame retardant be incorporated in the resin composition in an amount of from 1 to 50 parts by weight, more preferably from 1 to 20 parts by weight, most preferably from 3 to 8 parts by weight, per 100 parts by weight of the styrene resin.

The styrene resin (Component B) in which the low volatility flame retardant for styrene resin of the present invention can be incorporated is a rubber-modified styrene resin and/or an unmodified styrene resin and is not specifically limited so far as it can be compatible or homogeneously dispersed with Component A. Preferably, a rubber-modified styrene resin or a mixture of a rubber-modified styrene resin and an unmodified styrene resin is used. The rubber-modified styrene resin is a polymer comprising a matrix of vinyl aromatic polymer having a particulate rubber-like polymer dispersed therein and can be obtained by the known bulk polymerization, bulk suspension polymerization, solution polymerization or emulsion polymerization of a monomer mixture comprising an aromatic vinyl monomer and optionally a vinyl monomer copolymerizable therewith in the presence of a rubber-like polymer.

Examples of such a resin include an impact-resistant polystyrene, an ABS resin (acrylonitrile-butadiene-styrene copolymer), an AAS resin (acrylonitrile-acryl rubber-styrene copolymer), and an AES resin (acrylonitrile-ethylenepropylene rubber-styrene copolymer).

The foregoing rubber-like polymer should exhibit a glass transition temperature (Tg) of not higher than −30° C. If the glass transition temperature exceeds −30° C., the resulting composition exhibits a reduced impact resistance.

Examples of such a rubber-like polymer include diene rubber such as (polybutadiene, poly(styrene-butadiene) and poly(acrylonitrile-butadiene)), saturated rubber obtained by hydrogenation of the foregoing diene rubber, isoprene rubber, chloroprene rubber, acrylic rubber (such as poly (butyl acrylate)), and an ethylene-propylene-diene monomer terpolymer (EPDM). Particularly preferred among these rubber-like polymers is diene rubber.

Examples of the aromatic vinyl monomer as an essential component to be incorporated in the graft-polymerizable monomer mixture which undergoes polymerization in the presence of the foregoing rubber-like polymer include styrene, α-methylstyrene, and paramethylstyrene. Most preferred among these aromatic vinyl monomers is styrene. Styrene can be copolymerized as a main component with the foregoing other aromatic vinyl monomers.

As the components constituting the rubber-modified styrene resin there may be incorporated one or more monomer components copolymerizable with the aromatic vinyl monomer as necessary. If the oil resistance of the composition needs to be enhanced, an unsaturated nitrile monomer such as acrylonitrile and methacrylonitrile may be used.

If it is necessary to reduce the melt viscosity during blending, an acrylate having a $C_{1-8}$ alkyl group may be used. Further, if it is necessary to further enhance the heat resistance of the resin composition, a monomer such as α-methylstyrene, acrylic acid, methacrylic acid, maleic anhydride and N-substituted maleimide may be copolymerized. Among these, α-methylstyrene and butyl acrylate are excellent in providing dripping flame retardance. The content of the vinyl monomer copolymerizable with the foregoing vinyl aromatic monomer in the monomer mixture is generally from 0 to 40% by weight.

The content of the rubber-like polymer in the rubber-modified styrene resin is preferably from 5 to 80% by weight, particularly from 10 to 50% by weight. The content of the graft-copolymerizable monomer mixture in the rubber-modified styrene resin is preferably from 20 to 95% by weight, more preferably from 50 to 90% by weight. Within this range, the resin composition exhibits an improved balance between impact resistance and rigidity. Further, the diameter of the particulate rubber in the styrene polymer is preferably from 0.1 to 5.0 μm, particularly from 0.2 to 3.0 μm, most preferably from 1.0 to 2.0 μm. Within this range, the impact resistance of the rubber-modified styrene resin is enhanced.

The reduced viscosity ηSP/C of the resin moiety as a measure of the molecular weight of the rubber-modified styrene resin is preferably from 0.30 to 0.80 dl/g, more preferably from 0.40 to 0.60 dl/g (as measured with 0.5 g/dl at a temperature of 30° C. in a toluene solution if the matrix resin is a polystyrene or in methyl ethyl ketone if the matrix resin is an unsaturated nitrile-aromatic vinyl copolymer). As methods for satisfying the foregoing requirements for the reduced viscosity ηSP/C of the rubber-modified styrene resin, there may be used the adjustment of amount of polymerization initiator, polymerization temperature, amount of chain transfer agent, etc.

In general, a rubber-modified styrene resin having a reduced viscosity ηSP/C of from 0.40 to 0.60 dl/g is excellent in melt flowability and flame retardance, particularly dripping flame retardance, but exhibits a poor impact strength. The inventors conducted high degree grafting of a vinyl aromatic monomer on a conjugated diene polymer the most of remaining unsaturated bonds of which are 1,4-bonds in the presence of an organic peroxide having a high hydrogen abstracting capacity. As a result, a rubber-modified styrene resin exhibiting high impact strength and rigidity having a specific particle diameter distribution in the dispersed phase of conjugated diene polymer was successfully prepared.

In some detail, a polymerization stock solution which comprises from 60 to 96% by weight of styrene and optionally other vinyl aromatic monomers copolymerizable with styrene, from 4 to 15% by weight of a conjugated diene polymer 95% or more of the remaining unsaturated bonds of which are 1,4-structures or partially hydrogenated conjugated diene polymer, and an organic peroxide having a hydrogen abstracting capacity ε of not less than 35 in an amount of from 0.0002 to 0.0006 equivalents to the foregoing vinyl aromatic monomer such as styrene, is continuously supplied into a multi-stage polymerization apparatus in such a manner that the solution resides in a plug f-low type polymerization reactor until the percent conversion of the vinyl aromatic monomer reaches 30% while the polymerization temperature and solution supplying rate are being controlled such that the average polymerization rate until the percent conversion of the vinyl aromatic monomer reaches at least 30% is from 10 to 15%/hr, whereby the desired rubber-modified styrene resin can be prepared. The term "hydrogen abstracting capacity ε" as used herein is meant to indicate the quotient obtained by dividing the number of mols of n-pentadecane dimer produced by heating an about 1 mmol/l n-pentadecane solution of the foregoing organic peroxide to the temperature at which the half-life period is 15 minutes for 150 minutes by the number of mols of the organic peroxide, and then multiplied by 100.

The rubber-modified styrene resin thus obtained comprises small size particles having a diameter of from 0.1 to 0.4 μm and large size particles having a diameter of from 1.0 to 8.0 μm in the dispersed phase. The proportion of the small size particles and large size particles in all the particles are from 10 to 50% and from 50 to 90%, respectively, as calculated in terms of area. The small size particle comprises a cell structure in a proportion of not less than 50% as calculated in terms of area. The large size particle has a structure such that its outermost periphery is closed and any one of maze, reel and fiber bundle configurations is incorporated therein, in a proportion of not less than 50% as calculated in terms of area.

The particulate rubber constituting the rubber-modified styrene resin preferably comprises a small size particulate rubber having a weight-average particle diameter of from 0.1 to 0.9 μm and a large size particulate rubber having a weight-average particle diameter of from 1.0 to 3.0 μm from the standpoint of balance of external appearance (gloss), impact strength and rigidity of the molded product obtained.

If the weight-average particle diameter of the small size particulate rubber falls below 0.1 μm, the resulting molded product tends to exhibit a reduced impact strength and flame retardance. If the weight-average particle diameter of the small size particulate rubber exceeds 0.9 μm, the resulting molded product tends to exhibit a reduced rigidity and a deteriorated external appearance (gloss). Further, if the weight-average particle diameter of the large size particulate rubber falls below 1.0 μm, the resulting molded product tends to exhibit a reduced impact strength and flame retardance. If the weight-average particle diameter of the large size particulate rubber exceeds 3.0 μm, the resulting molded product tends to exhibit a reduced impact strength and rigidity and a deteriorated external appearance (gloss).

The foregoing small size particulate rubber has a capsule structure made of a block copolymer of styrene and 1,3-butadiene (particle structure having only one occlusion in one rubber particle). The foregoing large size particulate rubber has a "salami" structure or a multidomain structure made of, e.g., polybutadiene (particle structure having a plurality of occlusions in one rubber particle). The proportion of the former in the rubber-modified styrene resin is preferably from 20 to 80% by weight, and the proportion of the latter in the rubber-modified styrene resin is preferably from 20 to 80% by weight.

The foregoing block copolymer of styrene and 1,3-butadiene preferably has a butadiene content of from 15 to 35% by weight. It is a block copolymer structurally represented by SBSB or SBS (in which S represents styrene polymer block and B represents polymer block mainly composed of 1,3-butadiene or butadiene).

The rubber-modified styrene resin comprising large size particulate rubber and small size particulate rubber can be prepared by separately preparing a rubber-modified styrene resin containing a small size particulate rubber and a rubber-modified styrene resin containing a large size particulate rubber, and then blending these rubber-modified styrene resins in an extruder, or by mixing the two rubber-modified styrene resins in a polymerization reactor. In some detail, a bulk polymerization process is preferably employed which comprises supplying a homogeneous polymerization stock solution comprising a rubber-like polymer, a monomer mixture and a polymerization solvent into an agitated continuous multi-stage bulk polymerization reactor where it is continuously subjected to polymerization and devolatilization In the case of preparation by bulk polymerization process, the particle diameter of the particulate rubber is controlled by the number of revolutions for agitation. The more the number of revolutions is, the smaller is the particle diameter. The less the number of revolutions is, the larger is the particle diameter.

The low volatility flame retardant for styrene resin of the present invention can be incorporated in a resin composition comprising a styrene resin blended with other thermoplastic resins. For example, a polyphenylene ether resin, a polyamide resin, a polyester resin, a polyphenylene sulfide resin, a polycarbonate resin or a polymethacrylate resin may be used singly, and two or more of these resins may be used in admixture. Preferred examples of the thermoplastic resin which can be incorporated in the styrene resin include a polyphenylene ether thermoplastic resin and a polycarbonate thermoplastic resin. The content of the other thermoplastic resin in the mixture of the styrene resin and the other thermoplastic resin is preferably from 0 to 90% by weight, more preferably from 0 to 70% by weight, most preferably from 3 to 40% by weight.

The polyphenylene ether (Component C) which can be incorporated in the styrene resin is a homopolymer and/or copolymer comprising a repeating unit represented by formula (II):

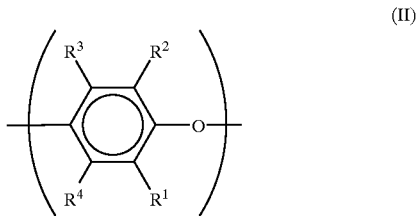

wherein $R^1$, $R^2$, $R^3$ and $R^4$ each are selected from the group consisting of a hydrogen atom, a hydrocarbon group and a substituted hydrocarbon group, and may be the same or different.

Specific preferred examples of the polyphenylene ether include poly(2,6-dimethyl-1,4-phenyleneether), and copolymer of 2,6-dimethylphenol and 2,3,6-trimethylphenol. Particularly preferred among these polyphenylene ethers is poly(2,6-dimethyl-1,4-phenyleneether). The process for the preparation of such a polyphenylene ether is not specifically limited. For example, 2,6-xylenol can be subjected to oxidative polymerization in the presence of a complex of cuprous salt with amine as a catalyst as described in U.S. Pat. No. 3,306,874 to easily prepare such a polyphenylene ether. Besides this process, processes as described in U.S. Pat. Nos. 3,306,875, 3,257,357, and 3,257,358, JP-B-52-17880, and JP-A-50-51197 can be employed to easily prepare such a polyphenylene ether.

The reduced viscosity ηSP/C of the foregoing polyphenylene ether to be used in the present invention is preferably from 0.20 to 0.70 dl/g, more preferably from 0.30 to 0.60 dl/g (as measured with 0.5 g/dl in a chloroform solution at a temperature of 30° C.) from the standpoint of melt flowability and flame retardance, particularly dripping flame retardance. Examples of methods for satisfying the foregoing requirements for the reduced viscosity ηSP/C of the polyphenylene ether include control of the amount of the catalyst to be used in the preparation of the polyphenylene ether.

The amount of the polyphenylene ether to be used is preferably from 1 to 40 parts by weight, more preferably from 1 to 10 parts by weight, most preferably from 3 to 8 parts by weight, per 100 parts by weight of the styrene resin used.

The aromatic polycarbonate as the thermoplastic resin which can be incorporated in the styrene resin can be obtained by a phosgene process in which phosgene is bubbled into an aromatic divalent phenol compound in the presence of a caustic alkali and a solvent or by an ester interchange process in which an aromatic divalent phenol compound and diethyl carbonate are subjected to ester interchange in the presence of a catalyst. The preferred viscosity-average molecular weight of the aromatic homopolycarbonate or copolycarbonate thus obtained is from 10,000 to 100,000.

Examples of the foregoing divalent phenol compound include 2,2'-bis(4-hydroxyphenyl)propane, 2,2'-bis(4-hydroxy-3,5-dimethylphenyl)propane, bis(4-hydroxyphenyl)methane, 1,1'-bis(4-hydroxyphenyl)ethane, 2,2'-bis(4-hydroxyphenyl)butane, 2,2'-bis(4-hydroxy-3,5-diphenyl)butane, 2,2'-bis(4-hydroxy-3,5-dipropylphenyl)propane, 1,1'-bis(4-hydroxyphenyl) cyclohexane, and 1-phenyl-1,1'-bis(4-hydroxyphenyl)ethane. Particularly preferred among these divalent phenol compounds is 2,2'-bis (4-hydroxyphenyl) propane (bisphenol A). The divalent phenol compounds of the present invention may be used singly or in combination.

The amount of the polycarbonate to be used is preferably from 1 to 40 parts by weight, more preferably from 1 to 10 parts by weight, most preferably from 3 to 7 parts by weight, per 100 parts by weight of the styrene resin used.

The low volatility flame retardant for styrene resin of the present invention may be used with a polyorganopolysiloxane (Component D) as necessary depending on the kind of the resin composition to relax the orientation of the styrene resin. If a high shearing force is used during molding, the resulting molded product has orientation left therein, inhibiting the dripping on burning. Thus, the incorporation of a polyorganopolysiloxane having a specific kinematic viscosity renders the molecular chain slippery, relaxing the orientation of the resin composition. As a result, the dripping properties of the molded product of resin composition can be improved. The kinematic viscosity (25° C.) of the foregoing polyorganosiloxane is preferably from 30 to 20,000 CS, more preferably from 40 to 1,000 CS, most preferably from 50 to 100 CS. If the kinematic viscosity of the foregoing polyorganosiloxane falls below 30 CS, the polyorganosiloxane exhibits a high volatility and thus causes mold stain. If the kinematic viscosity of the foregoing polyorganosiloxane exceeds 20,000 CS, the resulting effect of relaxing the orientation of the styrene resin is reduced.

As the polyorganosiloxane as Component D, a polydimethylsiloxane, i.e., so-called silicone oil, is preferably used.

The amount of the polyorganosiloxane to be used is preferably from 0.01 to 10 parts by weight, more preferably from 0.1 to 5 parts by weight, most preferably from 0.3 to 3 parts by weight, per 100 parts by weight of the styrene resin used.

The low volatility flame retardant for styrene resin of the present invention may be used with a flame retardant (Component E) other than the flame retardant of the present invention (Component A), such as an organic phosphorus compound, red phosphorus, an inorganic phosphorus salt, an inorganic flame retardant or the like, as necessary depending on the kind of the resin composition.

The amount of Component E to be used is preferably from 1 to 40 parts by weight, more preferably from 1 to 20 parts by weight, most preferably from 5 to 10 parts by weight, per 100 parts by weight of the styrene resin used.

Examples of the organic phosphorus compound as Component E include phosphine, phosphine oxide, biphosphine, phosphonium salt, phosphinate, phosphate, and phosphite. Specific examples of these organic phosphorus compounds include methyl neopentyl phosphite, pentaerythritol diethyl diphosphite, methyl neopentyl phosphonate, phenyl neopentyl phosphate, pentaerythritol diphenyl diphosphate, dicyclopentyl hypodisphosphate, dineopentyl hypophosphite, phenylpyrocatechol phosphite, ethylpyrocatechol phosphate, and dipyrocatechol hypodiphosphate.

An oligomeric aromatic phosphate such as tetraphenyl bisphenol A polyphosphate may be blended in the resin composition to an extent such that the flame retardance thereof cannot be affected.

Examples of the red phosphorus which can be used as Component E include ordinary red phosphorus. Other examples of the red phosphorus include red phosphorus coated with a film of metal hydroxide selected from the group consisting of aluminum hydroxide, magnesium hydroxide, zinc hydroxide and titanium hydroxide; red phosphorus coated with a film made of metal hydroxide selected from the group consisting of aluminum hydroxide, magnesium hydroxide, zinc hydroxide and titanium hydroxide and a thermoplastic resin; and red phosphorus coated sequentially with a film of metal hydroxide selected from the group consisting of aluminum hydroxide, magnesium hydroxide, zinc hydroxide and titanium hydroxide and with a film of thermoplastic resin on the film of metal hydroxide.

A representative example of the inorganic phosphorus salt which can be used as Component E include ammonium polyphosphate.

Examples of the inorganic flame retardant which can be used as Component E include hydrate of inorganic metal compound such as hydrate of aluminum hydroxide, magnesium hydroxide, dolomite, hydrotalcite, calcium hydroxide, barium hydroxide, basic magnesium carbonate, zirconium hydroxide and tin hydroxide, zinc borate, zinc metaborate, barium metaborate, zinc carbonate, magnesium carbonate, calcium carbonate, and barium carbonate. These inorganic flame retardants may be used singly or in combination.

Particularly preferred among these inorganic flame retardants are those selected from the group consisting of magnesium hydroxide, aluminum hydroxide, basic magnesium carbonate and hydrotalcite, which can exert a good flame retarding effect and are economically advantageous.

The low volatility flame retardant for styrene resin of the present invention may be used with one or more auxiliary flame retardants (Component F) selected from the group consisting of a triazine skeleton-containing compound, a novolak resin, a metal-containing compound, a silicone resin, a vinyl group-containing silicone oil, silica, aramide fibers, a fluorine resin and polyacrylonitrile fibers as necessary depending on the kind of the resin composition.

The amount of Component F to be used is preferably from 0.001 to 40 parts by weight, more preferably from 1 to 20 parts by weight, most preferably from 5 to 10 parts by weight, per 100 parts by weight of the styrene resin used.

The triazine skeleton-containing compound which can De used as Component F is a component for enhancing the flame retardance as an aid for the phosphorus flame retardant. Specific examples of the triazine skeleton-containing compound include melamine, melam, melem, mellon (product of three molecule deammonization of three melem molecules at a temperature of not lower than 600° C.), malamine cyanurate, melamine phosphate, succinoguanamine, adipoguanamine, methylglutaloguanamine, melamine resin, and BT resin. Particularly preferred among these triazine skeleton-containing compounds is melamine cyanurate from the standpoint of non-volatility. The structural formulae of melam, melem, mellon, melamine cyanurate, melamine phosphate, succinoguanamine, melamine resin, and BT resin are shown below.

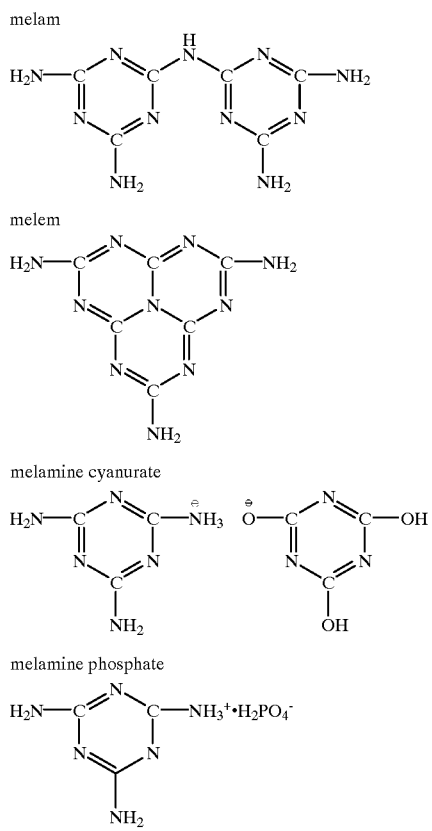

succinoquanamine melamine resin

BT resin

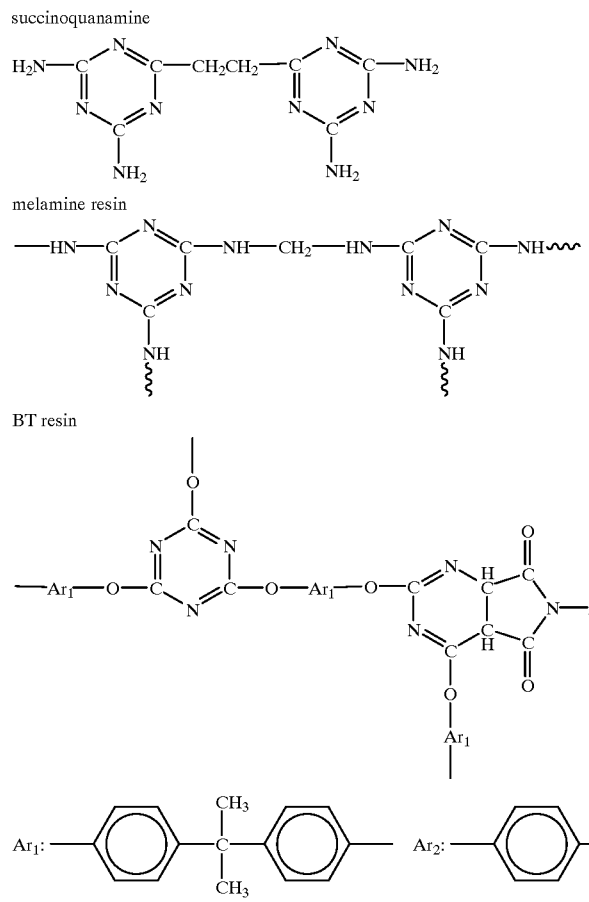

The novolak resin as Component F is an auxiliary flame retardant. It also serves as a melt flowability and heat resistance improver when used in combination with a hydroxyl group-containing aromatic phosphate. This resin is a thermoplastic resin obtained by the condensation of a phenol and an aldehyde in the presence of an acid catalyst such as sulfuric acid and hydrochloric acid. Its preparation process is described, e.g., in "High Molecular Experiment 5 (Polycondensation and Polyaddition)", pp. 437–455, Kyoritsu Shuppan.

An example of the process for the preparation of a novolak resin is shown below.

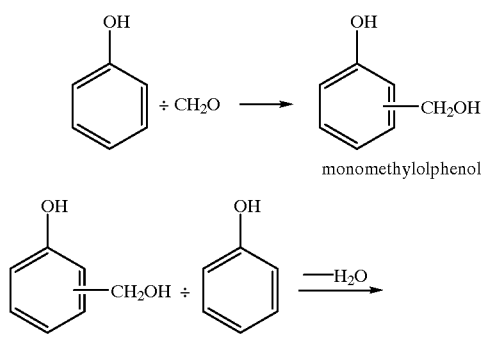

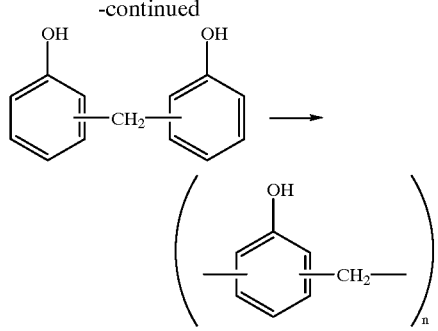

Examples of the foregoing phenols include phenol, o-cresol, m-cresol, p-cresol, 2,5-dimethylphenol, 3,5-dimethylphenol, 2,3,5-trimethylphenol, 3,4,5-trimethylphenol, p-t-butylphenol, p-n-octylphenol, p-stearylphenol, p-phenylphenol, p-(2-phenylethyl)phenol, o-isopropylphenol, 0-isopropylphenol, m-isopropylphenol, p-methoxyphenol, p-phenoxyphenol, pyrocatechol, resoricinol, hydroquinone, salicylaldehyde, salicylic acid, p-hydroxybenzoic acid, methyl p-hydroxybenzoate, p-cyanophenol, o-cyanophenol, p-hydroxybenzenesulfonic acid, p-hydroxybenzenesulfonamide, cyclohexyl p-hydroxybenzenesulfonate, 4-hydroxyphenylphenylphosphinic acid, methyl 4-hydroxyphenylphenylphosphinate, 4-hydroxyphenylphosphonic acid, ethyl 4-hydroxyphenylphosphonate, and diphenyl 4-hydroxyphenylphosphonate.

Examples of the foregoing aldehydes include formaldehyde, acetaldehyde, n-propanal, n-butanal, isopropanal, isobutylaldehyde, 3-methyl-n-butanal, benzaldehyde, p-tollylaldehyde, and 2-phenylacetaldehyde.

The metal-containing compound which can be used as Component F is a metal oxide and/or metal powder. Examples of the metal oxide include aluminum oxide, iron oxide, titanium oxide, manganese oxide, magnesium oxide, zirconium oxide, zinc oxide, molybdenum oxide, cobalt oxide, bismuth oxide, chromium oxide, tin oxide, antimony oxide, nickel oxide, copper oxide, tungsten oxide, etc., singly or in composite of two or more of them. Examples of the metal powder include aluminum, iron, titanium, manganese, zinc, molybdenum, cobalt, bismuth, chromium, nickel, copper, tungsten, tin, antimony, etc., singly or in composite of two or more of them (alloy).

The silicone resin which can be used as Component F is a silicone resin having a three-dimensional network composed of $SiO_2$, $RSiO_{3/2}$, $R_2SiO$ and $R_3SiO_{1/2}$ as structural units wherein R represents an alkyl group such as methyl, ethyl and propyl, an aromatic group such as phenyl and benzyl, or a substituent comprising the above alkyl or aromatic group having a vinyl group incorporated therein. In particular, a vinyl group-containing silicone resin is preferred. Such a silicone resin can be obtained by the co-hydrolysis of an organohalosilane corresponding to the foregoing structural unit.

The vinyl group-containing silicone oil which can be used as Component F is a polydiorganosiloxane made of a chemical bond unit represented by the following formula:

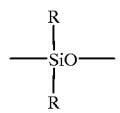

wherein R represents one or more kinds of substituents selected from the group consisting of a $C_{1-8}$ alkyl group, a $C_{6-13}$ aryl group and a vinyl-containing groups represented by the following formulae. Particularly preferred among these substituents is one containing vinyl group in its molecule.

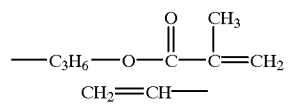

The kinematic viscosity of the foregoing vinyl group-containing silicone oil is preferably from 600 to 1,000,000 CP (25° C.), more preferably from 90,000 to 150,000 CP (25° C.).

The silica which can be used as Component F is an amorphous silicon dioxide, preferably a hydrocarbon compound-coated silica obtained by treating the surface of silica with a silane coupling agent made of hydrocarbon compound, more preferably a vinyl group-containing hydrocarbon compound-coated silica.

Examples of the foregoing silane coupling agent include vinyl group-containing silane such as p-styryl trimethoxysilane, vinyl trichlorosilane, vinyl tris(β-methoxyethoxy)silane, vinyl triethoxysilane, vinyl trimethoxysilane and γ-methacryloxypropyl trimethoxysilane; epoxysilane such as β-(3,4-epoxycyclohexyl)ethyl trimethoxysilanie, γ-glycidoxypropyl trimethoxysilaiie and γ-glycidoxypropyl triethoxysilane; and aminosilane such as N-β(aminoethyl)γ-aminopropyl trimethoxysilane, N-β(aminoethyl)γ-aminopropylmethyldimethoxysilane, γ-aminopropyl triethoxysilane and N-phenyl-γ-aminopropyl trimethoxysilane. Particularly preferred among these silane coupling agents is a silane coupling agent having a unit structurally akin to the thermoplastic resin. For example, p-styryl trimethoxysilane is preferred for a sty-rene resin.

The treatment of the surface of silica with a silane coupling agent can be roughly divided into two groups, i.e., a wet process and a dry process. The wet process comprises treating silica in a silane coupling agent solution, and then drying. The dry process comprises charging silica in an apparatus capable of agitating at a high speed such as Henschel mixer, slowly adding dropwise a silane coupling agent solution to the material with stirring, and then heat-treating.

The aramide fiber which can be used as Component F preferably has an average diameter of from 1 to 500 μm and an average fiber length of from 0.1 to 10 mm. It can be prepared by dissolving isophthalamide or polyparaphenylene terephthalamide in an amide polar solvent or sulfuric acid, and then solution-spinning the material in a wet or dry process.

The fluorine resin which can be used as Component F is a resin comprising fluorine atoms incorporated therein. Specific examples of such a fluorine resin such as polymonofluoroethylene, polydifluoroethylene, polytrifluoroethylene, polytetrafluoroethylene, and tetrafluoroethylene/hexafluoropropylene copolymer. Further, such a fluorine resin may be used in combination with a monomer copolymerizable with the foregoing fluorine-containing monomer.

The polyacrylonitrile fiber which can be-used as Component F preferably has an average diameter of from 1 to 500 μm and an average fiber length of from 0.1 to 10 mm. The polyacrylonitrile fiber can be prepared by a dry spinning process which comprises dissolving a polymer in a solvent such as dimethylformamide, and then dry-spinning the material in a flow of 400° C. air or by a wet spinning process which comprises dissolving a polymer in a solvent such as nitric acid, and then wet-spinning the material in water.

The low volatility flame retardant for styrene resin of the present invention may be used with one or more melt flowability improver (Component G) selected from the group consisting of a copolymer resin made of aromatic vinyl unit and acrylic ester unit, an aliphatic hydrocarbon, a higher aliphatic acid, a higher aliphatic ester, a higher aliphatic amide, a higher aliphatic alcohol and a metallic soap as necessary depending on the kind of the resin composition.

The amount of Component G to be used is preferably from 0.1 to 20 parts by weight, more preferable from 0.5 to 10 parts by weight, most preferably from 1 to 5 parts by weight, per 100 parts by weight of the rubber-modified styrene resin used.

Examples of the aromatic vinyl unit constituting the copolymer resin as Component G include styrene, α-methylstyrene, paramethylstyrene, p-chlorostyrene, p-bromostyrene, and 2,4,5-tribromostyrene. Most preferred among these aromatic vinyl units is styrene. Alternatively, styrene as a main component and the foregoing other aromatic vinyl monomers may be subjected to copolymerization. The foregoing acrylic ester unit include an acrylic ester made of a $C_{1-8}$ alkyl group such as methyl acrylate and butyl acrylate. The content of the acrylic ester unit in the copolymer resin is preferably from 3 to 40% by weight, more preferably from 5 to 20% by weight. The solution viscosity as an index of the molecular weight of the foregoing copolymer resin is preferably from 2 to 10 cP (centipoise) (as measured with a 10 wt % NEK solution at a temperature of 25° C.). If the solution viscosity of the copolymer resin falls below 2 cP, the resulting impact strength is reduced. If the solution viscosity of the copolymer resin exceeds 10 cP, the resulting effect of enhancing melt flowability is reduced.

Examples of the aliphatic hydrocarbon working aid as Component G include liquid paraffin, natural paraffin, microwax, polyolefin wax, synthetic wax, partial oxidation product thereof, fluoride thereof, and chloride thereof.

Examples of the higher aliphatic acid as Component G include a saturated aliphatic acid such as caproic acid, hexadecanoic acid, palmitic acid, stearic acid, phenylstearic acid and ferronic acid; and an unsaturated aliphatic acid such as ricinoleic acid, ricinobelaidic acid and 9-oxy-12-octadecenic acid.

Examples of the higher aliphatic ester as Component G include a monovalent alcohol ester of an aliphatic acid such as methyl phenylstearate and butyl phenylstearate; and a monovalent alcohol ester of a polybasic acid such phthalic diester of phthalic diphenylstearyl. Further examples of such a higher aliphatic ester include a sorbitan ester such as sorbitan monolaurate, sorbitan monostearate, sorbitan imonooleate, sorbitan sesquioleate, sorbitan trioleate, polyoxyethylene sorbitan monolaurate, polyoxyethylene sorbitan monopalmitate, polyoxyethylene sorbitan monostearate and polyoxyethylene sorbitan monooleate; an aliphatic ester of glycerin monomer such as monoglyceride stearate, monoglyceride oleate, monoglyceride caprinate and monoglyceride behenate; an aliphatic ester of polyglycerin such as polyglycerinstearate, polyglycerinoleate and polyglycerinlaurate; an aliphatic ester having a polyalkylene ether unit such as polyoxyethylene monolaurate, polyoxyethylene monostearate and polyoxyethylene monooleate; and a neopentylpolyolaliphatic ester such as neopentylpolyoldistearic ester.

Examples of the higher aliphatic amide as Component G include a monoamide of a saturated aliphatic acid such as amide phenyistearate, amide methylolstearate and amide methylolbehenate; and an N,N'-2-substituted monoamide such as diethanolamide of coconut oil fatty acid and diethanolamide of oleic acid. Specific examples of such a higher aliphatic amide include a saturated aliphatic bisamide such as methylenebis(12-hydroxyphenyl)stearic amide, ethylenebisstearic amide, ethylenebis(12-hydroxyphenyl)stearoc amide and hexamethylenebis(12-hydroxyphenyl)stearic amide , and aromatic bisamide such as m-xylylenebis(12-hydroxyphenyl)stearic amide.

Examples of the higher aliphatic alcohol as Component G include a monovalent alcohol such as stearyl alcohol and cetyl alcohol; a polyvalent alcohol such as sorbitol and mannitol; polyoxyethylene dodecylamine; and polyoxyethylene octadecylamine. Specific examples of such a higher aliphatic alcohol include an allylated ether having polyalkylene ether unit such as polyoxyethyleneallylated ether; a polyoxyethylene alkyl ether such as polyoxyethylene lauryl ether, polyoxyethylene tridodecyl ether, polyoxyethylene cetyl ether, polyoxyethylene stearyl ether and polyoxyethylene oleyl ether; a polyoxyethylene alkyl phenyl ether such as polyoxyethylne octyl phenyl ether and polyoxyethylene nonyl phenyl ether; and a divalent alcohol having polyalkylene ether unit such as polyepichlorohydrin ether, polyoxyethylene bisphenol A ether, polyoxyethylene ethylene glycol, polyoxypropylene bisphenol A ether and polyoxyethylene polyoxypropylene glycol ether.

The metallic soap as Component G include a salt of the foregoing higher aliphatic acid such as stearic acid with a metal such as barium, calcium, zinc, aluminum and magnesium.

The low volatility flame retardant for styrene resin of the present invention may be used with a thermoplastic elastomer (Component H) as necessary depending on the kind of the resin composition. Examples of such a thermoplastic elastomer include polystyrene, polyolefin, polyester, polyurethane, 1,2-polybutadiene and polyvinyl chloride thermoplastic elastomers. Particularly preferred among these thermoplastic elastomers is polystyrene thermoplastic elastomer.

The amount of Component H to be used is preferably from 0.5 to 20 parts by weight, more preferably from 1 to 10 parts by weight, most preferably from 2 to 5 parts by weight, per 100 parts by weight of the rubber-modified styrene resin used.

The foregoing polystyrene thermoplastic elastomer is a block copolymer of an aromatic vinyl unit and a conjugated diene unit or a block copolymer wherein the foregoing conjugated diene unit is partially hydrogenated.

Examples of the aromatic vinyl monomer constituting the foregoing block copolymer include styrene, α-methylstyrene, paramethylstyrene, p-chlorostyrene, p-bromostyrene, and 2,4,5-tribromostyrene. Most preferred among these aromatic vinyl monomers is styrene. Styrene as a main component and the foregoing other aromatic vinyl monomers may be subjected to copolymerization.

Examples of the conjugated diene monomer-constituting the foregoing block copolymer include 1,3-butanediene and isoprene.

The block structure of the block copolymer is preferably a linear block copolymer represented by SB, $S(BS)_n$ (in which n represents an integer of from 1 to 3) or $S(BSB)_n$ (in which n represents an integer of 1 or 2) or a star block copolymer having B moiety as a bond center represented by $(SB)_nX$ (in which n represents an integer of from 3 to 6, and X represents a coupling agent residue such as silicon tetrachloride, tin tetrachloride and a polyepoxy compound) wherein the polymer block composed of aromatic vinyl unit is represented by S and the polymer block composed of conjugated diene and/or partially hydrogenated conjugated diene unit is represented by B. Particularly preferred among these block structures are SB, SBS and SBSB linear block copolymers.

The low volatility flame retardant for styrene resin of the present invention may be used with one or more light resistance improvers (Component I) selected from the group consisting of ultraviolet light absorber, hindered amine light stabilizer, antioxidant, halogen-capturing agent, sunproofing agent, metal inactivating agent and light quenching agent as necessary depending on the kind of the resin composition if it is required to have light resistance.

The amount of Component I to be used is preferably from 0.05 to 20 parts by weight, more preferably from 0.1 to 10 parts by weight, most preferably from 1 to 5 parts by weight, per 100 parts by weight of the styrene resin used.

The ultraviolet light absorber as Component I is a component which absorbs light energy to undergo intramolecular protonic migration to become a keto type molecule (benzophenone, benzotriazole) or undergo cis-trans isomerization (cyano acrylate) to release it as a heat energy and hence protect the resin composition. Examples thereof inlcude a 2-hydroxybenzophenones such as 2,4-dihydroxybenzophenone, 2-hydroxy-4-methoxybenzophenone, 2-hydroxy-4-octoxybenzophenone and 5,5'-methylenebis(2-hydroxy-4-methoxyenzophenone, a 2-(2'-hydroxyphenyl)benzotriazoles such as 2-(2'-hydroxy-5'-methylphenyl)benzotriazole, 2-(2'-hydroxy-5'-t-octylphenyl)benzotriazole, 2-(2'-hydroxy-3',5'-di-t-butylphenyl)benzotriazole, 2-(2'-hydroxy-3',5'-di-t-butylphenyl)-5-chlorobenzotriazole, 2-(2'-hydroxy-3'-t-5'-methylphenyl)-5-chlorobenzotriazole, 2-(2'-hydroxy-3',5'-dicumylphenyl)benzotriazole, and 2,2'-methylenebis(4-t-octyl-6-benzotriazole)phenol, phenyl salicylate, benzoates such as resorcinol monobenzoate, 2,4-di-t-butylphenyl-3',5'-di-t-butyl-4'-hydroxybenzoate and hexadecyl-3,5-di-t-butyl-4-hydroxybenzoate, substituted oxanilides such as 2-ethyl-2'-ethoxyoxanilide and 2-ethoxy-4'-dodecyloxanilide, and cyano acrylates such as ethyl-α-cyano-β,β-diphenylacrylate and methyl-2-cyano-3-methyl-3-(p-methoxyphenyl) acrylate.

The hindered amine light stabilizer as Component I is a component which decomposes a hydroperoxide produced by light energy to produce a stable N—O. radical or N—OR or N—OH and hence stabilize the resin composition. Specific examples of the hindered amine light stabilizer include 2,2,6,6-tetramethyl-4-piperidylstearate, 1,2,2,6,6-pentamethyl-4-piperidylstearate, 2,2,6,6-tetramethyl-4-piperidylbenzoate, bis(2,2,6,6-tetramethyl-4-piperidylsebacate, bis(1,2,3,6,6-pentamethyl-4-piperidyl) sebacate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, bis(1,2,2,6,6-pentamethyl-4-piperidyl)di(tridecyl)-1,2,3,4-butanetetracarboxylate, bis(1,2,2,6,6-pentamethyl-4-piperidyl)-2-butyl-2-(3',5'-di-t-butyl-4-hydroxybenzyl) malonate, 1-(2-hydroxyethyl)-2,2,6,6-tetramethyl-4-piperidinool/diethyl succinate polycondensate, 1,6-bis(2,2,6,6-tetramethyl-4-piperidylamino)hexane/dibromoethane polycondensate, 1,6-bis(2,2,6,6-tetramethyl-4-pioeridylaminoullexane/2,4-dichloro-6-t-octylamino-s-triazine polycondensate, 1,6-bis(2,2,6,6-tetramethyl-4-piperidylamino) hexane/2,4-dichloro-6-morpholino-s-triazine polycondensate.

The antioxidant as Component I is a component which stabilizes a peroxide radical such as hydroperoxide radical produced during heat molding or exposure to light or decomposes a peroxide such as hydroperoxide produced. Examples of such an oxidation inhibitor include hindered phenol oxidation inhibitor and peroxide decomposer. The former acts as a radical chain terminator to inhibit spontaneous oxidation, and the latter-decomposes a peroxide produced in the system to an alcohol which is more stable to inhibit spontaneous oxidation.

Specific examples of the hindered phenol antioxidant as an antioxidant include 2,6-di-t-butyl-4-methylphenol, styrenated phenol, n-octadecyl-3-(3,5-di-t-butyl-4-hydroxyphenyl)propionate, 2,2'-methylenebis(4-methyl-6-butylphenol), 2-t-butyl-6-(3-t-butyl-2-hydroxy-5-methylbenzyl)-4-methylphenylacrylate, 2-(1-(2-hydroxy-3,5-di-t-pentylphenyl)ethyl)-4,6-di-t-pentylphenylacrylate, 4,4'-butylidenebis(3-methyl-6-t-butylphenol), 4,4'-thiobis(3-methyl-6-t-butylphenol), alkylated bisphenol, tetrakis (methylene-3-(3,5-di-t-butyl-4-hydroxyphenyl)propionate) methane, 3,9-bis(2-(3-(3-t-butyl-4-hydroxy-5-methylphenyl)propionyloxy)-1,1-dimiethylethyl)-2,4,8,10-tetraoxyspiro(5-5) undecane.

Specific examples of the peroxide decomposer as an antioxidant include organic phosphorus peroxide decomposers such as trisnonyl phenyl phosphite, triphenyl phosphite and tris(2,4-di-t-butylphenyl)phosphite, and organic sulfur peroxide decomposers such as dilauryl-3,3'-thiodipropionate, dimyristyl-3,3'-thiodipropionate, distearyl-3,3'-thiodipropionate, pentaerythrityltetrakis(3-laurylthiopropionate), ditridecyl-3,3'-thiodipropionate and 2-mercaptobenzimidazole.

The halogen-capturing agent as Component I is a component for catching free halogen produced during heat molding or exposure to light. Specific examples of such a halogen-capturing agent include basic metal salts such as calcium stearate and zinc stearate, hydrotalcite, zeolite, magnesium oxide, organic tin compound, and organic epoxy compounds.

Examples of hydrotalcite as halogen-capturing agent include hydrous or anhydrous basic carbonate of magnesium, calcium, zinc, aluminum, bismuth. These hydrotalcites may be natural or synthetic. Examples of natural hydrotalcites include one represented by the structural formula $Mg_6Al_2(OH)_{16}CO_3.4H_2O$. Examples of synthetic hydrotalcites include $Mg_{0.7}Al_{0.3}(OH)_2(CO_3)_{0.15}.0.54H_2O$, $Mg_{4.5}Al_2(OH)13CO_3.3.5H_2O$, $Mg_{4.2}Al_2(OH)_{12.4}CO_3$, $Zn_6Al_2(OH)_{16}CO_3.4H_2O$, $Ca_6Al_2(OH)_{16}CO_3.4H_2O$, and $Mg_{14}Bi_2(OH)_{29.6}.4.2H_2O$.

Examples of the foregoing zeolite include A type zeolite represented by $Na_2O.Al_2O_3.2SiO_2.H_2O$, and zeolite substituted by metals including at least one metal selected from the group consisting of the group II and IV metals. Examples of the substituent metal include Mg, Ca, Zn, Sr, Ba, Zr, and Sn. Particularly preferred among these substituent metals are Ca, Zn, and Ba.

Examples of the foregoing epoxy compound as halogen-capturing agent include epoxidized soybean oil, tris (epoxypropyl)isocyanurate, hydroquinone diglycidyl ether, diglycidyl ester terephthalate, 4,4'-sulfobisphenol-polyglycidyl ether, N-glycidyl phthalimide, hydrogenated bisphenol A glycidyl ether, and alicyclic epoxy compounds such as 3,4-epoxycyclohexylmethyl-3,4-epoxycyclohexanecarboxylate, 2-(3,4-epoxycyclohexylspiro[5,5]-3,4-epoxy)cyclohexane-m-dioxane, bis(3,4-epoxycylohexylmethyl)adipate, vinylcyclohexene dioxide, 4-vinylepoxycyclohexane, bis(3,4-epoxy-6-methylcyclohexylmethyl)adipate, 3,4-epoxy-6-methylcyclohexyl-3,4-epoxy-6-methylcyclohexanecarboxylate, methylenebis(3,4-epoxycyclohexane), dicyclopentadiene epoxide, di(3,4-epoxycyclohexylmethyl)ether of ethylene glycol, ethylenebis(3,4-epoxycyclohexanecarboxylate), dioctyl epoxyhexahydrophthalate and di-2-ethylhexyl epoxyhexahydrophthalate.

The sunproofing agent as Component I is a component for preventing light from reaching the interior of the high molecular weight compound. Specific examples of the sunproofing agent include rutile titanium oxide ($TiO_2$), zinc oxide (ZnO), chromium oxide ($Cr_2O_3$), and cerium oxide ($CeO_2$).

The metal inactivating agent as Component I is a component which forms a chelate compound by which heavy metal ions in the resin are inactivated. Specific examples of the metal inactivating agent include acid amine derivative, benzotriazole, and derivative thereof.

The light quenching agent as Component I is a component for inactivating a functional group such as hydroperoxide and carbonyl group optically excited in the high molecular compound by transferring energy. As such a light quenching agent there is known an organic nickel.

One of preferred combinations constituting the low volatility flame retardant for styrene resin of the present invention comprises a flame retardant selected from the group consisting of (1) flame retardant represented by formula (I), wherein a, b, and c each independently represent an integer of from 1 to 3; and at least one of by $R_1$, $R_2$, and $R_3$ represent an isopropyl group or an aryl group, the others of $R_1$, $R_2$, and $R_3$ each independently represent a hydrogen atom or a halogen-free alkyl group having from 1 to 30 carbon atoms, which is not an isopropyl group, the total number of carbon atoms in the substituents represented by $R_1$, $R_2$ and $R_3$ being from 12 to 25 on an average in one molecule of the aromatic phosphate, provided that said flame retardnat comprises a plurality of aromatic phosphates having different substituents, the total number of carbon atoms in the substituents $R_1$, $R_2$ and $R_3$ of said flame retardant is represented by a number average in the whole of the flame retardant, which is the sum of the products of the weight fraction of respective aromatic phosphate and the total number of carbon atoms in the substituents in respective aromatic phosphate, and (2) tris(nonylphenyl) phosphate (wherein $R_1$, $R_2$ and $R_3$ in formula (I) each represent a nonyl group) in an amount of from 3 to 30 parts by weight per 100 parts by weight of styrene resin used, wherein the total content of aromatic vinyl monomers and dimerization and trimerization products of aromatic vinyl monomers remaining in the resin composition is not more than 1% by weight. The flame retardant resin composition is preferably a dripping flame retardant resin composition.

The flame retardant wherein at least one of the substituents $R_1$, $R_2$ and $R_3$ is an isopropyl group may be a flame retardant, the substituents of which are all alkyl groups such as a nonylphenyl group but only one isopropyl group or a flame retardant having from 4 to 8 isopropyl groups in all so far as the total number of carbon atoms in the substituents satisfies the foregoing requirements.

The flame retardant wherein at least one of the substituents $R_1$, $R_2$ and $R_3$ is an aryl group may be a flame retardant, the substituents of which are all alkyl groups such as nonylphenyl group but only one aryl group such as a phenyl group, a benzyl group and a cumyl group or a flame retardant having a plurality of the foregoing aryl groups in all so far as the total number of carbon atoms in the substituents satisfies the foregoing requirements. Particularly preferred among the foregoing aryl groups are a phenyl group, a benzyl group, and a cumyl group.

In the above preferred combination of the resin composition of the present invention, it is important that the total content of remaining aromatic vinyl monomers and dimerization and trimerization products of aromatic vinyl monomers (hereinafter referrd to as remaining monomers and oligomers) in the resin composition not more than 1% by weight. The foregoing remaining monomers and oligomers acts as a fuel during combustion to deteriorate the flame retardance of the resin composition. The foregoing flame retardant wherein at least one of $R_1$, $R_2$ and $R_3$ is selected from isopropyl group and/or aryl group, and tris (nonylphenyl) phosphate exhibit a volatility loss of not more than 50% by weight at a temperature of 400° C. The monomeric aromatic phosphate according to the main aspect of the present invention such as bis(nonylphenyl) phenylphosphate has a volatility loss of not less than 50% by weight under the same conditions as mentioned above. In the dripping flame retardization mechanism, the flame retardance depends on the volatility loss of the flame retardance in gas phase. The flame retardant having a volatility loss of not less than 50% by weight at a temperature of 400° C. exhibits an excellent flame retardance during combustion and thus does not show high dependence of flame retardance on the content of the foregoing remaining monomers and oligomers. However, the inventors have found a fact that among the flame retardants the aromatic phosphate, which has a low volatility at a temperature of 400° C., shows a great dependence of flame retardance on the content of the foregoing remaining monomers and oligomers and thus can be drastically improved in flame retardance when the content of the foregoing remaining monomers and oligomers falls below a predetermined value. This fact has heretofore been unknown and cannot even be foreseen from the conventional knowledge. While the reason for this mechanism is unknown, it is thought that a bulky group such as isopropyl group, a rigid group such as aryl group or a monomeric aromatic phosphate the total number of carbon atoms in the substituents of which exceeds 25 such as tris(nonylphenyl)phosphate has an extremely low volatility at a temperature of 400° C., causing the volatility loss of the foregoing remaining monomers and oligomers to exceed that of the foregoing flame retardant, and hence deteriorating the flame retardance of the resin composition.

From the standpoint of enhancement of heat resistance, another preferred combination constituting the low volatility flame retardant for styrene resin of the present invention is a dripping flame retardant resin composition comprising a polyphenylene ether in an amount of from 1 to 10 parts by weight, preferably from 3 to 8 parts by weight, per 100 parts by weight of the styrene resin used, and a flame retardant selected from the group consisting of the foregoing flame retardants (1) and (2) in an amount of from 1 to 20 parts by weight per 100 parts by weight of the styrene resin used, wherein the total content of aromatic vinyl monomer and dimerization and trimerization products of aromatic vinyl monomers remianing in the resin composition is not more than 1% by weight.

From the standpoint of provision of better dripping properties, a further preferred combination constituting the low volatility flame retardant for styrene resin of the present invention is a dripping flame retardant resin composition comprising a polyphenylene ether having a reduced viscosity $\eta SP/C$ of from 0.3 to 0.6 dl/g in an amount of from 1 to 10 parts by weight, preferably from 3 to 8 parts by weight, per 100 parts by weight of a styrene resin which has a reduced viscosity $\eta SP/C$ of from 0.4 to 0.6 dl/g, and a flame retardant selected from the group consisting of the foregoing flame retardants (1) and (2) in an amount of from 1 to 20 parts by weight per 100 parts by weight of the styrene resin, wherein the total content of aromatic vinyl monomer and dimerization and trimerization products of aromatic vinyl monomers remaining in the resin composition is not more than 1% by weight.

Examples of the process for the preparation of the resin composition comprising the low volatility flame retardant for styrene resin of the present invention include a process which comprises melting a rubber-modified styrene resin and other thermoplastic resins, adding a flame retardant of the present invention to the resins, and then melt-kneading the mixture through the same extruder; and a process which comprises preparing a master batch comprising a styrene resin, other thermoplastic resins, and optionally a flame retardant of the present invention, and then kneading the master batch with the remainder of the styrene resin or the flame retardant of the present invention or other flame retardants.

In particular, as the preparation process using a polyphenylene ether as a thermoplastic resin, the following process is preferably employed.

One of the processes for the preparation of a resin composition comprising the low volatility flame retardant for styrene resin of the present invention and a polyphenylene ether as essential components comprises dividing a styrene resin into two batches, preparing a first resin composition comprising one of the two batches of the styrene resin and a polyphenylene ether in an amount of not less than 50% by weight based on the amount of the first resin composition, melting the resin composition at a temperature of from 250° C. to 350° C. in a former stage of a twin-screw extruder, and melt-extruding the first resin composition with a second resin composition comprising the others of the two batches of the styrene resin and the flame retardants according to the present invention at a temperature of from 200° C. to 300° C. in a latter stage of the twin-screw extruder.

In the foregoing process, it is important that the resin composition comprising a styrene resin and a polyphenylene ether to be melted in the former stage of the twin-screw extruder have a polyphenylene ether content of not less than 50% by weight. If the polyphenylene ether content falls below 50% by weight, no shearing force can be applied to the resin composition, causing the production of unmolten polyphenylene ether.

It is preferred that the resin composition and the flame retardant be separated from each other on melt-mixing the resin composition. If the resin composition is melted in the presence of the flame retardant, unmolten matters are produced due to a great difference in viscosity between the two components. In some detail, a resin composition comprising a styrene resin and a polyphenylene ether having a polyphenylene ether content of not less than 50% by weight is melted at a temperature of from 250° C. to 350° C. Subsequently, the remainder of the resin composition and a flame retardant of the present invention are melted at a temperature of from 200° C. to 300° C.

If the resin composition containing a polyphenylene ether is melted at a temperature of lower than 250° C., unmolten polyphenylene ether is produced. If the resin composition comprising a polyphenylene ether is melted at a temperature of higher than 350° C., the styrene resin begins to decompose. If the flame retardant of the present invention is melted at a temperature of lower than 200° C., the compatibility of the resin composition with the flame retardant is reduced, causing the phase separation of the flame retardant and hence making it difficult to perform stable extrusion. If the flame retardant is melted at a temperature of higher than 300° C., the flame retardant can disadvantageously evaporate or decompose.

In the process for the preparation of the resin composition comprising the low volatility flame retardant for styrene resin of the present invention, the twin-screw extruder preferably has L/D ratio of from 20 to 50, in which D represents the inner diameter of cylinder and L represents [th]e length of screw, and a plurality of feed openings including a main feed opening and a side feed opening each disposed at different distances from the tip of the twin-screw extruder, kneading zones are provided between the plurality of feed openings and between the tip of the twin-screw extruder and the feed opening nearest to the tip of the twin-screw extruder, and the kneading zones each have a length of from 3 D to 10 D.

Firstly, the foregoing L/D ratio is preferably from 20 to 50. If L/D falls below 20, it tends to give a poor melt kneading, causing the production of unmolten polyphenylene ether. If L/D exceeds 50, the retention time of the resin composition in the extruder is prolonged, possibly causing the deterioration of the resin composition.

Secondly, the twin-screw extruder preferably has two or more feed openings having different distances from the tip thereof. If there is only one feed opening, the polyphenylene ether having a high melt viscosity and the flame retardant of the present invention having a low melt viscosity undergo phase separation. Thus, there are preferably provided two or more feed openings. In some detail, the resin composition is melted at the main feed opening, followed by the feed of the flame retardant of the present invention through the side feed openings.

Thirdly, there are preferably provided kneading zones between the main feed opening and the side feed openings and between the tip of the extruder and the side feed openings, and the length of the kneading zones each is preferably from 3 D to 10 D. If the length of the kneading zones falls below 3 D, it tends to give a poor melt kneading condition, causing vent up or producing unmolten polyphenylene ether. If the length of the kneading zones exceeds 10 D, the retention time of the resin composition in the extruder is prolonged, deteriorating the resin composition. Further, in the case where there are provided a plurality of side feed openings, the kneading zones between the main feed opening and the side feed openings, between the different side feed openings, and between the tip of the extruder and the side feed openings need to satisfy the foregoing requirements.

Fourthly, the kneading zone of the twin-screw extruder is a zone for enhancing the kneading and mixing conditions. It comprises at least one of (1) full-flighted screw zone having a special mixing element, (2) reversed screw zone, and (3) mixing zone called kneading disc or kneading block.

The full-flighted screw zone having a special mixing element (1) comprises a mixing element such as Dulmage screw, fluted mixing element, uni-melt screw, spiral barrier screw, pin screw, pineapple mixer and cavity transfer mixer.

The reverse screw zone (2) is a zone which operates to suppress the resin flow and hence generate a back pressure, providing a great kneading capacity.

The mixing zone called kneading disc or kneading block (3) is a combination of ellipsoidal discs which are somewhat inclined to one another. A combination of ellipsoidal discs which are inclined to one another at 90° has no screwing force but has a good kneading capacity. A combination of ellipsoidal discs which are inclined forward to one another at 30° has some screwing force but has a small kneading capacity. Further, the thickness of the discs can be varied. The greater the thickness of the discs are, the smaller is its mixing capacity but the better is its kneading or shearing capacity. The greater the thickness of the discs are, the greater are the screwing force and mixing capacity but the small is the kneading capacity.

The shape of the kneading disc may be a triangular triple-threaded disc or double-threaded disc. The triple-threaded disc has a shallow groove that provides an excessive shearing force but gives much opportunity of branching/joining at intermeshed area to provide excellent distribution and mixing properties. The double-threaded disc has a smaller shearing force than the triple-thread disc.

The kneading disc can be controlled in its mixing and kneading properties by varying the shape, angular position, amount and thickness thereof.

Fifthly, the foregoing twin-screw extruder may be a twin-screw unidirectional rotation extruder or twin-screw bidirectional rotation extruder. The two screws may be non-intermeshed, partially-intermeshed or fully-intermeshed. In the case where a low shearing force is applied to obtain a homogeneous resin at low temperatures, a bidirectional rotation partially-intermeshed screw is preferred. In the case where a certain great kneading force is required, a unidirectional rotation fully-intermeshed screw is preferred. In the case where a greater kneading force is required, a unidirectional rotation fully-intermeshed screw is preferred.

The most desirable process for the preparation of the resin composition comprising the low volatility flame retardant for styrene resin of the present invention comprises preparing a master batch comprising a resin composition comprising a polyphenylene ether and a flame retardant of the present invention, or preparing a master batch comprising the foregoing resin composition as an essential component and a styrene resin and/or a rubber-modified styrene resin, adding to the master batch the remainder of the components of the final resin composition to form a mixture, and then melt-kneading the mixture, wherein the glass transition temperature (Tg) of the master batch is from 70° C. to 100° C.

It is preferred that the foregoing master batch be prepared. If all the foregoing components are simultaneously melt-kneaded without preparing the foregoing master batch, or if a resin composition comprising a polyphenylene ether, a flame retardant, and a styrene resin or a resin composition comprising a polyphenylene ether or a flame retardant is melted by an extruder having a plurality of zones, subsequently followed by the melt-extrusion of the remainder of the styrene resin or a flame retardant, unmolten matter of polyphenylene ether having a high melt viscosity is produced or a flame retardant which has easily undergone phase separation is blown from the extruder, reducing the extrusion stability. Thus, a polyphenylene ether having a high melt viscosity, a flame retardant having a low melt viscosity, and optionally a styrene resin can be used to produce a master batch, giving a solution to the foregoing problems.

The glass transition temperature (Tg) of the foregoing master batch is preferably from 70° C. to 100° C. If Tg exceeds 100° C., the master batch may not be thoroughly melt in the presence of a styrene resin having a low melt viscosity and a flame retardant, causing the production of unmolten polyphenylene ether or the reduction of impact strength. In particular, the impact strength depends on the kneading conditions. On the contrary, if Tg falls below 70° C., the master batch can block the hopper or show a reduced extrudability when fed to the extruder. Thus, the preparation of the foregoing specific master batch makes it possible to maintain sufficient extrusion stability and high productivity and enhance impact strength, heat resistance, melt flowability and external appearance even if the phase separation of the flame retardant is suppressed to raise the discharged amount in the subsequent melt extrusion.

A preferred example of the resin composition comprising the low volatility flame retardant for styrene resin of the present invention comprises a polyphenylene ether (Component C), a monomeric alkyl-substituted aromatic phosphate comprising NPDP, BNPP and TNPP (Component A) and a polydimethylsiloxane (Component D) in an amount of from 3 to 8 parts by weight, from 3 to 8 parts by weight and from 0.1 to 2 parts by weight, respectively, based on 100 parts by weight of a styrene resin (Component B) comprising from 30 to 70 parts by weight of a rubber-modified styrene resin and from 30 to 70 parts by weight of an unmodified styrene resin.

The foregoing composition has an excellent balance of flame retardance, particularly dripping flame retardance, continuous molding properties, moldability (melt flowability), impact strength, heat resistance and surface hardness and water-resistant gloss retention of molded product.

The resin composition comprising the low volatility flame retardant for styrene resin of the present invention can be obtained by subjecting the foregoing various components to, e.g., melt kneading by means of a commercially available single-screw extruder or twin-screw extruder. During this procedure, to the system may be added an oxidation inhibitor such as hindered phenol, an ultraviolet absorbent such as benzotriazole and hindered amine, a tin thermal stabilizer, an inorganic or halogenic flame retardant, a lubricant such as stearic acid and zinc stearate, a filler, a reinforcement such as glass fiber, a colorant such as dye and pigment, etc. as necessary.

The composition thus obtained can be continuously molded by means of an injection molding machine or extruder for a prolonged period of time. The molded product thus obtained is excellent in flame retardance (dripping flame retardance), heat resistance and impact resistance.

EXAMPLE

The present invention will be further described in the following examples and comparative examples, but the present invention should not be construed as being limited thereto.

In the following examples and comparative examples, the various measurements were conducted by the following measurement methods or measuring instruments:

(1) Analysis of flame retardant and resin composition (A) 5 g of the resin composition was dissolved in 100 ml of methyl ethyl ketone, and then subjected to separation by an ultracentrifugal separator (20,000 rpm, 1 hour). To the resulting supernatant liquid was then added methanol in an amount of twice that of the supernatant liquid to cause the resin component to separate out. The solution portion and the resin portion were then separated from each other by means of an ultracentrifugal separator. The solution portion was then analyzed by GPC (gel permeation chromatography) (available from Toso Co., Ltd. of Japan; chromatography apparatus (equipped with RI refractive index detector): HLC-8020; column: available from Toso Co., Ltd.; G1000HXL (2 sets used); mobile phase: tetrahydrofuran; flow rate: 0.8 ml/min.; pressure: 60 kgf/cm$^2$; temperature: 35° C. (inlet), 40° C. (oven), 35° C. (RI); sample loop: 100 ml; injected amount of sample: 0.08 g/20 ml). Supposing that the area ratio of the various components on chromatography are the weight fraction of the various components, the composition and content of the phosphate and dimerization and trimerization products of remaining aromatic vinyl monomer and aromatic vinyl monomer were determined from these area ratios. The resin portion was measured for the ratio of integrated value of aromatic proton or aliphatic proton by means of a Fourier transformation nuclear magnetic resonance apparatus (proton-FT-NMR). Thus, the amount of the rubber-modified or unmodified styrene resins and the thermoplastic resin such as aromatic polycarbonate and polyphenylene ether were determined.

(B) Acid value of flame retardant

The flame retardant was measured for acid value in accordance with JIS-K6751 as a measure of the amount of remaining acidic substances therein.

(C) Color hue of flame retardant

The flame retardant was measured for color hue by Gardner process in accordance with "Reference Fats and Oils Analysis Method" established by Society of Oil Chemistry of Japan. The smaller the value of Gardner standard color is, the thinner is the color hue.

(D) Light resistance of flame retardant

For the evaluation of light resistance, 30 g of the flame retardant was charged in a 50-ml vial. The sample was then allowed to stand in SUN TESTER XF-180 (light source:

xenon lamp) available from Shimadzu Corp. for 10 days. The percent change in color hue and acid value from before to after the test was determined as an index of light resistance.

(E) Thermal discoloration resistance of flame retardant

For the evaluation of thermal discoloration resistance, 30 g of the flame retardant was charged in a 50-ml vial. The sample was then allowed to stand at a temperature of 300° C. for 1 hour. The percent change in color hue was then determined as an index of thermal discoloration resistance.

(F) Viscosity of flame retardant

The flame retardant was measured for viscosity at a temperature of 25° C. by means of a Brookfield type viscometer available from Brookfield Engineering Laboratories, Inc. (Stoughton, Mass., USA).

(G) Residual amount of aluminum, magnesium, sodium and antimony in flame retardant In order to determine the residual amount of aluminum, magnesium, sodium and antimony in the flame retardant, the flame retardant was analyzed by atomic absorption spectroscopy as described in "Encyclopedia of Chemical Technology", Third Edition, Volume 2, 'Atomic Absorption and Emission Spectroscopy', pp. 621–623, 591, 155, 156, A Wiley-Interscience Publication, John Wiley & Sons, New York, 1978.

(H) Volatility of flame retardant

The flame retardant was heated at a rate of 40° C./min. in a stream of nitrogen by means of a Type DT-40 thermal analyzer available from Shimadzu Corp. of Japan. The weight loss at 300° C. or 400° C. was determined as a measure of volatility (thermogravimetric analysis test: TGA method).

The flame retardant was allowed to stand at a temperature of 250° C. for 5 minutes in a stream of nitrogen by means of the same apparatus as mentioned above. The resulting residual amount was determined as another measure of volatility.

(2) Weight-average particle diameter of rubber-modified styrene resin

For the measurement of the weight-average particle diameter of the rubber-modified styrene resin, the diameter of rubber particles (butadiene polymer particles) on a transmission electron micrograph of an ultrathin section of the resin composition was determined. The weight-average particle diameter of the rubber-modified styrene resin was calculated from the following equation:

$$\text{Weight-average particle diameter} = \Sigma Ni \cdot Di4 / \Sigma Ni \cdot Di3$$

(wherein Di represents measured particle diameter of butadiene polymer particles, and Ni represents the number of measured butadiene polymer particles having a particle diameter of Di)

(3) Reduced viscosity $\eta SP/C$ of rubber-modified styrene resin and polyphenylene ether To 1 g of the rubber-modified styrene resin was added a mixture of 18 ml of methyl ethyl ketone and 2 ml of methanol. The mixture was then shaken at a temperature of 25° C. for 2 hours. The mixture was then subjected to centrifugal separation at a temperature of 5° C. at 18,000 rpm for 30 minutes. The resulting supernatant liquid was then withdrawn. The resin content was precipitated with methanol, and then dried.

0.1 g of the resin thus obtained was dissolved in toluene for a rubber-modified polystyrene resin, or in methyl ethyl ketone for a rubber-modified acrylonitrile-styrene copolymer resin, to make a 0.5 g/dl solution. 10 ml of the solution thus obtained was then charged in a Cannon-Fenske viscometer. The solution was then measured for dropping time $T_1$ (second) at a temperature of 30° C. Pure toluene or pure methyl ethyl ketone was measured for dropping time $T_0$ (second) by means of the same viscometer. The reduced viscosity $\eta SP/C$ was then calculated from the following equation in which C represents the resin concentration (g/dl):

$$\eta SP/C = (T_1/T_0 - 1)/C$$

For the evaluation of the reduced visocosity $\eta SP/C$ of the polyphenylene ether, 0.1 g of the polyphenylene ether was dissolved in chloroform to make a 0.5 g/dl solution which was then measured in the same manner as described above.

(4) Izod impact strength

Izod impact strength was measured at a temperature of 23° C. in accordance with ASTM-D256 with a V-notch and a ⅛-inch test piece.

(5) Dart impact strength

Dart impact strength was measured at a temperature of 23° C. by a method similar to ASTM-D1709. Specifically, a Du Pont impact tester (available from Toyo Seiki Seisakujo K.K.) was used. A dart (weight: 200 g) having a diameter of 9.5 mm at the tip of impact center and a length of 5.2 mm was brought into contact with the surface of a molded product (70 mm square; 2 mm thick) on a pad having a diameter of 9.5 mm and a hole depth of 4.0 mm. A load was dropped onto the molded product from a height of 50 cm at maximum. The weight of the load under which 50% of the molded product is destroyed was defined as 50% destruction load. 50% destruction load was then multiplied by the weight of the dropping load to calculate 50% destruction energy as dart impact strength. (unit: kgcm)

(6) Rigidity

Flexural modulus was measured in accordance with ASTM-D790 as a measure of rigidity.

(7) Tensile strength and tensile elongation

Tensile strength and tensile elongation were measured in accordance with ASTM-D638.

(8) Heat distortion temperature

Heat distortion temperature was measured in accordance with ASTM-D648 as a measure of heat resistance. (Test load: 18.5 Kg/cm$^2$; ¼ inch-thick test piece)

(9) Vicat softening temperature

Vicat softening temperature was measured in accordance with ASTM-D1525 as a measure of heat resistance.

(10) Melt flow rate (MFR)

Melt flow rate was measured in accordance with ASTM-D1238 as an index of melt flow. The extruding rate per 10 minutes (g/10 min) at a load of 5 kg and a melting temperature of 200° C. was determined.

(11) Gloss

For the evaluation of gloss, the specular gloss at an incidence angle of 60 degrees was determined in accordance with ASTM-D523.

(12) Flame retardance

Flame retardance was evaluated by VB (Vertical Burning) method in accordance with UL-subject 94 by using a ⅛-inch test piece.

For the details of the method described in UL-subject 94, reference can be made to e.g., U.S. Pat. No. 4,966,814.

Heat release rate was measured using ATLAS Cone Calorimeter II available from ATLAS Electric Devices Co. of USA in accordance with ASTM-E1354. The measurement was conducted at a radiant heat flux of 50 kW/m$^2$. The sample was installed horizontally. The area of the sample was 0.006 m$^2$.

(13) Volatility of resin composition (thermogravimetric analysis test: TGA method)

The resin composition was heated at a rate of 10° C./min in a stream of nitrogen by means of a Type DT-40 thermal analyzer available from Shimadzu Corp. of Japan. The temperature at which the weight loss reaches 1% was determined as a measure of the volatility of the resin composition.

(14) Light resistance of molded Product

Light resistance test was conducted using ATLAS C135W Weatherometer available from ATLAS Electric Devices Co. of USA as a light resistance tester in accordance with JIS K7102. The sample was irradiated with xenon light (wavelength: 340 nm; energy: 0.30 W/m$^2$) at a tester internal temperature of 55° C. and a humidity of 55% without shower for 300 hours. The color difference ΔE from before to after the test was determined by L.a.b. method using a Type SM-3 SM color computer available from Suga Shikenki Co., Ltd. of Japan to evaluate the tone change. The smaller the color difference is; the higher is the light resistance.

(15) Percent heat shrinkage of molded product of resin composition

A ⅛-inch thick molded product of resin composition obtained by compression molding or injection molding was allowed to stand in a 170° C. hot-air drier for 15 minutes. Percent heat shrinkage S (%) was then calculated from the dimensional change of the molded product by the following equation:

$$S=(L_0-L)\times 100/L_0$$

(wherein $L_0$ represents the size before heating, and L represents the size after heating)

(16) Water-resistant gloss retention of molded product

For the evaluation of water resistance, the molded product was allowed to stand in a 80° C. constant temperature water for 24 hours. The gloss change (ΔG) from before to after the test was determined as an index of water resistance. The smaller ΔG is, the smaller is the gloss change by hot water.

(17) Surface hardness of molded product

The molded product was measured for pencil hardness (pencil scratch value) in accordance with JIS-K5400 as an index of the surface hardness of the molded product.

(18) Kneadability

The following parameters were used to evaluate kneadability.

| | |
|---|---|
| Kneadability parameter = | (Extrusion factor)/ (circumferential speed of screw) |
| = | (Q/D$^2$)/πND | wherein Q represents the extrusion (kg/hr); N represents the number of revolutions of screw (rpm); and D represents the inner diameter of cylinder (mm).

(19) Glass transition temperature (Tg)

The sample was heated to a temperature of 400° C. at a rate of 10° C./min in a stream of nitrogen by means of a Type DT-40 thermal analyzer available from Shimadzu Corp. Glass transition temperature was measured by DSC method.

As the various components to be used in the examples and comparative examples, the following compounds were used.

(a) Aromatic phosphate (Component A)

(1) Triphenyl phosphate (TPP)

A commercial aromatic phosphate (trade name: TPP (hereinafter referred to "TPP"), available from Daihachi Kagaku Kogyo Co., Ltd.) was used.

The total number of carbon atoms in the substituents of TPP was 0 on the average, and the phosphorus content was 9.5% by weight.

(2) Oligomeric aromatic phosphate (fr-1)

A commercial oligomeric aromatic phosphate derived from bisphenol A (trade name: CR741 (hereinafter referred to as "fez"), available from Daihachi Kagaku Kogyo Co., Ltd.) was used. According to GPC analysis, the oligomeric aromatic phosphate comprises TPP-A-dimer (n=1) and TPP-A-oligomer (n>2) represented by the following formula and triphenyl phosphate (TPP) in a weight proportion of 84.7/13.02/2.3. The phosphorus content was 9.4% by weight.

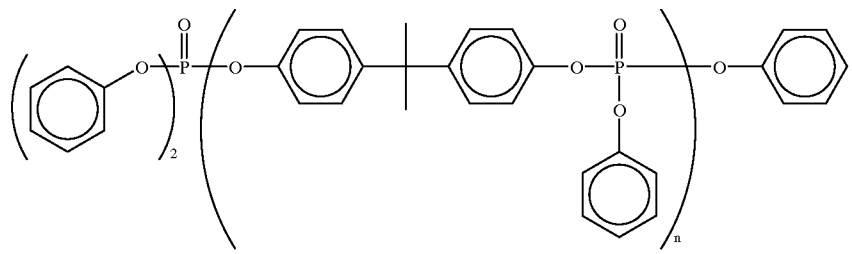

(3) Preparation of monomeric alkyl group-substituted aromatic phosphate (FR-1)

287.3 parts by weight (molar ratio: 2.0) of nonylphenol and 0.87 parts by weight (molar ratio: 0.01) of aluminum chloride were measured out in a flask. 100 parts by weight (molar ratio: 1.0) of phosphorus oxychloride were then added dropwise to the mixture at a temperature of 90° C. in 1 hour. To the resulting intermediate product were then added 61.4 parts by weight (molar ratio: 1.0) of phenol to cause further reaction. In order to complete the reaction, the reaction system was gradually heated eventually to 180° C. to complete esterification. The resulting reaction product was cooled, and then washed with water so that the catalyst and chlorine content were removed to obtain a phosphate mixture (hereinafter referred to as "FR-1"). The mixture thus obtained was then analyzed by GPC (gel permeation chromatography; HLC-8020 available from Toso Co., Ltd. (mobile phase: tetrahydrofuran)). As a result, it was found that the mixture comprises bis(nonylphenyl) phenylphosphate (hereinafter referred to as "BNPP"), tris-nonylphenyl phosphate (hereinafter referred to as "TNPP"), nonylphenyl diphenyl phosphate (hereinafter referred to as "NDPP"), and nonylphenol in a weight proportion of 77.8/11.3/8.4/2.5.

The total number of carbon atoms in the substituents was 17.9 on the average (18×0.778+27×0.113+9×0.084=17.9), and the phosphorus content was 5.5% by weight.

The monomeric aromatic phosphate mixture (FR-1) was distilled, and then fractionated by liquid chromatography to obtain BNPP.

(4) Preparation of various monomeric alkyl-substituted aromatic phosphates

The procedure of FR-1 preparation was followed except that commercial alkylphenols or various alkylphenols obtained by the method described in "ENCYCLOPEDIA OF CHEMICAL TECHNOLOGY", Third Edition, Volume 2, 'ALKYLPHENOLS', p. 72–96 (A WILEY-INTERSCIENCE PUBLICATION, John Wiley & Sons, New York 1978) were used with their molar ratio to phosphorus oxychloride being controlled to synthesize various alkylphenols. The purification of these alkylphenols was effected by the foregoing rinsing, distillation or fractionating by liquid chromatography. Table 1 shows the various alkylphenols.

(b) Thermoplastic resin (1) Rubber-modified styrene resin (HIPS)

A polybutadiene ((cis-1,4 bond/trans-1,4 bond/vinyl-1,2 bond weight ratio=95/2/3); trade name: Nipol 122 OSL, available from Nihon Zeon Co., Ltd.) was dissolved in the following mixture to make a homogeneous solution.

| | |
|---|---|
| Polybutadiene | 10.5% by weight |
| Styrene | 74.2% by weight |
| Ethylbenzene | 15.0% by weight |
| α-Methylstyrene dimerization product | 0.27% by weight |
| t-Butylperoxyisopropyl carbonate | 0.03% by weight |

The foregoing mixture was continuously supplied into an agitated serial 4-stage reactor. Thus, the mixture was allowed to undergo polymerization at an agitation rate of 190 rpm and a temperature of 126° C. in the 1st stage, at an agitation rate of 50 rpm and a temperature of 133° C. in the 2nd stage, at an agitation rate of 20 rpm and a temperature of 140° C. in the 3rd stage, and then at an agitation rate of 20 rpm and a temperature of 155° C. in the 4th stage. Subsequently, the resulting polymerization solution having a solid content of 73% was introduced into a devolatilizing apparatus wherein the unreacted monomers and the solvent were then removed to obtain a rubber-modified styrene resin (hereinafter referred to as "HIPS-1"). The rubber-modified styrene resin thus obtained was then analyzed. As a result, it was found that the rubber-modified styrene resin exhibits a rubber content of 12.1% by weight, a weight-average particle diameter of 1.5 μm and a reduced viscosity ηSP/C of 0.53 dl/g.

The amount of polymerization initiator and chain transfer agent and polymerization temperature were varied to prepare rubber-modified styrene resins having different reduced viscosities ηSP/C. The results are set forth in Table 8.

Further, various HIPS having different rubber kinds, rubber contents, rubber weight-average particle diameters and reduced viscosities ηSP/C were prepared. In some detail, the foregoing procedure was followed except that a styrene-butadiene block copolymer (styrene/butadiene ratio=40/60 (by weight), cis-1,4 bond/trans-1,4 bond/vinyl-1,2 bond weight ratio=37/50/13)) was used as a rubber instead of the foregoing butadiene and the agitation rate was altered to control the weight-average particle diameter of rubber and the amount of α-methylstyrene dimerization product was altered to control the reduced viscosity of the product. The HIPS's thus obtained exhibited a rubber content of 15.0% by weight, a rubber weight-average particle diameter of 0.34 μm and a reduced viscosity ηSP/C of 0.68 dl/g (hereinafter referred to as "HIPS-7").

The production procedure of HIPS-1 was followed except that part of styrene was replaced by α-methylstyrene or butyl acrylate to prepare a copolymer HIPS (hereinafter referred to as "MS-HIPS" and "BA-HIPS", respectively). The copolymerizable monomer (α-methylstyrene or butyl acrylate) content of MS-HIPS and BA-HIPS was 4% by weight.

(2) Rubber-unmodified styrene resin

A mixture of 80.0 parts by weight of styrene, 20 parts by weight of ethylbenzene, and 0.03 parts by weight of 1,1-bis(t-butylperoxy)-3,3,5-trimethylcyclohexane as an initiator was continuously supplied into a coil type full-mixed reactor at a rate of 2.5 l/hr. so that the reaction mixture was allowed to undergo polymerization at a temperature of 150° C. for an average retention time of 2 hours with a polymer solid concentration of 48%. Subsequently, the polymerization solution was introduced into a 230° C. devolatilizing apparatus where the unreacted monomers and the solvent were removed to obtain a polystyrene. The polystyrene thus obtained exhibited a weight-average molecular weight of 160,000 and a number-average molecular weight of 76,000 (hereinafter referred to as "GPPS-2").

The foregoing procedure was followed except that n-dodecyl mercaptan was added as a chain transfer agent or the polymerization temperature was raised to prepare polystyrenes having lower molecular weights. The results are set forth in Tables 9 and 12.

(3) Rubber-unmodified copolymer styrene resin

A mixture of 78.0 parts by weight of styrene, 2.0 parts by weight of methacrylic acid, 20 parts by weight of ethylbenzene, 0.02 parts by weight of n-dodecyl mercaptan, and 0.03 parts by weight of 1,1-bis(t-butylperoxy)-3,3,5-trimethylcyclohexane as an initiator was continuously supplied into a coil type complete mixing reactor at a rate of 2.5 l/hr. so that the reaction mixture was allowed to undergo polymerization at a temperature of 150° C. for an average retention time of 2 hours with a polymer solid concentration of 47%. Subsequently, the polymerization solution was introduced into a 230° C. devolatilizing apparatus where the unreacted monomers and the solvent were removed to obtain a styrene-methacrylic acid copolymer. The copolymer thus obtained exhibited a styrene/methacrylic acid weight ratio of 96/4, a weight-average molecular weight of 120,000 and a number-average molecular weight of 63,000 (hereinafter referred to as "SMAA-3").

The foregoing procedure was followed except that methacrylic acid, maleic anhydride, α-methylstyrene, or butyl acrylate was used as a copolymerizable monomer and the amount of ethylbenzene as a solvent was reduced or the polymerization temperature was raised to prepare copolymers having higher molecular weights. The foregoing procedure was followed except that the amount of n-dodecyl mercaptan used as a chain transfer agent was increased or the polymerization temperature was raised to prepare copolymers having lower molecular weights. Further, the ratio of components to be charged for polymerization was altered to control the polymerization composition ratio. The results are set forth in Table 9.

(4) Preparation of polyphenylene ether (PPE)

The interior of a stainless steel reactor having an oxygen blowing port at the bottom thereof and a cooling coil and an agitating blade thereinside was thoroughly replaced by nitrogen. 54.8 g of cupric bromide, 1,110 g of di-n-butylamine, and a solution of a 8.75 kg of 2,6-xylenol in a mixture of 20 l of toluene, 16 l of n-butanol and 4 l of methanol were then charged into the reactor. The reaction mixture was then allowed to undergo polymerization with stirring with oxygen being blown into the reactor while the internal temperature was being controlled to 30° C. for 90 minutes. After the completion of the polymerization, the polymer which had separated out was withdrawn by filtration. To the polymer thus obtained was then added a methanol/hydrochloric acid mixture to decompose the remaining catalyst in the polymer. The polymer was thoroughly washed with methanol, and then dried to obtain a powdered polyphenylene ether (hereinafter referred to as "PPE-1"). The product showed a reduced viscosity ηSP of 0.41 dl/g.

The foregoing procedure was followed except that the amount of the catalyst to be used or the polymerization time was controlled during the preparation of polyphenylene ether to prepare polyphenylene ethers having different reduced viscosities ηSP/C. The results are set forth in Table 10.

(5) Aromatic polycarbonate (PC)

A commercial bisphenol A type polycarbonate (Novalex 8025A, available from Mitsubishi Chemical Corp. of Japan) (hereinafter occasionally referred to as "PC") was used.

(6) ABS resin (ABS)

A commercial ABS resin (acrylonitrile/butadiene/styrene=26/14/60 (by weight)) (hereinafter occasionally referred to as "ABS") was used.

(7) Polyethylene (PE)

A commercial low density polyethylene was used.

(8) Polypropylene (PP)

A commercial unmodified polypropylene was used.

(9) Polyamide (PA)

A commercial polyamide 6 was used.

(10) Polyethylene terephthalate (PET)

A commercial polyethylene terephthalate was used.

(c) Polyorganosiloxane

Polydimethylsiloxanes having different kinematic viscosities (Shin-Etsu silicone KF96 series, available from Shin-Etsu Chemical Co., Ltd.) were used as shown in Table 16.

(d) Light resistance improver (1) Ultraviolet light absorber

A benzotriazole ultraviolet light absorber available from Ciba Geigy Corp. (trade name: Tinuvin P (hereinafter referred to as "UVA")) was used.

(2) Hindered piperidine light stabilizer

A hindered piperidine light stabilizer available from Ciba Geigy Corp. (trade name: Tinuvin 770 (hereinafter referred to as "HALS") was used.

(3) Sunproofing agent

A commercial titanium oxide ($TiO_2$) powder (available from Ishihara Sangyo Kaisha, Ltd.; average size: 0.2 μm (hereinafter referred to as "$TiO_2$") was used.

(4) Antioxidant

An antioxidant available from Ciba Geigy Corp. (trade name: Irganox 1076 (hereinafter referred to as "AO")) was used.

(e) Flame retardant (1) A tetrabromobisphenol A epoxy oligomer (hereinafter referred to as "BEO") was used as a halogenated bisphenol type epoxy resin.

(2) Antimony trioxide

A commercial antimony trioxide (hereinafter referred to as "$Sb_2O_3$") was used as an auxiliary flame retardant.

The styrene resins used in the following examples, comparative examples and tables are abbreviated as follows:

HIPS: Rubber-modified polystyrene

HIPS-1: Polybutadiene rubber-modified polystyrene having a rubber content of 12.1% by weight, a rubber weight-average particle diameter of 1.5 μm and a reduced viscosity ηSP/C of 0.53 dl/g HIPS-2: Polybutadiene rubber-modified polystyrene having a rubber content of 12.1% by weight, a rubber weight-average particle diameter of 1.5 μm and a reduced viscosity ηSP/C of 0.79 dl/g HIPS-3: Polybutadiene rubber-modified polystyrene having a rubber content of 12.1% by weight, a rubber weight-average particle diameter of 1.5 μm and a reduced viscosity ηSP/C of 0.60 dl/g HIPS-4: Polybutadiene rubber-modified polystyrene having a rubber content of 12.1% by weight, a rubber weight-average particle diameter of 1.5 μm and a reduced viscosity ηSP/C of 0.58 dl/g HIPS-5: Polybutadiene rubber-modified polystyrene having a rubber content of 12.1% by weight, a rubber weight-average particle diameter of 1.5 μm and a reduced viscosity ηSP/C of 0.40 dl/g HIPS-6: Polybutadiene rubber-modified polystyrene having a rubber content of 12.1% by weight, a rubber weight-average particle diameter of 1.5 μm and a reduced viscosity ηSP/C of 0.35 dl/g HIPS-7: Styrene-butadiene rubber (styrene/butadiene ratio=40/60 (by weight))-modified polystyrene having a rubber content of 15.0% by weight, a rubber weight-average particle diameter of 0.3 μm and a reduced viscosity ηSP/C of 0.68 dl/g GPPS: Rubber-unmodified polystyrene GPPS-1: Rubber-unmodified polystyrene having a weight-average molecular weight of 212,000 and a number-average molecular weight of 87,000

GPPS-2: Rubber-unmodified polystyrene having a weight-average molecular weight of 160,000 and a number-average molecular weight of 76,000

GPPS-3: Rubber-unmodified polystyrene having a weight-average molecular weight of 135,000 and a number-average molecular weight of 71,000

GPPS-4: Rubber-unmodified polystyrene having a weight-average molecular weight of 101,000 and a number-average molecular weight of 59,000

SMAA: Styrene-methacrylic acid copolymer

SMAA-1: Styrene/methacrylic acid=92/8 (by weight)
Weight-average molecular weight: 200,000;
Number-average molecular weight: 85,000

SMAA-2: Styrene/methacrylic acid=93/7 (by weight)
Weight-average molecular weight: 110,000;
Number-average molecular weight: 55,000

SMAA-3: Styrene/methacrylic acid=96/4 (by weight)
Weight-average molecular weight: 122,000;
Number-average molecular weight: 63,000

SMA: Styrene-maleic anhydride

SMA-1: Styrene/maleic anhydride=92/8 (by weight)
Weight-average molecular weight: 248,000;
Number-average molecular weight: 113,000

SMA-2: Styrene/maleic anhydride=85/15 (by weight)
Weight-average molecular weight: 203,000;
Number-average molecular weight: 97,000

EXAMPLES 1 TO 5 AND COMPARATIVE EXAMPLES 1 TO 6

The various monomeric aromatic phosphates set forth in Table 1 were allowed to stand at a temperature of 250° C. in a stream of nitrogen for 5 minutes, and then measured for residual amount by thermogravimetric analysis test. The results are set forth in Table 1 and FIG. 1. Table 1 and FIG. 1 show that the monomeric aromatic phosphates wherein the total number of carbon atoms in the substituents $R_1$, $R_2$ and $R_3$ is not less than 12 on the average as a whole exhibit an excellent non-volatility.

TABLE 1

| Example No. | Monomeric alkyl group-substituted aromatic phosphate | | Non-volatility |
|---|---|---|---|
| | Total number of carbon atoms in substituents | Designation | Remaining amount after 5 minutes of 250° C. storage |
| Comparative Example 1 | 0 | TPP: Triphenyl phosphate | 14 |
| Comparative Example 2 | 3 | TCP: Tricresyl phosphate | 52 |
| Comparative Example 3 | 6 | TXP: Trixylenyl phosphate | 65 |
| Comparative Example 4 | 9 | NPDP: Nonylphenyl diphenyl phosphate | 75 |
| Example 1 | 12 | DPDP: Dodecylphenyl diphenyl phosphate | 95 |
| Example 2 | 15 | PDDP: Pentadecyl diphenyl phosphate | 96 |
| Example 3 | 18 | DNPP: Bis(nonylphenyl)phenyl phosphate | 96 |
| Example 4 | 20 | ODDP: Octadecylphenyl diphenyl phosphate | 96 |
| Example 5 | 25 | BONP: Bis(octylphenyl)nonylphenyl phosphate | 97 |
| Comparative Example 5 | 27 | TNPP: Tris(nonylphenyl) phosphate | 97 |
| Comparative Example 6 | 30 | BNDP: Bis(nonylphenyl)dodecylphenyl phosphate | 97 |

EXAMPLES 6 TO 10 AND COMPARATIVE EXAMPLES 7 TO 13

HIPS-1, GPPS-1 and the aromatic phosphates set forth in Table 2 were mechanically mixed in a proportion of 70/30/7 (by weight). The mixtures were each then melted at a temperature of 220° C. at 50 rpm for 5 minutes in a laboplastomill available from Toyo Seiki Seisakujo K.K. The resin compositions thus obtained were each then subjected to compression molding to prepare ⅛-inch thick specimens to be evaluated for flame retardance. The specimens thus obtained were each then measured for the total content of the remaining styrene monomer and dimerization and trimerization products of styrene (remaining monomers phosphate is from 12 to 25 on the average exhibit an excellent balance between flame retardance and non-volatility.

As compared with the monomeric aromatic phosphate, the oligomeric aromatic phosphate exhibits a small volatility at 400° C. in the initial stage of combustion and hence deteriorated flame retardance., Further, the specific monomeric alkyl group-substituted aromatic phosphate stays non-volatile at a molding temperature of not higher than 300° C. and evaporates effectively in the initial stage of combustion, providing an excellent flame retardance.

TABLE 2

| Example No. | Monomeric alkyl group-substituted aromatic phosphate | | | | Flame retardance | | | |
|---|---|---|---|---|---|---|---|---|
| | Total number of carbon atoms in substituents | Name | Weight loss (TGA method) | | Average flame-out time(sec.) | Dripping of flaming particles | UL 94 judgement |
| | | | 300° C. | 400° C. | | | | |
| Comparative Example 7 | 0 | TPP | 32 | 100 | 14 | Yes | V-2 |
| Comparative Example 8 | 3 | TCP | 29 | 100 | 13 | Yes | V-2 |
| Comparative Example 9 | 6 | TXP | 23 | 100 | 13 | Yes | V-2 |
| Comparative Example 10 | 9 | NPDP | 18 | 95 | 13 | Yes | V-2 |
| Example 6 | 12 | DPDP | 13 | 83 | 13 | Yes | V-2 |
| Example 7 | 15 | PDDP | 8 | 78 | 13 | Yes | V-2 |
| Example 8 | 18 | BNPP | 3 | 65 | 14 | Yes | V-2 |
| Example 9 | 20 | ODDP | 3 | 60 | 14 | Yes | V-2 |
| Example 10 | 25 | BONP | 3 | 52 | 15 | Yes | V-2 |
| Comparative Example 11 | 27 | TNPP | 2 | 23 | 28 | Yes | HB* |
| Comparative Example 12 | 30 | BNDP | 1 | 15 | 41 | Yes | HB* |
| Comparative Example 13 | Oligomeric phosphate | fr-1 | 3 | 8 | 40 | Yes | HB* |

*HB: Rank which does not belong to any one of V-0, V-1 and V-2 when evaluated for flame retardance in accordance with UL-94 (hereinafter the same)
V-2: Undergoes flame-out due to melt dripping after ignition when evaluated for flame retardance in accordance with UL-94 (hereinafter the same)

and ologomers) in accordance with the measuring method described above. As a result, the foregoing remaining monomers and oligomers were detected in an amount of from 1.1 to 1.5% by weight in all the specimens. Further, TPP, fr-1, and BNPP were each heated at a rate of 40° C./min in a stream of nitrogen. The relationship between temperature and weight loss was determined by thermogravimetric analysis test. The results are set forth in Table 2 and FIG. 2.

Figure 2:
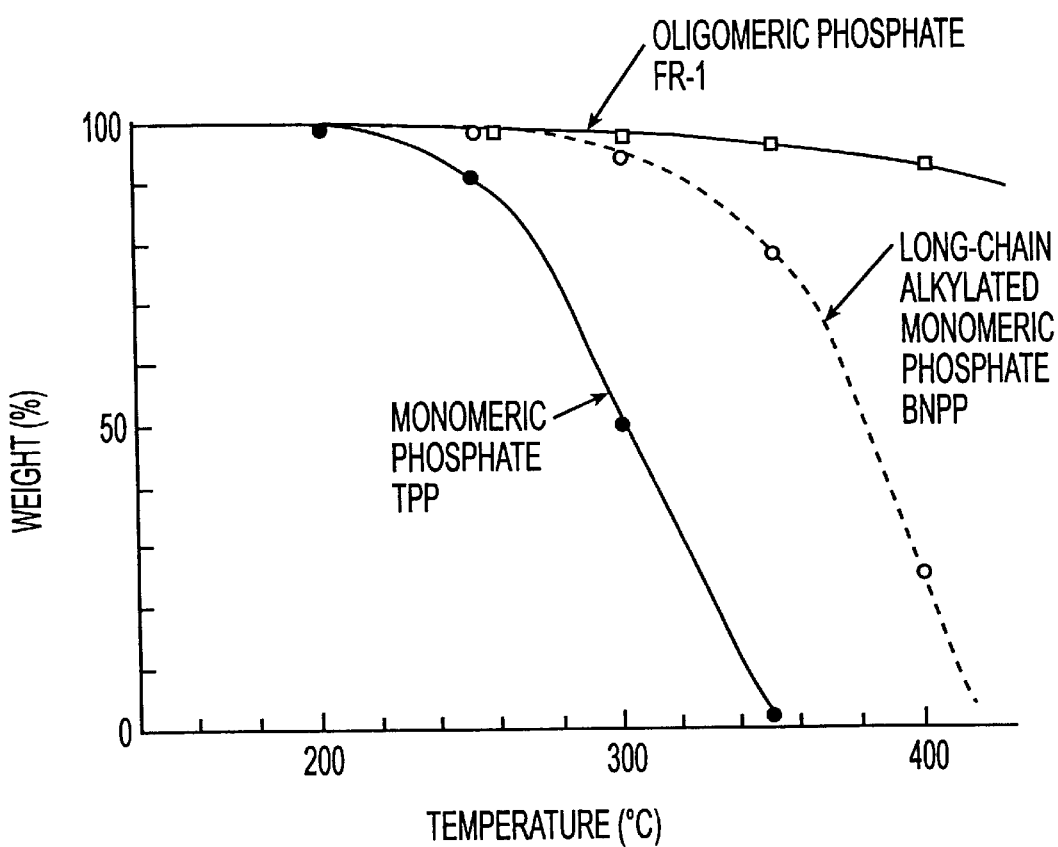
FIG. 2 illustrates the results of thermogravimetric analysis test (TGA) of unsubstituted monomeric aromatic phosphate (TPP), alkyl group-substituted monomeric aromatic phosphate (BNPP) and oligomeric aromatic phosphate (fr-1)

Table 2 and FIG. 2 show that the specimens wherein the total number of carbon atoms in the substituents of aromatic

EXAMPLES 11 TO 14 AND COMPARATIVE EXAMPLES 14 TO 17

A resin compositions set forth in Table 3 and BNPP were processed in the same manner as in Example 6 to prepare specimens to be evaluated for flame retardance. The results are set forth in Table 3. The specimens thus obtained were each measured for the total content of the remaining styrene monomer and dimerization and trimerization products of styrene in accordance with the measuring method described above. As a result, the foregoing remaining monomers and ologomers were detected in an amount of from 1.1 to 1.5% by weight in all the specimens.

ing remaining monomers and oligomers were detected in an amount of from 1.1 to 1.5% by weight in all the specimens.

TABLE 3

| Example No. | Resin composition (weight ratio) Resin | BNPP | Compatibility during melt kneading | Flame retardance (self-dripping flame-out) Average flame-out time (sec.) | Dripping of flaming particles | UL-94 judgement |
|---|---|---|---|---|---|---|
| Comparative Example 14 | PE 100 | 7 | Phase separation | ≧60 | Yes | HB* |
| Comparative Example 15 | PP 100 | 7 | Phase separation | ≧60 | Yes | HB* |
| Comparative Example 16 | PA 100 | 7 | Good | 50 | Yes | HB* |
| Comparative Example 17 | PET 100 | 7 | Phase separation | 55 | Yes | HB* |
| Example 11 | HIPS-1 100 PE 12 | 7 | Good | 20 | Yes | V-2 |
| Example 12 | HIPS-1 100 PP 12 | 7 | Good | 21 | Yes | V-2 |
| Example 13 | HIPS-1 100 PA 12 | 7 | Good | 15 | Yes | V-2 |
| Example 14 | HIPS-1 100 PET 12 | 7 | Good | 16 | Yes | V-2 |

EXAMPLES 15 TO 18 AND COMPARATIVE EXAMPLES 18 TO 25

Figure 3:
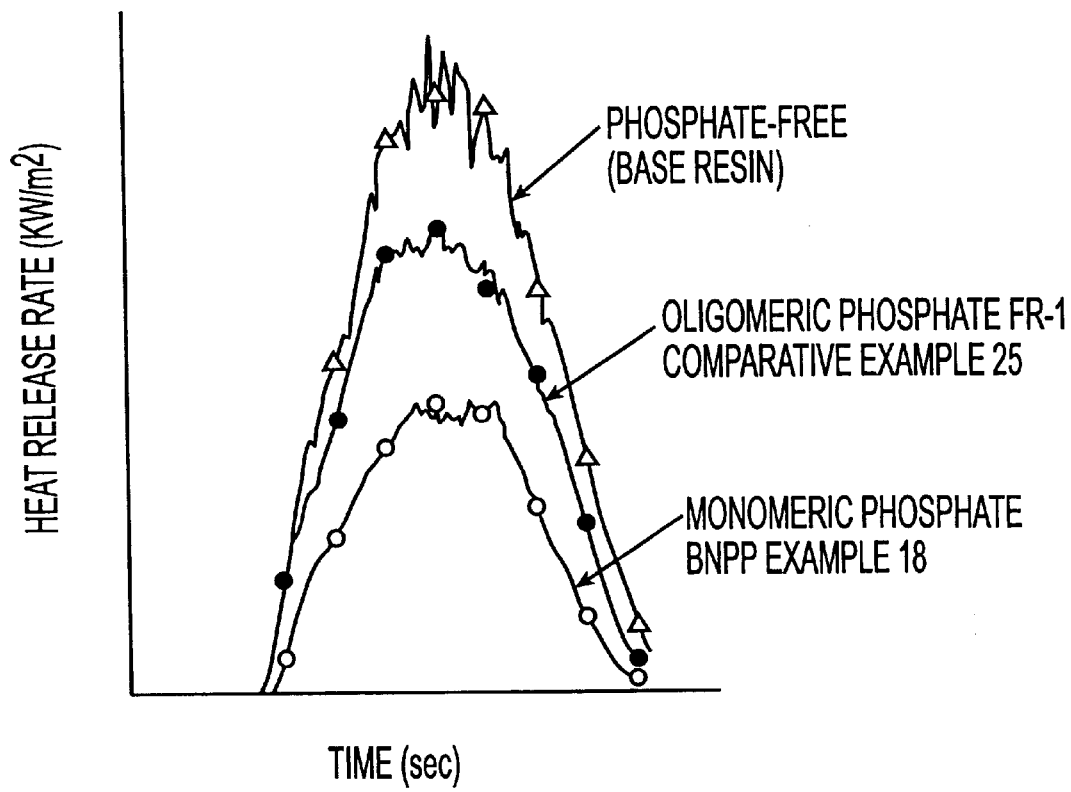
FIG. 3 illustrates the average heat release rate of the resin composition comprising the alkyl group-substituted monomeric aromatic phosphate (BNPP) and the oligomeric aromatic phosphate (fr-1) (Example 18 and Comparative Example 25 in Table 4) and the base resin determined by a cone calorimeter.
Figure 4:
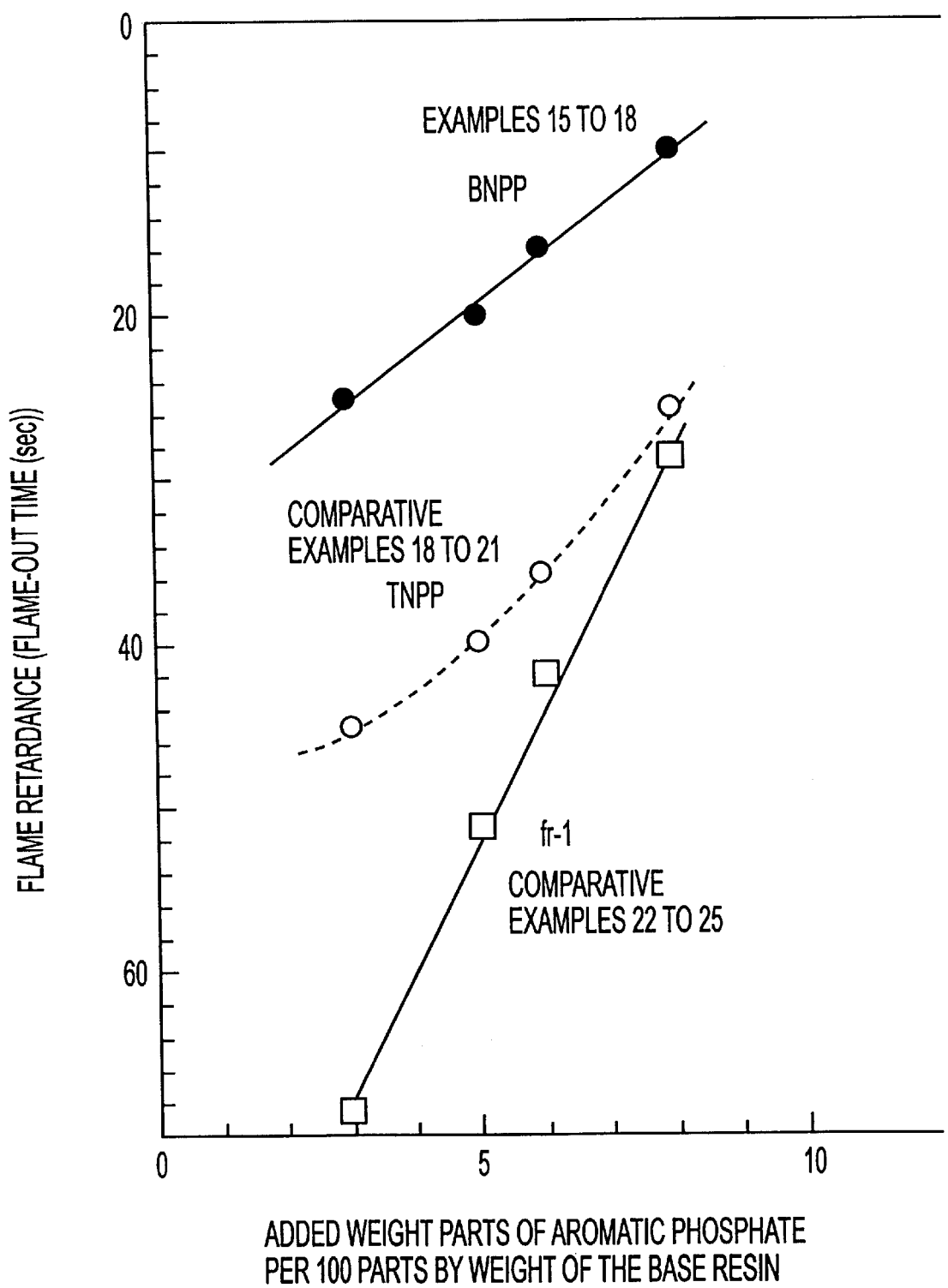
FIG. 4 illustrates the relationship the content of the oligomeric aromatic phosphate (fr-1) in the resin composition (Table 4) comprising the alkyl group-substituted monomeric aromatic phosphates (BNPP, TNPP) and the origomeric aromatic phosphate (fr-1) and its flame retardance.

A composition obtained by compounding the aromatic phosphate set forth in Table 4 with 100 parts by weight of a styrene resin comprising 70/30 mixture of HIPS-1 and GPPS-1 was processed in the same manner as in Example 6 to prepare specimens to be evaluated for MFR, Izod impact strength, Vicat softening temperature and flame retardance. The results are set forth in Table 4 and FIGS. 3 and 4. The specimens thus obtained were each measured for the total content of the remaining styrene monomer and dimerization and trimerization products of styrene in accordance with the measuring method described above. As a result, the forego- Table 4 and FIGS. 3 and 4 show that the aromatic phosphate of the present invention (BNPP) exhibits an excellent balance between flame retardance and physical properties while TNPP and the oligomeric aromatic phosphate (fr-1) provides a reduced flame retardance when used in the same amount as BNPP and reduced heat resistance and impact strength when used in a greater amount.

TABLE 4

|  | Examples | | | | Comparative Examples | | | | | | | |
|---|---|---|---|---|---|---|---|---|---|---|---|---|
|  | 15 | 16# | 17# | 8 | 18 | 19 | 20 | 21 | 22 | 23 | 24 | 25 |
| Resin composition | | | | | | | | | | | | |
| HIPS-1 | 70 | 70 | 70 | 70 | 70 | 70 | 70 | 70 | 70 | 70 | 70 | 70 |
| GPPS-1 | 30 | 30 | 30 | 30 | 30 | 30 | 30 | 30 | 30 | 30 | 30 | 30 |
| Aromatic phosphate | BNPP(bis(nonylphenyl-phosphate) | | | | TNPP(tris(nonylphenyl)-phosphate) | | | | fr-1(oligomeric aromatic phosphate) | | | |
| Add parts by weight | 3 | 5 | 6 | 8 | 3 | 5 | 6 | 8 | 3 | 5 | 6 | 8 |
| Evaluation of molded product | | | | | | | | | | | | |
| Flame retardance | | | | | | | | | | | | |
| Average flame-out time (sec.) | 25 | 20 | 16 | 8 | 45 | 40 | 36 | 26 | 69 | 51 | 42 | 29 |
| Dripping of flaming particles | Yes | Yes | Yes | Yes | Yes | Yes | Yes | Yes | Yes | Yes | Yes | Yes |
| UL-94 judgement | V-2 | V-2 | V-2 | V-2 | HB* | HB* | HB* | HB* | HB* | HB* | HB* | HB* |
| MFR (g/10 min) | 10.1 | 11.8 | 14.0 | 18.4 | 7.6 | 10.5 | 12.0 | 14.9 | 6.9 | 10.0 | 11.2 | 13.9 |
| Izod impact strength (kgcm/cm) | 9.3 | 8.7 | 8.4 | 7.8 | 9.3 | 8.6 | 8.2 | 7.5 | 8.8 | 8.1 | 7.8 | 7.0 |
| Vicat softening temperature (° C.) | 101 | 96 | 94 | 89 | 102 | 97 | 95 | 90 | 103 | 98 | 96 | 91 |

Indicates preferred examples (hereinafter the same)

EXAMPLES 19 AND 20 AND COMPARATIVE EXAMPLES 26 AND 27

The monomeric aromatic phosphates set forth in Table 5 were each examined for light resistance in accordance with the testing method described above. The results are set forth in Table 5.

Table 5 shows that the monomeric aromatic phosphate containing isopropyl group exhibits a high viscosity and shows a great color hue and acid value change in the light resistance test.

TABLE 5

| Example No. | Monomeric alkyl group-substituted aromatic phosphate | | | % Change from before to after light resistance test | | |
| --- | --- | --- | --- | --- | --- | --- |
| | Total number of carbon atoms in substituents | Name | 25° C. viscosity (CS) | Color hue (Gardner) | Acid value (mgKOH/g) | Thermal discoloration (300° C., 1 hr.) |
| Example 19# | 18 | Bis(nonylphenyl)phenyl | 1,900 | 250 | 16 | 300 |
| Comparative Example 26 | 18 | Tris(diisopropylphenyl) phosphate | 18,000 | 5,000 | 257 | 6,000 |
| Comparative Example 27 | 18 | Tris(phenylphenyl) phosphate | 15,000 | 3,500 | 160 | 4,600 |
| Example 20 | 16 | Bis(isobutylphenyl)- diisobutylphenyl phosphate | 7,000 | 300 | 51 | 450 |

EXAMPLES 21 TO 23 AND COMPARATIVE EXAMPLES 28 AND 29

A composition obtained by compounding the aromatic phosphate set forth in Table 6 with 100 parts by weight of a styrene resin comprising 70/30 mixture of HIPS-1 and GPPS-1 was processed in the same manner as in Example 6 to prepare specimens to be evaluated for MFR, Izod impact strength, Vicat softening temperature and flame retardance. The results are set forth in Table 6. The specimens thus obtained were each measured for the total content of the remaining styrene monomer and dimerization and trimerization products of styrene in accordance with the measuring method described above. As a result, the foregoing residues were detected in an amount of from 1.1 to 1.5% by weight in all the specimens.

Table 6 shows that the monomeric phosphate having a plurality of aromatic rings substituted by only one alkyl group has a better heat resistance than the monomeric phosphate having only one aromatic ring substituted by only one long-chain alkyl group even if the total number of carbon atoms in the substituents on the aromatic phosphate. It can also be seen that the aromatic phosphate containing hydroxyl group has an excellent heat resistance.

EXAMPLES 24 TO 33

Monomeric aromatic phosphates obtained under different purification conditions during the purification of FR-1 for the separation of BNPP (set forth in Table 7) were examined for thermal discoloration resistance in accordance with the method described above.

A composition obtained by compounding the aromatic phosphate set forth in Table 7 with 100 parts by weight of a styrene resin comprising 70/30 mixture of HIPS-1 and GPPS-1 was processed in the same manner as in Example 6 to prepare specimens to be evaluated for MFR, Izod impact strength, Vicat softening temperature and flame retardance. The results are set forth in Table 7. The specimens thus obtained were each measured for the total content of the remaining styrene monomer and dimerization and trimerization products of styrene in accordance with the measuring method described above. As a result, the foregoing residues were detected in an amount of from 1.1 to 1.5% by weight in all the specimens.

Table 7 shows that the more the amount of remaining aluminum and nonylphenol as a starting material are, or the higher the acid value is, the more liable to thermal discoloration is the resin composition, and the lower are the flame retardance and heat resistance thereof. It can also be seen

TABLE 6

| | Comparative Examples | | Examples | | |
| --- | --- | --- | --- | --- | --- |
| | 28 | 29 | 21 | 22# | 23# |
| Resin composition | | | | | |
| HIPS-1 | 70 | 70 | 70 | 70 | 70 |
| GPPS-1 | 30 | 30 | 30 | 30 | 30 |
| Added parts by weight of aromatic phosphate | 7 | 7 | 7 | 7 | 7 |
| Name | Triphenyl phosphate (TPP) | Nonylphenyl- diphenyl phosphate | Octyldecyl- phenyl diphenyl phosphate | Bis(nonylphenyl) phenyl phosphate | Bis(nonylphenyl) resorcinyl phosphate |
| Total number of carbon atoms in substituents | 0 | 9 | 18 | 18 | 18 |
| Evaluation of molded product | | | | | |
| Flame retardance | | | | | |
| Average flame-out time (sec.) | 14 | 13 | 14 | 14 | 15 |
| Dripping of flaimg particles | Yes | Yes | Yes | Yes | Yes |
| UL-94 judgement | V-2 | V-2 | V-2 | V-2 | V-2 |
| MFR (g/10 min) | 20 | 18 | 21 | 16 | 14 |
| Izod impact strength (kgcm/cm) | 8.4 | 8.4 | 8.0 | 8.1 | 7.8 |
| Vicat softening temperature (° C.) | 87 | 89 | 84 | 92 | 95 |
| 1 wt % weight loss temperature (° C.) | 208 | 231 | 280 | 281 | 278 | that the use of a hindered phenol oxidation inhibitor provides an improvement in thermal discoloration resistance.

TABLE 7

|  | Examples | | | | | | | | | |
|---|---|---|---|---|---|---|---|---|---|---|
|  | 24 | 25 | 26 | 27 | 28# | 29# | 30 | 31 | 32 | 33# |
| Resin composition | | | | | | | | | | |
| HIPS-1 | 70 | 70 | 70 | 70 | 70 | 70 | 70 | 70 | 70 | 70 |
| GPPS-1 | 30 | 30 | 30 | 30 | 30 | 30 | 30 | 30 | 30 | 30 |
| Added parts by weight of aromatic phosphate (BNPP) | 7 | 7 | 7 | 7 | 7 | 7 | 7 | | | |
| Aluminum content (PPM) | 59 | 58 | 61 | 57 | 60 | 1.4 | 723 | 985 | 1050 | 1050 |
| Nonylphenol content (%) | 1.5 | 1.0 | 0.3 | 0.3 | 0.3 | 0.4 | 0.4 | 0.3 | 0.4 | 0.4 |
| Acid value (mgKOH/g) | 1.0 | 1.1 | 1.0 | 1.5 | 0.3 | 0.2 | 0.2 | 0.4 | 0.4 | 0.4 |
| Antioxidant content (AO) (PPM) | 0 | 0 | 0 | 0 | 0 | 0 | 0 | 0 | 0 | 500 |
| Thermal discoloration resistance (% Change) | 12000 | 3000 | 600 | 6600 | 300 | 200 | 600 | 700 | 5300 | 500 |
| Evaluation of molded product Flame retardance | | | | | | | | | | |
| Average flame-out tiem (sec.) | 12 | 12 | 12 | 13 | 10 | 11 | 13 | 12 | 25 | 25 |
| Dripping of flaming particles | Yes | Yes | Yes | Yes | Yes | Yes | Yes | Yes | Yes | Yes |
| UL-94 judgement | V-2 | V-2 | V-2 | V-2 | V-2 | V-2 | V-2 | V-2 | V-2 | V-2 |
| MFR (g/10 min) | 16 | 15 | 14 | 15 | 14 | 14 | 15 | 14 | 16 | 16 |
| Izod impact strength (kgcm/cm) | 8.1 | 8.7 | 8.8 | 8.6 | 8.9 | 8.8 | 8.7 | 8.8 | 7.8 | 7.8 |
| Vicat softening temperature (° C.) | 92 | 94 | 95 | 93 | 96 | 97 | 96 | 96 | 93 | 93 |

EXAMPLES 34 TO 39

A composition obtained by compounding 6 parts by weight of BNPP with 100 parts by weight of HIPS having a reduced viscosity ηSP/C as set forth in Table 8 was processed in the same manner as in Example 6 to prepare specimens to be evaluated for MFR, Izod impact strength, Vicat softening temperature and flame retardance. The results are set forth in Table 8. The specimens thus obtained were each measured for the total content of the remaining styrene monomer and dimerization and trimerization products of styrene in accordance with the measuring method described above. As a result, the foregoing remaining monomers and oligomers were detected in an amount of from 1.1 to 1.5% by weight in all the specimens.

Table 8 shows that the smaller the reduced viscosity ηSP/C as an index of the molecular weight of HIPS is, the better is the dripping flame retardance. In particular, when ηSP/C is from 0.4 to 0.6, the balance of melt flowability impact strength and flame retardance is excellent.

TABLE 8

|  |  | Examples | | | | | |
|---|---|---|---|---|---|---|---|
|  |  | 34 | 35 | 36# | 37# | 38# | 39 |
| Resin composition | ηSP/C | | | | | | |
| HIPS-2 | 0.79 | 100 | | | | | |
| HIPS-3 | 0.60 | | 100 | | | | |
| HIPS-4 | 0.58 | | | 100 | | | |
| HIPS-1 | 0.53 | | | | 100 | | |
| HIPS-5 | 0.40 | | | | | 100 | |
| HIPS-6 | 0.35 | | | | | | 100 |
| BNPP |  | 6 | 6 | 6 | 6 | 6 | 6 |

TABLE 8-continued

|  | Examples | | | | | |
|---|---|---|---|---|---|---|
|  | 34 | 35 | 36# | 37# | 38# | 39 |
| Evaluation of molded product | | | | | | |
| Flame retardance | | | | | | |
| Average flame-out tiem (sec.) | 25 | 23 | 18 | 15 | 12 | 10 |
| Dripping of flaming particles | Yes | Yes | Yes | Yes | Yes | Yes |
| UL-94 judgement | V-2 | V-2 | V-2 | V-2 | V-2 | V-2 |
| MFR (g/min) | 10 | 11 | 12 | 13 | 14 | 17 |
| Izod impact strength (kgcm/cm) | 13 | 11 | 10 | 9 | 8 | 5 |
| Vicat softening temperature (° C.) | 95 | 95 | 95 | 95 | 94 | 94 |

EXAMPLES 40 TO 50

A composition obtained by compounding 7 parts by weight of BNPP with 100 parts by weight of a styrene resin comprising a 70/30 mixture of HIPS-1/GPPS or rubber-unmodified copolymer styrene resin set forth in Table 9 was processed in the same manner as in Example 6 to prepare specimens to be evaluated for MFR, Izod impact strength, Vicat softening temperature and flame retardance. The results are set forth in Table 9. The specimens thus obtained were each measured for the total content of the remaining styrene monomer and dimerization and trimerization products of styrene in accordance with the measuring method described above. As a result, the foregoing remaining monomers and oligomers were detected in an amount of from 1.1 to 1.5% by weight in all the specimens.

Table 9 shows that GPPS having a low molecular weight exhibits a better dripping flame retardance than the others. In particular, the use of GPPS having a weight-average molecular weight of from 130,000 to 220,000 provides an excellent balance of melt flowability, impact strength and flame retardance. Further, the styrene resin obtained by the copolymerization of methacrylic acid or maleic anhydride exhibits an excellent heat resistance. Moreover, styrene resin copolymerized with α-methylstyrene or butyl acrylate are excellent in dripping flame retardance.

In Table 9, Example 40 is the same as Example 22, which is cited for reference.

the extruder where the mixture was then melt-kneaded at a temperature of 240° C., 295 rpm and an output of 80 kg/hr.

The pellets thus obtained were then processed by an injection molding machine (Type IS80A, available from Toshiba Machine Co., Ltd.) at a cylinder temperature of 230° C. and a mold temperature of 60° C. to prepare specimens to be evaluated for MFR, Izod impact strength, dart impact strength, flexural strength, flexural modulus, Vicat softening temperature, heat distortion temperature and

TABLE 9

| Properties | Example | | | | | | | | | | |
| --- | --- | --- | --- | --- | --- | --- | --- | --- | --- | --- | --- |
| | 40 | 41# | 42# | 43 | 44 | 45 | 46 | 47 | 48 | 49 | 50 |
| Resin composition | | | | | | | | | | | |
| HIPS-1 | 70 | 70 | 70 | 70 | 70 | 70 | 70 | 70 | 70 | 70 | 70 |
| Weight-average molecular weight | | | | | | | | | | | |
| GPPS-1 212,000 | 30 | | | | | | | | | | |
| GPPS-2 160,000 | | 30 | | | | | | | | | |
| GPPS-3 135,000 | | | 30 | | | | | | | | |
| GPPS-4 101,000 | | | | 30 | | | | | | | |
| Methacrylic acid content | | | | | | | | | | | |
| SMAA-1 8% | | | | | 30 | | | | | | |
| SMAA-2 7% | | | | | | 30 | | | | | |
| SMAA-3 4% | | | | | | | 30 | | | | |
| Maleic anhydride content | | | | | | | | | | | |
| SMA-1 8% | | | | | | | | 30 | | | |
| SMA-2 15% | | | | | | | | | 30 | | |
| α-Methylstyrene content | | | | | | | | | | | |
| SMS 4% | | | | | | | | | | 30 | |
| Butyl acrylate content | | | | | | | | | | | |
| SBA 4% | | | | | | | | | | | 30 |
| BNPP | 7 | 7 | 7 | 7 | 7 | 7 | 7 | 7 | 7 | 7 | 7 |
| Evaluation of molded product | | | | | | | | | | | |
| Flame retardance | | | | | | | | | | | |
| Average flame-out tiem (sec.) | 14 | 13 | 12 | 11 | 25 | 22 | 20 | 24 | 25 | 10 | 10 |
| Dripping of flaming particles | Yes | Yes | Yes | Yes | Yes | Yes | Yes | Yes | Yes | Yes | Yes |
| UL-94 judgement | V-2 | V-2 | V-2 | V-2 | V-2 | V-2 | V-2 | V-2 | V-2 | V-2 | V-2 |
| MFR (g/min) | 16 | 17 | 19 | 21 | 9 | 15 | 16 | 9 | 8 | 16 | 25 |
| Izod impact strength (kgcm/cm) | 8 | 8 | 7 | 5 | 9 | 8 | 9 | 10 | 9 | 9 | 10 |
| Viact softening temperature (° C.) | 92 | 92 | 92 | 92 | 96 | 95 | 94 | 95 | 97 | 93 | 88 |

EXAMPLES 51 TO 60

HIPS-1, GPPS-1, PPE set forth in Table 10, and BNPP were mixed in a weight proportion of 65/35/(amount set forth in Table 10)/7. The mixture was then melt-extruded through a side-feedable twin-screw extruder (ZSK-40 mmϕ, available from Werner Pfleiderer Corp.). In some detail, PPE/GPPS mixture was melted at a temperature of 320° C. in the stage preceding the extruder. The rest of the resin component and BNPP were side-fed in the stage succeeding flame retardance. The results are set forth in Table 10 and FIG. 5. The specimens thus obtained were each measured for the total content of the remaining styrene monomer and dimerization and trimerization products of styrene in accordance with the measuring method described above. As a result, the foregoing remaining monomers and oligomers were detected in an amount of from 1.1 to 1.5% by weight in all the specimens.

TABLE 10

| Properties | Examples | | | | | | | | | |
| --- | --- | --- | --- | --- | --- | --- | --- | --- | --- | --- |
| | 51 | 52 | 53# | 54# | 55 | 56 | 57 | 58# | 59 | 60 |
| Resin composition | | | | | | | | | | |
| HIPS-1 | 65 | 65 | 65 | 65 | 65 | 65 | 65 | 65 | 65 | 65 |
| GPPS-1 | 35 | 35 | 35 | 35 | 35 | 35 | 35 | 35 | 35 | 35 |
| Polyphenylene ether (part by weight) | 0 | 1 | 7 | 9 | 13 | 15 | 7 | 7 | 7 | 7 |

TABLE 10-continued

| Properties | Examples | | | | | | | | | |
|---|---|---|---|---|---|---|---|---|---|---|
| | 51 | 52 | 53# | 54# | 55 | 56 | 57 | 58# | 59 | 60 |
| Reduced viscosity (ηSP/C) | | 0.41 | 0.41 | 0.41 | 0.41 | 0.41 | 0.25 | 0.30 | 0.60 | 0.65 |
| BNPP | 7 | 7 | 7 | 7 | 7 | 7 | 7 | 7 | 7 | 7 |
| Evaluation of molded product Flame retardance | | | | | | | | | | |
| Average flame-out time (sec.) | 13.3 | 13.4 | 15.2 | 16.5 | 20.1 | 23.8 | 11.9 | 13.1 | 18.9 | 23.1 |
| Dripping of flaming particles | Yes | Yes | Yes | Yes | Yes | Yes | Yes | Yes | Yes | Yes |
| UL-94 judgement | V-2 | V-2 | V-2 | V-2 | V-2 | V-2 | V-2 | V-2 | V-2 | V-2 |
| MFR (g/min) | 16.6 | 15.0 | 8.4 | 8.0 | 4.5 | 4.0 | 15.1 | 12.1 | 7.8 | 5.0 |
| Izod impact strength (kgcm/cm) | 7.2 | 7.2 | 7.1 | 7.1 | 7.1 | 7.2 | 4.1 | 6.1 | 8.3 | 9.1 |
| Dart impact strength (kgcm) | 38.9 | 39.0 | 39.1 | 45.8 | 47.1 | 48.5 | 19.9 | 29.0 | 43.1 | 50.0 |
| Flexural strength (kg/cm$^2$) | 400 | 420 | 470 | 510 | 540 | 560 | 370 | 440 | 480 | 490 |
| Flexural modulus (kg/cm$^2$) | 25300 | 25400 | 25500 | 25700 | 25900 | 26000 | 24500 | 25000 | 26000 | 26500 |
| Vicat softening temperature (° C.) | 92 | 94 | 98 | 101 | 105 | 106 | 97 | 98 | 98 | 99 |
| Heat distortion temperature (° C.) | 72 | 75 | 78 | 79 | 81 | 82 | 77 | 78 | 78 | 79 |

Figure 5:
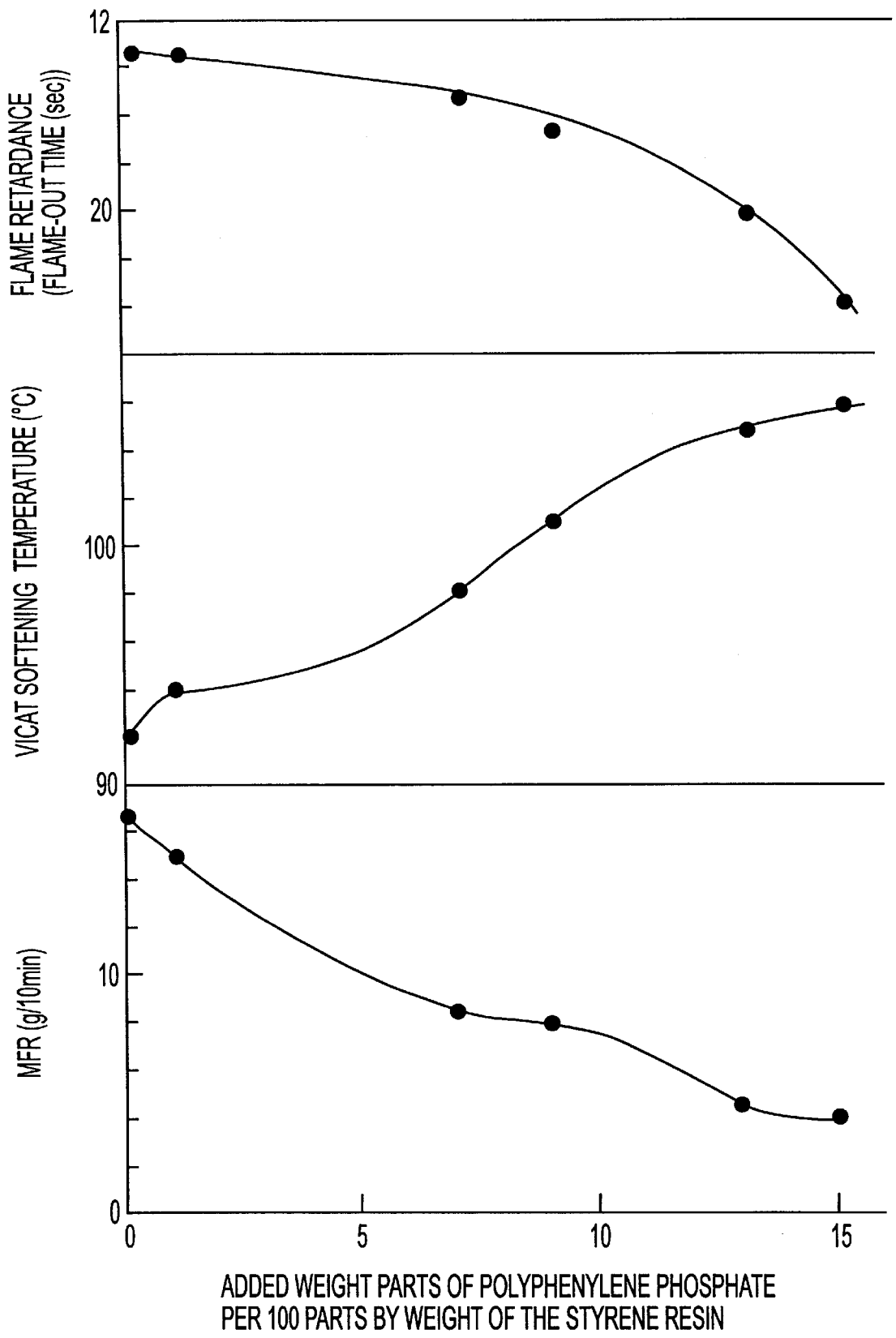
FIG. 5 illustrates the relationship of the added parts of PPE based on 100 parts by weight of the rubber-modified styrene resin with MFR, Vicat softening temperature and flame retardance as set forth in Table 10.

Table 10 and FIG. 5 show that the presence of PPE provides an improved balance between heat resistance and rigidity. In particular, when PPE is incorporated in a rubber-modified styrene resin in an amount of from 3 to 8 parts by weight to provide a reduced viscosity ηSP/C of from 0.3 to 0.6, the balance of melt flowability, heat resistance, rigidity, impact strength and flame retardance can be remarkably improved.

EXAMPLES 61 TO 65

The rubber-modified styrene resin comprising HIPS-1 and HIPS-7 in a proportion set forth in Table 11, GPPS-1, PPE-1 and BNPP were mixed in a weight proportion of 60/40/7/7. The mixture was then examined and evaluated in the same manner as in Example 51. The results are set forth in Table 11 and FIG. 6. The specimens thus obtained were each measured for the total content of the remaining styrene monomer and dimerization and trimerization products of styrene in accordance with the measuring method described above. As a result, the foregoing remaining monomers and oligomers were detected in an amount of from 1.1 to 1.5% by weight in all the specimens.

TABLE 11

| Properties | Examples | | | | |
|---|---|---|---|---|---|
| | 61 | 62# | 63# | 64 | 65 |
| Resin composition | | | | | |
| HIPS-1 (large size particulate rubber) | 60 | 45 | 30 | 15 | 0 |
| HIPS-7 (small size particulate rubber) | 0 | 15 | 30 | 45 | 60 |
| GPPS-1 | 40 | 40 | 40 | 40 | 40 |
| PPE-1 | 7 | 7 | 7 | 7 | 7 |
| BNPP | 7 | 7 | 7 | 7 | 7 |
| Evaluation of molded product | | | | | |
| Flame retardance | | | | | |
| Average flame-out time (sec.) | 15 | 16 | 15 | 16 | 17 |

TABLE 11-continued

| Properties | Examples | | | | |
|---|---|---|---|---|---|
| | 61 | 62# | 63# | 64 | 65 |
| Dripping of flaming particles | Yes | Yes | Yes | Yes | Yes |
| UL-94 judgement | V-2 | V-2 | V-2 | V-2 | V-2 |
| MFR (g/10 min) | 8.5 | 8.4 | 8.4 | 8.4 | 8.3 |
| Izod impact strength (kgcm/cm) | 6.7 | 7.1 | 7.4 | 6.3 | 5.1 |
| Dart impact strength (kgcm) | 29.0 | 31.0 | 33.0 | 21.0 | 10.0 |
| Flexural strength (kg/cm$^2$) | 485 | 510 | 540 | 580 | 620 |
| Flexural modulus (kg/cm$^2$) | 26600 | 27400 | 28100 | 28500 | 29000 |
| Vicat softening temperature (° C.) | 99 | 99 | 98 | 98 | 98 |
| Gloss (%) | 41 | 54 | 66 | 78 | 90 |

Figure 6:
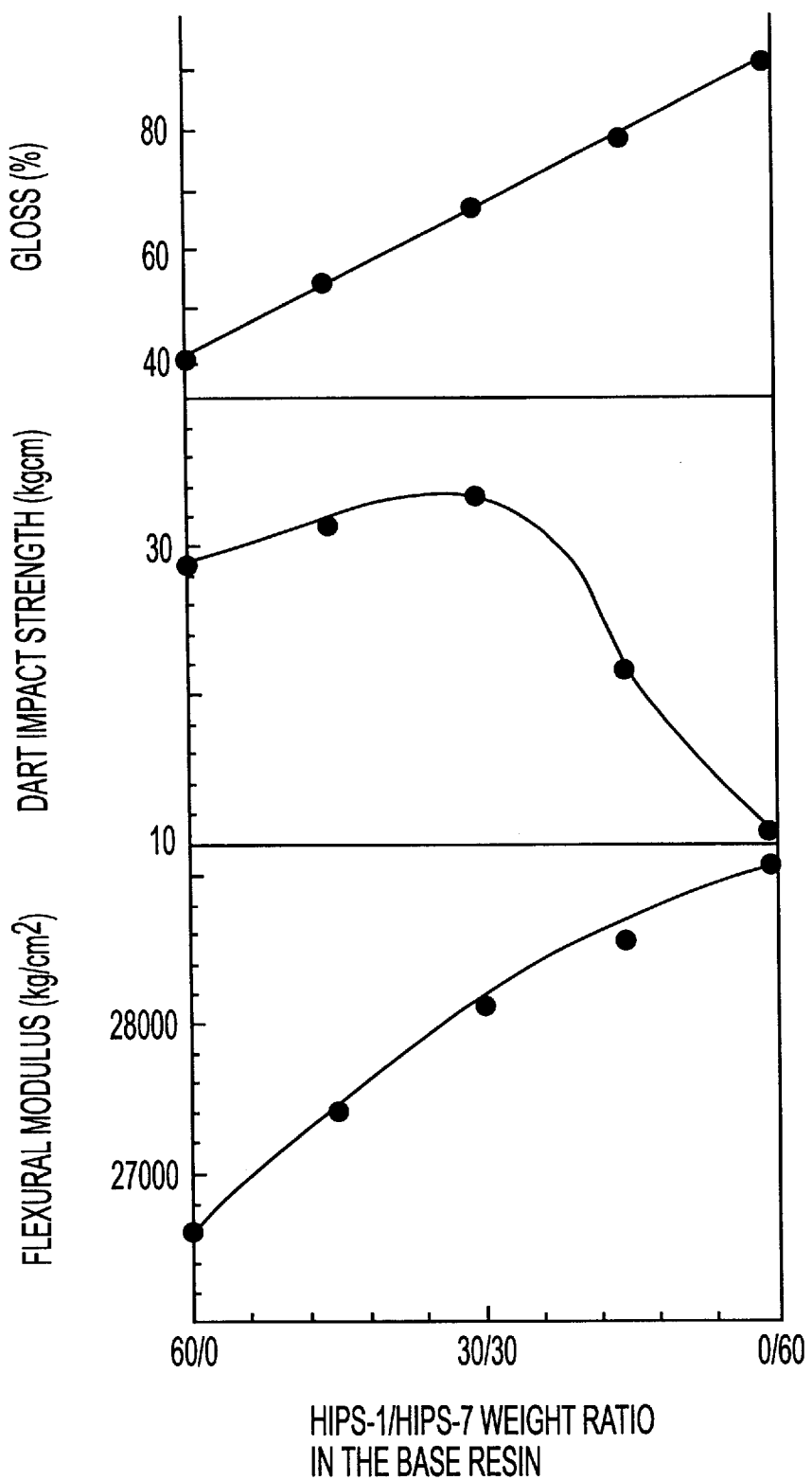
FIG. 6 illustrates the relationship of the composition ratio of HIPS as large size particulate rubber to HIPS as small size particulate rubber (of Examples 61–65) with dart impact strength (kgcm (2 mm thick)), flexural modulus (kg/cm$^2$) and gloss.

Table 11 and FIG. 6 show that the use of HIPS comprising a large size particulate rubber and a small size particulate rubber provides a remarkable improvement in the balance of external appearance (gloss), rigidity and impact strength.

EXAMPLES 66 TO 68

HIPS-1, GPPS set forth in Table 12, PPE-1 and BNPP were mixed in a weight proportion of 60/40/6/6. The mixture was then examined and evaluated in the same manner as in Example 51. The results are set forth in Table 12 and FIG. 7. The specimens thus obtained were each measured for the total content of the remaining styrene monomer and dimerization and trimerization products of styrene in accordance with the measuring method described above. As a result, the foregoing remaining monomers and oligomers were detected in an amount of from 1.1 to 1.5% by weight in all the specimens.

TABLE 12

| Properties | Examples | | |
|---|---|---|---|
| | 66 | 67# | 68 |
| Resin composition | | | |
| HIPS-1 | 60 | 60 | 60 |
| GPPS-1 Weight-average molecular weight 212,000 | 40 | 20 | 0 |
| GPPS-2 Weight-average molecular weight 160,000 | 0 | 20 | 40 |
| PPE-1 | 6 | 6 | 6 |
| BNPP | 6 | 6 | 6 |
| Evaluation of molded product | | | |
| Flame retardance | | | |
| Average flame-out time (sec.) | 18 | 16 | 14 |
| Dripping of flaming particles | Yes | Yes | Yes |
| UL-94 judgement | V-2 | V-2 | V-2 |
| MFR (g/10 min) | 8.3 | 9.8 | 11.5 |
| Izod impact strength (kgcm/cm) | 7.0 | 6.7 | 6.3 |
| Dart impact strength (kgcm) | 27.0 | 32.0 | 34.0 |
| Flexural strength (kg/cm$^2$) | 485 | 480 | 475 |
| Flexural modulus (kg/cm$^2$) | 27200 | 27600 | 26600 |
| Vicat softening temperature (° C.) | 99 | 99 | 99 |

Figure 7:
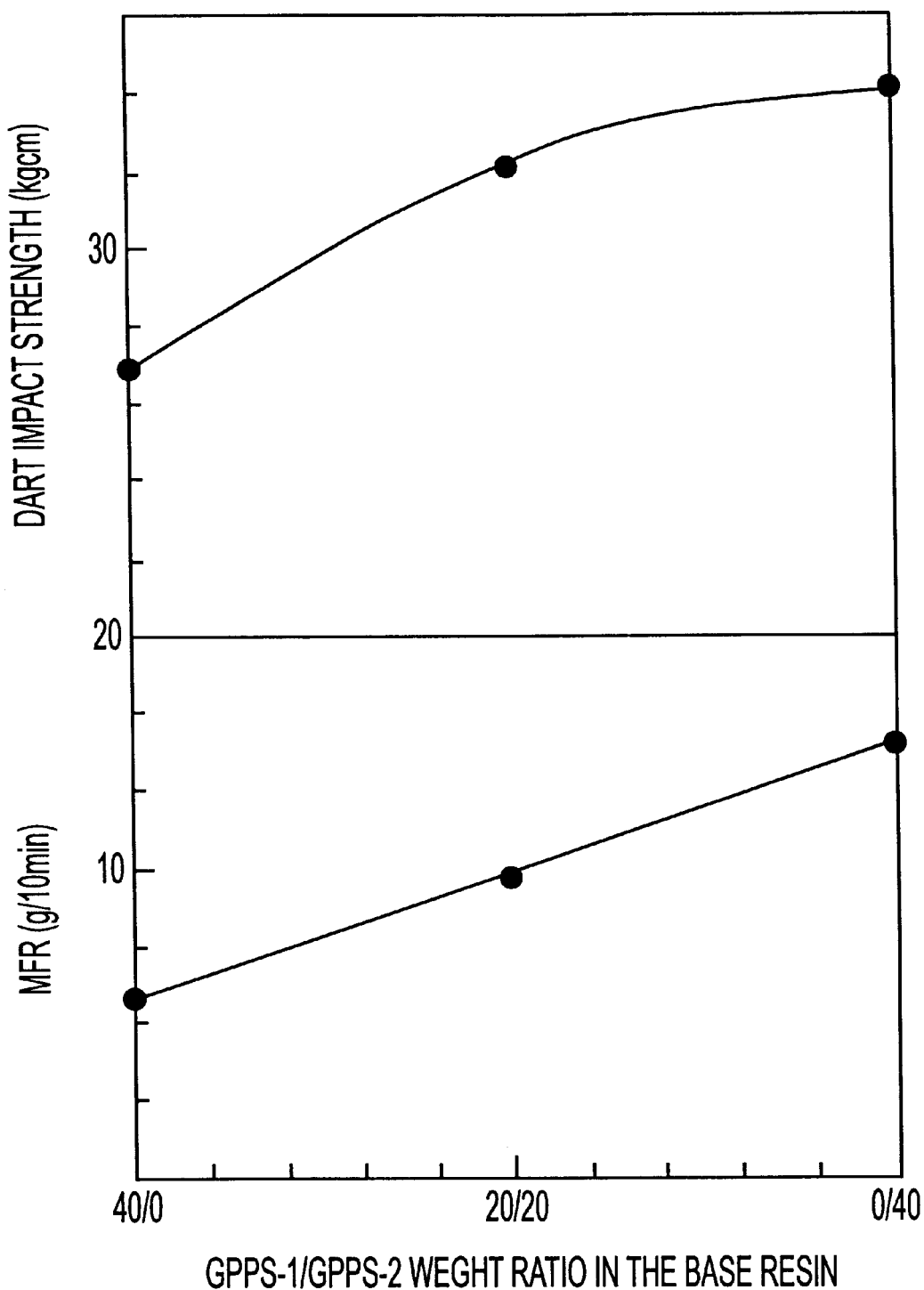
FIG. 7 illustrates the relationship of the composition ratio of GPPS's having different molecular weights in the rubber-modified styrene resins (of Examples 66–68) with dart impact strength (kgcm (2 mm thick)) and MFR (g/10 min.)

Table 12 and FIG. 7 show that the combination of GPPS's having a high molecular weight and a low molecular weight provides a remarkable improvement in the balance of melt flowability, rigidity and impact strength.

EXAMPLES 69 TO 85 AND COMPARATIVE EXAMPLES 30 TO 34

HIPS-1, GPPS-1, PPE-1, NDPP set forth in Tables 13-1 and 13-2, BNPP and TNPP were mixed in a weight proportion of 70/30/7. The mixture was then examined and evaluated in the same manner as in Example 51. The results are set forth in Tables 13-1 and 13-2 and FIG. 8. The specimens thus obtained were each measured for the total content of the remaining styrene monomer and dimerization and trimerization products of styrene in accordance with the measuring method described above. As a result, the foregoing remaining monomers and oligomers were detected in an amount of from 1.1 to 1.5% by weight in all the specimens.

Figure 8:
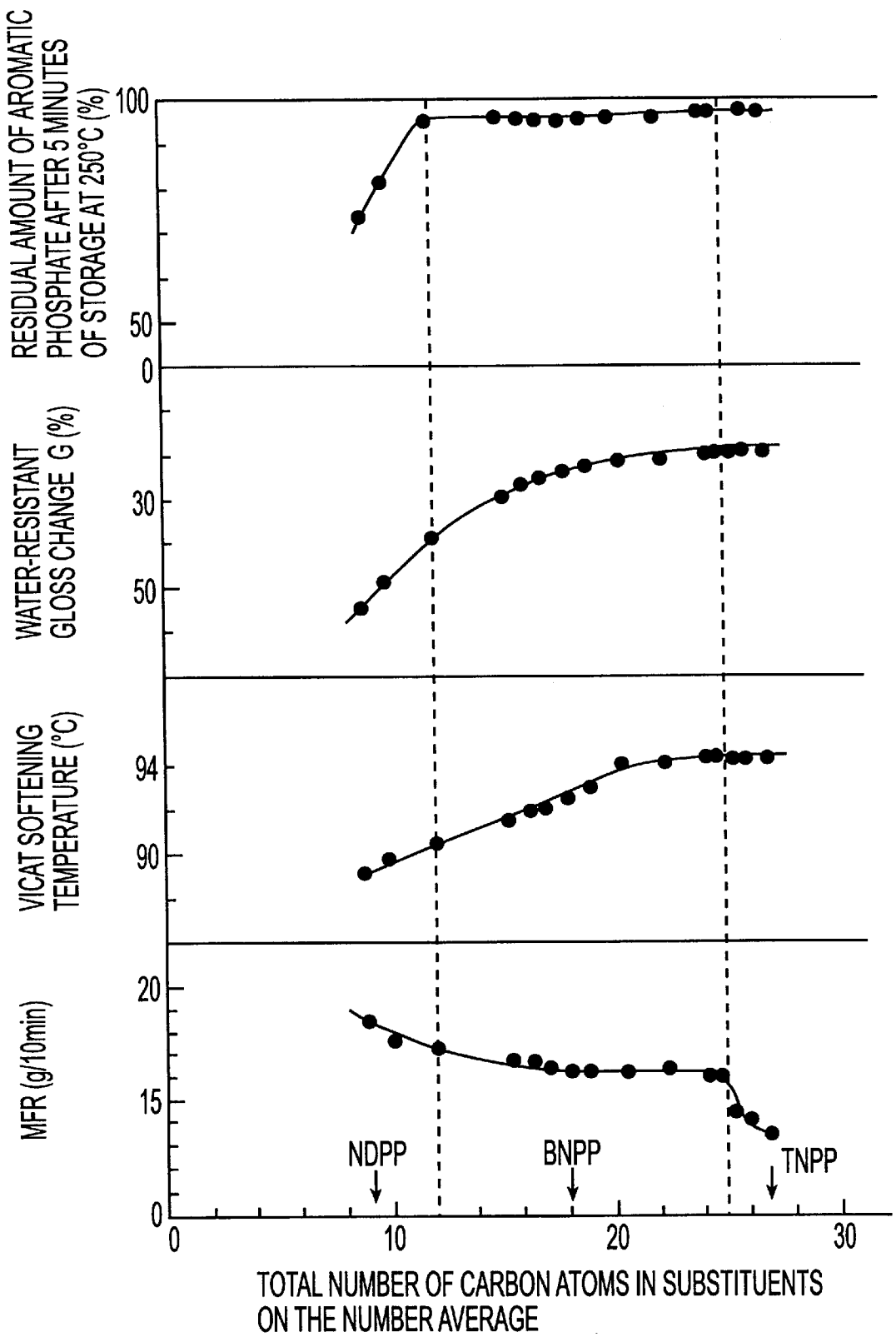
FIG. 8 illustrates the relationship of the total number of carbon atoms in the substituents of monomeric aromatic phosphates obtained by changing the percent composition of monomeric aromatic phosphates comprising NDPP, BNPP and TNPP as set forth in Tables 13-1 and 13-2 on the number average with MFR, Vicat softening temperature, remaining amount after 5 minutes of storage at 250° C. (TGA process) and water-resistant gloss retention.

Tables 13-1 and 13-2 and FIG. 8 show that if the total number of carbon atoms in the substituents is from 12 to 25 on the number average, i.e., if NPDP content is from 1 to 80% by weight, BNPP content is from 1 to 98% by weight, and TNPP content is from 1 to 98% by weight, the balance of flame retardance, non-volatility, melt flowability, impact resistance, impact strength, water-resistant gloss retention, and surface hardness of molded product thus obtained is excellent. In particular, as compared with a simple average of NDPP and TNPP, the mixture of the foregoing three kinds of monomeric phosphates provides improvements in water-resistant gloss retention and Vicat softening temperature (the curve bends upward in FIG. 8). A mixture of monomeric aromatic phosphates substituted by different numbers of nonyl groups can exert a unique effect.

TABLE 13-1

| | Comparative Examples | | | | | Examples | | | | | | |
|---|---|---|---|---|---|---|---|---|---|---|---|---|
| Properties | 30 | 31 | 32 | 33 | 34 | 69 | 70 | 71 | 72 | 73 | 74 | 75 |
| Resin composition | | | | | | | | | | | | |
| HIPS-1 | 70 | 70 | 70 | 70 | 70 | 70 | 70 | 70 | 70 | 70 | 70 | 70 |
| GPPS-1 | 30 | 30 | 30 | 30 | 30 | 30 | 30 | 30 | 30 | 30 | 30 | 30 |
| Add parts by weight of aromatic phosphate | 7 | 7 | 7 | 7 | 7 | 7 | 7 | 7 | 7 | 7 | 7 | 7 |
| Total number of carbon atoms in substituents on the number average | 9 | 27 | 9.9 | 26.1 | 25.2 | 18 | 12.2 | 15.3 | 18.0 | 20.7 | 24.3 | 24.6 |
| Nonyl phenyl diphenyl phosphate (NDPP) Total number of carbon atoms in substituents: 9 | 100 | 0 | 90 | 0 | 10 | 0 | 80 | 60 | 45 | 30 | 10 | 1 |
| Bis(nonylphenyl)phenyl phosphate (BNPP) Total number of carbon atoms in substituents: 18 | 0 | 100 | 10 | 10 | 0 | 100 | 5 | 10 | 10 | 10 | 10 | 20 |
| Tris(nonylphenyl) phosphate (TNPP) Total number of carbon atoms in substituents: 27 | 0 | 100 | 0 | 90 | 90 | 0 | 15 | 30 | 45 | 60 | 80 | 74 |
| Evaluation of molded product | | | | | | | | | | | | |
| Flame retardance | | | | | | | | | | | | |
| Average flame-out time (sec.) | 13 | 28 | 16 | 27 | 26 | 14 | 13 | 14 | 14 | 14 | 16 | 15 |
| Dripping of flaiming particles | Yes | Yes | Yes | Yes | Yes | Yes | Yes | Yes | yes | Yes | Yes | Yes |
| UL-94 judgement | V-2 | HB* | V-2 | HB* | HB* | V-2 | V-2 | V-2 | V-2 | V-2 | V-2 | V-2 |
| MFR (g/10 min) | 18.3 | 13.0 | 17.5 | 13.8 | 14.0 | 16.0 | 17.2 | 16.6 | 16.1 | 16.0 | 15.9 | 15.8 |
| Izod impact strength (kgcm/cm) | 8.4 | 7.9 | 8.4 | 7.9 | 7.9 | 8.1 | 8.3 | 8.2 | 8.1 | 8.1 | 8.0 | 8.0 |
| Vicat softening temperature (° C.) | 89.0 | 94.0 | 89.5 | 94.1 | 94.0 | 92.3 | 90.4 | 91.4 | 92.2 | 93.9 | 94.0 | 94.1 |
| Water-resistant gloss retention (ΔG) (%) | 55 | 21 | 49 | 21 | 21 | 25 | 40 | 31 | 25 | 23 | 21 | 21 |
| Pencil hardness | 3B | B | 3B | B | B | 2B | 2B | 2B | 2B | B | B | B |
| Residual amount after 5 minutes of 250° C. storage (TGA method) (%) | 75 | 97 | 82 | 97 | 97 | 96 | 95 | 96 | 96 | 97 | 97 | 97 |

TABLE 13-2

| Properties | Examples | | | | | | | | | |
|---|---|---|---|---|---|---|---|---|---|---|
| | 76 | 77 | 78 | 79 | 80 | 81 | 82 | 83 | 84 | 85 |
| Resin composition | | | | | | | | | | |
| HIPS-1 | 70 | 70 | 70 | 70 | 70 | 70 | 70 | 70 | 70 | 70 |
| GPPS-1 | 30 | 30 | 30 | 30 | 30 | 30 | 30 | 30 | 30 | 30 |
| Add parts by weight of aromatic phosphate | 7 | 7 | 7 | 7 | 7 | 7 | 7 | 7 | 7 | 7 |
| Total number of carbon atoms in substituents on the number average | 22.3 | 20.7 | 18.9 | 18.0 | 17.1 | 15.3 | 18.0 | 16.4 | 22.5 | 18.1 |
| Nonyl phenyl diphenyl phosphate (NDPP) | 1 | 10 | 20 | 25 | 30 | 40 | 10 | 19 | 10 | 2 |
| Total number of carbon atoms in substituents: 9 | | | | | | | | | | |
| Bis(nonylphenyl)phenyl phosphate (BNPP) | 50 | 50 | 50 | 50 | 50 | 50 | 80 | 80 | 30 | 95 |
| Total number of carbon atoms in substituents: 18 | | | | | | | | | | |
| Tris(nonylphenyl) phosphate (TNPP) | 49 | 40 | 30 | 25 | 20 | 10 | 10 | 1 | 60 | 3 |
| Total number of carbon atoms in substituents: 27 | | | | | | | | | | |
| Evaluation of molded product | | | | | | | | | | |
| Flame retardance | | | | | | | | | | |
| Average flame-out time (sec.) | 15 | 13 | 14 | 14 | 13 | 14 | 14 | 14 | 16 | 14 |
| Dripping of flaming particles | Yes | Yes | Yes | Yes | Yes | Yes | Yes | Yes | yes | Yes |
| UL-94 judgement | V-2 | V-2 | V-2 | V-2 | V-2 | V-2 | V-2 | V-2 | V-2 | V-2 |
| MFR (g/10 min) | 16.0 | 16.0 | 16.1 | 15.9 | 16.2 | 16.5 | 16.1 | 16.4 | 16.0 | 16.0 |
| Izod impact strength (kgcm/cm) | 8.1 | 8.1 | 8.1 | 8.0 | 8.2 | 8.3 | 8.0 | 8.2 | 8.0 | 8.0 |
| Vicat softening temperature (° C.) | 93.8 | 93.8 | 92.8 | 92.2 | 91.9 | 91.2 | 92.1 | 91.8 | 92.9 | 92.3 |
| Water-resistant gloss retention (ΔC) (%) | 22 | 23 | 24 | 25 | 26 | 31 | 25 | 28 | 22 | 25 |
| Pencil hardness | B | B | 2B | 2B | 2B | 2B | 2B | 2B | B | 2B |
| Residual amount after 5 minutes of 250° C. storage (TCA method) (%) | 97 | 97 | 96 | 96 | 96 | 96 | 96 | 96 | 97 | 96 |

EXAMPLES 86 TO 103

HIPS set forth in Table 14 and an monomeric aromatic phosphate comprising NPDP, BNPP and TNPP in a weight proportion of 10/50/40, or HIPS-1, GPPS-1, and PPE set forth in Table 15, and the foregoing monomeric aromatic phosphate were mixed in a weight proportion set forth in Tables 14 and 15. The mixtures were each then examined and evaluated in the same manner as in Example 51. The results are set forth in Tables 14 and 15. The specimens thus obtained were each measured for the total content of the remaining styrene monomer and dimerization and trimerization products of styrene in accordance with the measuring method described above. As a result, the foregoing remaining monomers and oligomers were detected in an amount of from 1.1 to 1.5% by weight in all the specimens.

Tables 14 and 15 show that if $\eta SP/C$ of HIPS is from 0.4 to 0.6, the balance of melt flowability, impact strength and flame retardance is excellent and the presence of PPE further provides an improved balance between heat resistance and rigidity. In particular, when PPE is incorporated in a rubber-modified styrene resin in an amount of from 3 to 8 parts by weight to provide a reduced viscosity $\eta SP/C$ of from 0.3 to 0.6, the balance of melt flowability, heat resistance, rigidity, impact strength and flame retardance can be remarkably improved. Further, HIPS copolymerized with α-methylstyrene or butyl acrylate is excellent in dripping flame retardance.

TABLE 14

| Properties | Examples | | | | | | | |
|---|---|---|---|---|---|---|---|---|
| | 86 | 87 | 88# | 89# | 90# | 91 | 92 | 93 |
| Resin composition ηSP/C | | | | | | | | |
| HIPS-2 0.79 | 100 | | | | | | | |
| HIPS-3 0.60 | | 100 | | | | | | |
| HIPS-4 0.58 | | | 100 | | | | | |
| HIPS-1 0.53 | | | | 100 | | | | |
| HIPS-5 0.40 | | | | | 100 | | | |
| HIPS-6 0.35 | | | | | | 100 | | |
| MS-HIPS 0.53 | | | | | | | 100 | |
| BA-HIPS 0.53 | | | | | | | | 100 |
| Aromatic phosphate (NDPP/BNPP/TNPP = 10/50/40) | 6 | 6 | 6 | 6 | 6 | 6 | 6 | 6 |
| Evaluation of molded product | | | | | | | | |
| Flame retardance | | | | | | | | |
| Average flame-out time (sec.) | 19 | 17 | 12 | 9 | 8 | 7 | 6 | 6 |
| Dripping of flaming particles | Yes | Yes | Yes | Yes | Yes | Yes | Yes | Yes |
| UL-94 judgement | V-2 | V-2 | V-2 | V-2 | V-2 | V-2 | V-2 | V-2 |

TABLE 14-continued

| Properties | Examples | | | | | | | |
|---|---|---|---|---|---|---|---|---|
| | 86 | 87 | 88# | 89# | 90# | 91 | 92 | 93 |
| MRF (g/min) | 10 | 11 | 12 | 13 | 14 | 17 | 12 | 18 |
| Izod impact strength (kgcm/cm) | 14 | 12 | 11 | 10 | 9 | 6 | 9 | 11 |
| Vicat softening temperature (° C.) | 97 | 97 | 97 | 97 | 96 | 96 | 98 | 93 |

TABLE 15

| Properties | Examples | | | | | | | | | |
|---|---|---|---|---|---|---|---|---|---|---|
| | 94 | 95 | 96# | 97# | 98 | 99 | 100 | 101 | 102 | 103 |
| Resin composition | | | | | | | | | | |
| HIPS-1 | 65 | 65 | 65 | 65 | 65 | 65 | 65 | 65 | 65 | 65 |
| GPPS-1 | 35 | 35 | 35 | 35 | 35 | 35 | 35 | 35 | 35 | 35 |
| Polyphenylene ether | 0 | 1 | 7 | 9 | 13 | 15 | 7 | 7 | 7 | 7 |
| (part by weight) | | | | | | | | | | |
| Reduced viscosity (ηSP/C) | | 0.41 | 0.41 | 0.41 | 0.41 | 0.41 | 0.25 | 0.30 | 0.60 | 0.65 |
| Aromatic phosphate | 7 | 7 | 7 | 7 | 7 | 7 | 7 | 7 | 7 | 7 |
| (NDPP/BNPP/TNPP = 10/50/40) | | | | | | | | | | |
| Evaluation of molded product | | | | | | | | | | |
| Flame retardance | | | | | | | | | | |
| Average flame-out time (sec.) | 13 | 13 | 15 | 16 | 17 | 19 | 13 | 15 | 20 | 24 |
| Dripping of flaming particles | Yes | Yes | Yes | Yes | Yes | Yes | Yes | Yes | Yes | Yes |
| UL-94 judgement | V-2 | V-2 | V-2 | V-2 | V-2 | V-2 | V-2 | V-2 | V-2 | V-2 |
| MFR (g/10 min) | 16.5 | 15.1 | 8.3 | 8.1 | 4.6 | 4.2 | 15.0 | 12.3 | 7.9 | 5.0 |
| Izod impact strength (kgcm/cm) | 8.0 | 8.0 | 8.1 | 8.1 | 7.9 | 6.1 | 5.1 | 7.1 | 9.3 | 10.1 |
| Dart impact strength (kgcm) | 38.1 | 40.0 | 39.1 | 45.8 | 48.1 | 49.5 | 20.9 | 30.0 | 43.1 | 50.0 |
| Flexural strength (kg/cm$^2$) | 440 | 460 | 510 | 550 | 580 | 600 | 370 | 480 | 520 | 530 |
| Flexural modulus (kg/cm$^2$) | 25800 | 25900 | 26000 | 26300 | 26400 | 26500 | 24600 | 25500 | 26500 | 27000 |
| Vicat softening temperature (° C.) | 94 | 98 | 101 | 104 | 108 | 110 | 100 | 101 | 101 | 102 |
| Heat distortion temperature (° C.) | 74 | 78 | 81 | 82 | 84 | 85 | 80 | 81 | 81 | 82 |

EXAMPLES 104 TO 112

Compositions obtained by compounding HIPS-1, GPPS-1, PPE-1, a polydimethylsiloxane (silicone) set forth in Table 16, and BNPP in a weight proportion of 70/30/(0 or 7)/(amount set forth in Table 16) were each then examined and evaluated in the same manner as in Example 51. The results are set forth in Table 16. The specimens thus obtained were each measured for the total content of the remaining styrene monomer and dimerization and trimerization products of styrene in accordance with the measuring method described above. As a result, the foregoing remaining monomers and oligomers were detected in an amount of from 1.1 to 1.5% by weight in all the specimens.

Table 16 gives a presumption that the use of silicone reduces the heat shrinkage of molded product, resulting in a rise in the ease of melting and dripping upon ignition and hence an improvement in flame retardance. This fact suggests that the incorporation of silicone relaxes the orientation of the molded product.

TABLE 16

| Properties | Examples | | | | | | | | |
|---|---|---|---|---|---|---|---|---|---|
| | 104 | 105 | 106# | 107# | 108 | 109 | 110 | 111 | 112# |
| Resin composition | | | | | | | | | |
| HIPS-1 | 70 | 70 | 70 | 70 | 70 | 70 | 70 | 60 | 60 |
| GPPS-1 | 30 | 30 | 30 | 30 | 30 | 30 | 30 | 40 | 40 |
| PPE-1 | 0 | 0 | 0 | 0 | 0 | 0 | 0 | 7 | 7 |
| BNPP | 7 | 7 | 7 | 7 | 7 | 7 | 7 | 7 | 7 |
| Polydimethyl siloxane | 0 | 2 | 2 | 2 | 2 | 2 | 2 | 0 | 1 |
| (kinematic viscosity CS) | — | 20 | 50 | 100 | 1000 | 20000 | 25000 | — | 50 |
| % Volatility loss (150° C., 24 hr.) | — | 5 | ≦0.5 | ≦0.5 | ≦0.5 | ≦0.5 | ≦0.5 | — | ≦0.5 |
| Evaluation of molded product | | | | | | | | | |
| Flame retardance | | | | | | | | | |
| Average flame-out time (sec.) | 16.0 | 9.9 | 10.4 | 22.9 | 22.0 | 23.1 | 25.0 | 15.3 | 13.2 |
| Dripping of flaiming particles | Yes | Yes | Yes | Yes | Yes | Yes | Yes | Yes | Yes |
| UL-94 judgement | V-2 | V-2 | V-2 | V-2 | V-2 | V-2 | V-2 | V-2 | V-2 |
| % Heat shrinkage | 29 | 26 | 26 | 27 | 28 | 28 | 29 | 32 | 27 |

EXAMPLES 113 TO 118

Resin compositions comprising styrene resins and other thermoplastic resins having the formulations set forth in Table 17 were prepared and evaluated in the same manner as in Example 51. The results are set forth in Table 17.

TABLE 17

| Properties | Examples | | | | | |
|---|---|---|---|---|---|---|
| | 113 | 114 | 115 | 116 | 117 | 118 |
| Resin composition | | | | | | |
| HIPS-1 | 100 | 100 | 100 | | | 100 |
| ABS | | | | 100 | 100 | |
| PPE-1 | 100 | 100 | 50 | | | 500 |
| PC | | | | 100 | 500 | |
| BNPP | 20 | 20 | 25 | 20 | 10 | 10 |
| Oligomeric aromatic phosphate (fr-1) | | 10 | | | | |
| Evaluation of molded product | | | | | | |
| Flame retardance | | | | | | |
| Average flame-out time (sec.) | 5.0 | 2.1 | 4.5 | 4.8 | 2.1 | 1.9 |
| Dripping of flaming particles | None | None | None | None | None | None |
| UL-94 judgement | V-0 | V-0 | V-0 | V-0 | V-0 | V-0 |

EXAMPLES 119 TO 124 AND COMPARATIVE EXAMPLE 35

Compositions obtained by compounding PPE, UVA, HALS and TiO$_2$ with BNPP in a weight proportion set forth in Table 18 per 100 parts by weight of a styrene resin comprising HIPS-1 and GPPS-1 in a weight proportion of 60/40 were each processed in the same manner as in Example 51 to prepare specimens which were then evaluated in accordance with the light resistance testing method described above. For comparison, a flame retardant polystyrene flame-retarded by a halogen flame retardant (BEO) was evaluated. The results are set forth in Table 18.

Table 18 shows that the flame retardant polystyrene comprising the flame retardant of the present invention exhibits an excellent light resistance as compared with the halogen flame retardant polystyrene.

TABLE 18

| Example No. | Examples | | | | | | Comparative Example 35 |
|---|---|---|---|---|---|---|---|
| | 119 | 120 | 121 | 122 | 123 | 124 | |
| Resin composition | | | | | | | |
| HIPS-1 | 60 | 60 | 60 | 60 | 60 | 60 | 60 |
| GPPS-1 | 40 | 40 | 40 | 40 | 40 | 40 | 40 |
| PPE-1 | 0 | 0 | 7 | 7 | 10 | 10 | 0 |
| BNPP | 7 | 7 | 7 | 7 | 7 | 7 | 0 |
| BEO | 0 | 0 | 0 | 0 | 0 | 0 | 5 |
| SB$_2$O$_3$ | 0 | 0 | 0 | 0 | 0 | 0 | 1 |
| Ultraviolet light absorber (UVA) | 0 | 0.3 | 0 | 0.3 | 0 | 0.3 | 0.3 |
| Light stabilizer (HALS) | 0 | 0.1 | 0 | 0.1 | 0 | 0.1 | 0.1 |
| Sunproofing agent (TiO$_2$) | 1 | 1 | 1 | 1 | 1 | 1 | 1 |
| Light resistance [color difference ΔE (300 hr.)] | 5.3 | 0.6 | 6.6 | 2.8 | 7.2 | 2.7 | 10.5 |

EXAMPLES 125 TO 132 AND COMPARATIVE EXAMPLES 36 TO 43

Rubber-modified polystyrenes having different contents of remaining styrene monomers and oligomers were prepared by altering the polymerization temperature and amount of chain transfer agent to prepare polystyrenes having a large content of remaining styrene monomers and oligomers (dimerization and trimerization products of styrene), and then compounding these polystyrenes with HIPS obtained by the purification of HIPS-1. Compositions obtained by compounding 7 parts by weight of tris(nonylphenyl)phosphate (TNPP), tris(diisopropylphenyl) phosphate (TDIP), tris(phenylphenyl) phosphate (TPPP) or bis(nonylphenyl)phenylphosphate (BNPP) with 100 parts by weight of a styrene resin obtained by mixing the rubber-modified styrene resin and GPPS-1 in a proportion of 70/30 were each processed in the same manner as in Example 51 to prepare specimens which were then evaluated for flame retardance. The results are set forth in Table 19 and FIG. 9.

Figure 9:
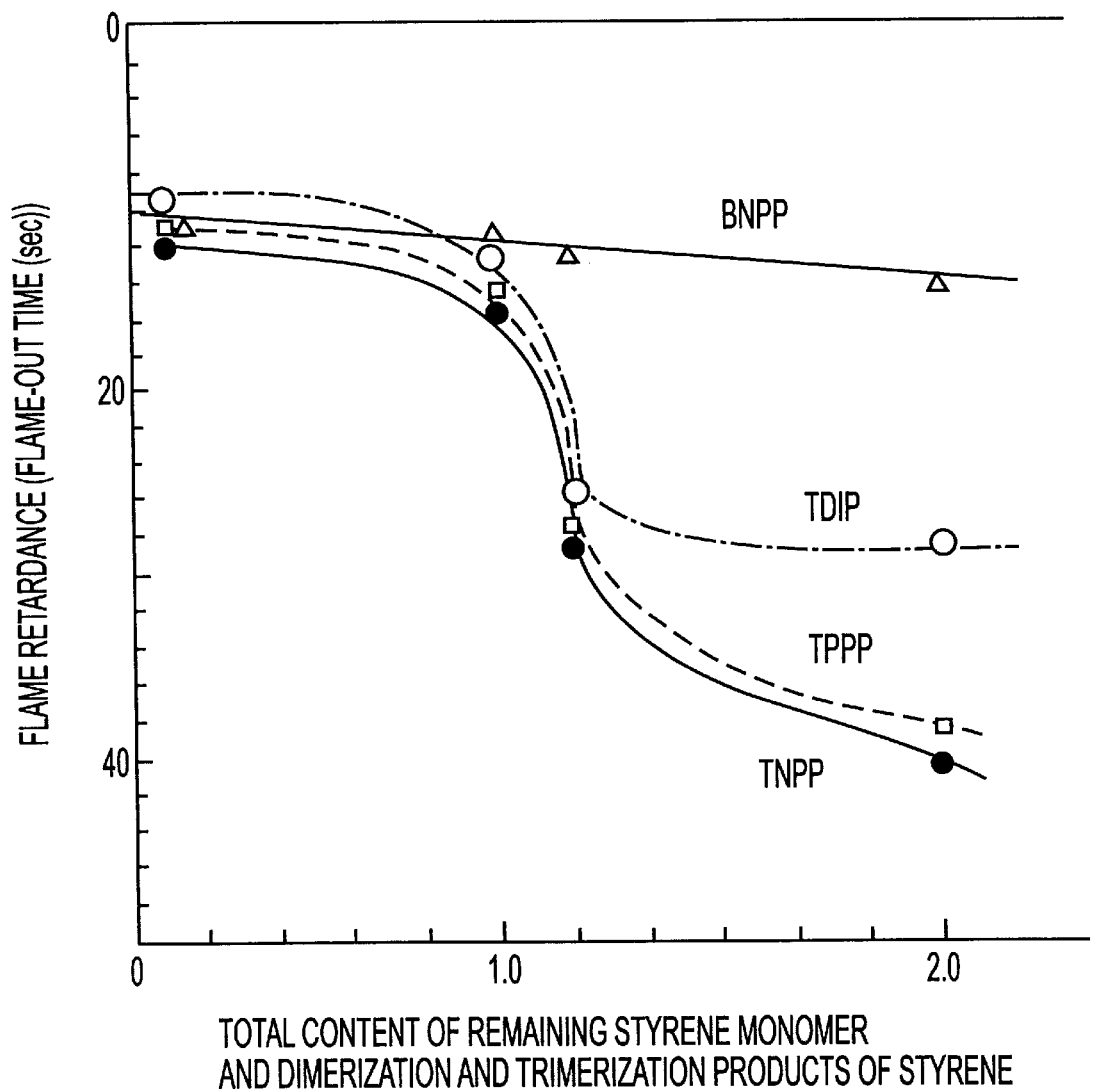
FIG. 9 illustrates the relationship between the total content of remaining styrene monomer and dimerization and trimerization products of styrene in the resin composition set forth in Table 19 and its flame retardance (flame-out time: second)

Table 19 and FIG. 9 show that flame retardants having a volatility loss of not less than 50% by weight at 400° C. such as BNPP exhibit an excellent flame retardance and thus do not show great a dependence of flame retardance on the content of remaining styrene monomers and oligomers. However, among the flame retardants, the aromatic phosphate having a low volatility at 400° C. has a great dependence of flame retardance on the remaining monomers and ologomers. Thus, when the content of the foregoing residue is not more than 1% by weight, the flame retardance of the resin composition can be drastically enhanced.

ated in the same manner as in Example 51. The results are set forth in Tables 20 to 22.

Tables 20 to 22 show that when the total content of remaining styrene monomer and dimerization and trimerization products of styrene in the molded product is not more than 1.0% by weight and ηSP/C of HIPS is from 0.4 to 0.6, the balance of melt flowability, impact strength and flame

TABLE 19

| | Ex. | Comp. Ex. | | Ex. | Comp. Ex. | | Ex. | Comp. Ex. | | Ex. | Comp. Ex. | |
|---|---|---|---|---|---|---|---|---|---|---|---|---|
| Properties | 125 | 126 | 36 | 37 | 127 | 128 | 38 | 39 | 129 | 130 | 40 | 41 | 131 | 132 | 42 | 43 |
| Resin composition | | | | | | | | | | | | | | | | |
| HIPS-1 | 70 | 70 | 70 | 70 | 70 | 70 | 70 | 70 | 70 | 70 | 70 | 70 | 70 | 70 | 70 | 70 |
| GPPS-1 | 30 | 30 | 30 | 30 | 30 | 30 | 30 | 30 | 30 | 30 | 30 | 30 | 30 | 30 | 30 | 30 |
| Monomeric aromatic phosphate Name | Tris(nonylphenyl) phosphate | | | | Tris(diisopropyl-phenyl) phosphate | | | | Tris(phenylphenyl) phosphate | | | | Bis(nonylphenyl) phenyl phosphate | | | |
| Total number of carbon atoms in substituents | 27 | 27 | 27 | 27 | 18 | 18 | 18 | 18 | 18 | 18 | 18 | 18 | 18 | 18 | 18 | 18 |
| Weight loss (400° C.) (TAG) | 23 | 23 | 23 | 23 | 33 | 33 | 33 | 33 | 25 | 25 | 25 | 25 | 65 | 65 | 65 | 65 |
| Added wt. parts | 7 | 7 | 7 | 7 | 7 | 7 | 7 | 7 | 7 | 7 | 7 | 7 | 7 | 7 | 7 | 7 |
| Content of Remaining styrene, oligomer (wt %) | 0.1 | 1.0 | 1.2 | 2.0 | 0.1 | 1.0 | 1.2 | 2.0 | 0.1 | 1.0 | 1.2 | 2.0 | 0.1 | 1.0 | 1.2 | 2.0 |
| Evaluation of molded product Flame retardance | | | | | | | | | | | | | | | | |
| Average flame-out time (sec.) | 12 | 16 | 29 | 41 | 10 | 13 | 26 | 29 | 11 | 15 | 28 | 39 | 11 | 12 | 13 | 15 |
| Dripping of flaiming particles | Yes | Yes | Yes | Yes | Yes | Yes | Yes | Yes | Yes | Yes | Yes | Yes | Yes | Yes | Yes | Yes |
| UL-94 judgement | V-2 | V-2 | HB* | HB* | V-2 | V-2 | HB* | HB* | V-2 | V-2 | HB* | HB* | V-2 | V-2 | V-2 | V-2 |

EXAMPLES 133 TO 161 AND COMPARATIVE EXAMPLES 44 TO 47

HIPS or PPE having different reduced viscosities ηSP/C set forth in Tables 20 to 22 and TNPP, TDIP or TPPP as a monomeric aromatic phosphate were mixed in a percent composition in such a manner that the total content of remaining styrene monomer and dimerization and trimerization products of styrene was 0.5% by weight. The compositions thus obtained were each then examined and evaluretardance is excellent. Further, the presence of PPE provides improvements in the balance of heat resistance and rigidity. In particular, when PPE having a reduced viscosity ηSP/C of from 0.3 to 0.6 is incorporated in a rubber-modified styrene resin in an amount of from 3 to 8 parts by weight, the balance of melt flowability, heat resistance, rigidity, imoact strength and flame retardance is further enhanced. When the content of TNPP, TDIP or TPPP is from 3 to 30 parts by weight, the foregoing properties are drastically enhanced.

TABLE 20

| | Examples | | | | | | | |
|---|---|---|---|---|---|---|---|---|
| Properties | 133 | 134 | 135# | 136# | 137# | 138 | 139# | 140# |
| Resin composition ηSP/C | | | | | | | | |
| HIPS-2 0.79 | 100 | | | | | | | |
| HIPS-3 0.60 | | 100 | | | | | | |
| HIPS-4 0.58 | | | 100 | | | | | |
| HIPS-1 0.53 | | | | 100 | | | 100 | 100 |
| HIPS-5 0.40 | | | | | 100 | | | |
| HIPS-6 0.35 | | | | | | 100 | | |
| TNPP | 6 | 6 | 6 | 6 | 6 | 6 | | |
| TDIP | | | | | | | 6 | |
| TPPP | | | | | | | | 6 |
| % Content of remaining styrene monomer, oligomer | 0.5 | 0.5 | 0.5 | 0.5 | 0.5 | 0.5 | 0.5 | 0.5 |
| Evaluation of molded product Flame retardance | | | | | | | | |
| Average flame-out time (sec.) | 22 | 20 | 18 | 16 | 9 | 8 | 14 | 16 |
| Dripping of flaming particles | Yes | Yes | Yes | Yes | Yes | Yes | Yes | Yes |
| UL-94 judgement | V-2 | V-2 | V-2 | V-2 | V-2 | V-2 | V-2 | V-2 |
| MFR (g/min) | 9 | 10 | 11 | 12 | 13 | 16 | 13 | 10 |

TABLE 20-continued

| Properties | Examples | | | | | | | |
|---|---|---|---|---|---|---|---|---|
| | 133 | 134 | 135# | 136# | 137# | 138 | 139# | 140# |
| Izod impact strength (kgcm/cm) | 13 | 11 | 10 | 9 | 8 | 5 | 8 | 8 |
| Vicat softening temperature (° C.) | 96 | 96 | 96 | 96 | 95 | 95 | 95 | 97 |

TABLE 21

| Properties | Examples | | | | | | | | | | | |
|---|---|---|---|---|---|---|---|---|---|---|---|---|
| | 141 | 142 | 143# | 144# | 145 | 146 | 147 | 148 | 149 | 150 | 151# | 152# |
| Resin composition | | | | | | | | | | | | |
| HIPS-1 | 65 | 65 | 65 | 65 | 65 | 65 | 65 | 65 | 65 | 65 | 65 | 65 |
| GPPS-1 | 35 | 35 | 35 | 35 | 35 | 35 | 35 | 35 | 35 | 35 | 35 | 35 |
| Polyphenylene ether (weight parts) | 0 | 1 | 7 | 9 | 13 | 15 | 7 | 7 | 7 | 7 | 7 | 7 |
| Reduced viscosity (ηP/C) | | 0.41 | 0.41 | 0.41 | 0.41 | 0.41 | 0.25 | 0.30 | 0.60 | 0.65 | 0.60 | 0.65 |
| TNPP | 7 | 7 | 7 | 7 | 7 | 7 | 7 | 7 | 7 | 7 | 0 | 0 |
| TDIP | 0 | 0 | 0 | 0 | 0 | 0 | 0 | 0 | 0 | 0 | 7 | 0 |
| TPPP | 0 | 0 | 0 | 0 | 0 | 0 | 0 | 0 | 0 | 0 | 0 | 7 |
| Content of remaining styrene, oligomer (wt %) | 0.5 | 0.5 | 0.5 | 0.5 | 0.5 | 0.5 | 0.5 | 0.5 | 0.5 | 0.5 | 0.5 | 0.5 |
| Evaluation of molded product | | | | | | | | | | | | |
| Flame retardance | | | | | | | | | | | | |
| Average flame-out time (sec.) | 14 | 14 | 15 | 17 | 18 | 20 | 14 | 16 | 21 | 25 | 14 | 16 |
| Dripping of flaiming particles | Yes | Yes | Yes | Yes | Yes | Yes | Yes | Yes | Yes | Yes | Yes | Yes |
| UL-94 judgement | V-2 | V-2 | V-2 | V-2 | V-2 | V-2 | V-2 | V-2 | V-2 | V-2 | V-2 | V-2 |
| MFR (g/10 min) | 14.6 | 13.0 | 7.1 | 6.0 | 5.0 | 4.2 | 13.1 | 10.1 | 5.8 | 4.0 | 8.1 | 5.1 |
| Izod impact strength (kgcm/cm) | 7.0 | 7.0 | 7.1 | 7.1 | 6.9 | 7.1 | 4.1 | 6.1 | 8.3 | 9.1 | 8.1 | 6.1 |
| Dart impact strength (kgcm) | 36.1 | 37.0 | 37.1 | 43.8 | 45.1 | 46.5 | 17.9 | 27.0 | 41.1 | 48.0 | 39.1 | 35.1 |
| Flexural strength (kg/cm²) | 420 | 440 | 490 | 530 | 560 | 580 | 350 | 460 | 500 | 510 | 470 | 510 |
| Flexural modulus (kg/cm²) | 25500 | 25600 | 25700 | 25900 | 26100 | 26200 | 24200 | 25200 | 26200 | 26700 | 25300 | 26000 |
| Vicat softening temperature (° C.) | 94 | 97 | 100 | 103 | 107 | 109 | 99 | 100 | 100 | 101 | 99 | 101 |
| Heat distortion temperature (° C.) | 74 | 77 | 80 | 81 | 83 | 84 | 79 | 80 | 80 | 81 | 79 | 81 |

TABLE 22

| Properties | Comp. Ex. | Examples | | | | | | | | | Comp. Ex. | | |
|---|---|---|---|---|---|---|---|---|---|---|---|---|---|
| | 44 | 153 | 154 | 155 | 156 | 157 | 158 | 159 | 160 | 161 | 45 | 46 | 47 |
| Resin composition | | | | | | | | | | | | | |
| HIPS-1 | 60 | 60 | 60 | 60 | 60 | 60 | 60 | 60 | 60 | 60 | 60 | 60 | 60 |
| GPPS-1 | 40 | 40 | 40 | 40 | 40 | 40 | 40 | 40 | 40 | 40 | 40 | 40 | 40 |
| PPE-1 | 7 | 7 | 7 | 7 | 7 | 7 | 7 | 7 | 7 | 7 | 7 | 7 | 7 |
| TNPP | 0 | 3 | 0 | 0 | 8 | 0 | 0 | 30 | 0 | 0 | 32 | 0 | 0 |
| TDIP | 0 | 0 | 3 | 0 | 0 | 8 | 0 | 0 | 30 | 0 | 0 | 32 | 0 |
| TPPP | 0 | 0 | 0 | 3 | 0 | 0 | 8 | 0 | 0 | 30 | 0 | 0 | 32 |
| Wt % Content of remaining styrene monomer, oligomer | 0.5 | 0.5 | 0.5 | 0.5 | 0.5 | 0.5 | 0.5 | 0.5 | 0.5 | 0.5 | 0.5 | 0.5 | 0.5 |
| Evaluation of molded product | | | | | | | | | | | | | |
| Flame retardance | | | | | | | | | | | | | |
| Average flame-out time (sec.) | 60 | 25 | 24 | 21 | 16 | 14 | 15 | 9 | 8 | 7 | 8 | 7 | 7 |
| Dripping of flaiming particles | Yes | Yes | Yes | Yes | Yes | Yes | Yes | Yes | Yes | Yes | Yes | Yes | Yes |
| UL-94 judgement | HB* | V-2 | V-2 | V-2 | V-2 | V-2 | V-2 | V-2 | V-2 | V-2 | V-2 | V-2 | V-2 |
| MFR (g/10 min) | 3 | 6 | 6 | 4 | 7 | 8 | 5 | 15 | 17 | 11 | 18 | 19 | 11 |
| Izod impact strength (kgcm/cm) | 9 | 8 | 9 | 7 | 7 | 8 | 6 | 6 | 7 | 6 | 5 | 5 | 5 |
| Vicat softening temperature (° C.) | 103 | 101 | 100 | 102 | 99 | 98 | 100 | 94 | 93 | 95 | 86 | 85 | 87 |

EXAMPLE 162 AND COMPARATIVE EXAMPLES 48 TO 53

Resin compositions comprising HIPS-1, GPPS, PPE-1 and BNPP in a weight proportion of 60/40/7/7 were prepared. In detail, the mixture was melt-kneaded at 295 rpm and an output rate of 80 kg/hr by means of a side-feedable twin-screw extruder (ZSK-40 mmϕ, available from Werner Pfleiderer Corp.) under the conditions set forth in Table 23 to prepare various resin compositions.

The resin compositions thus obtained were each then processed through an injection molding machine (resin temperature: 230° C.) to prepare specimens which were then evaluated for flame retardance and external appearance. The results are set forth in Table 23.

it was melted at a barrel temperature of 320° C. Subsequently, BNPP was fed through side feeders in the stage succeeding the extruder (below the side feed opening) where it was melt-kneaded with the foregoing mixture at a barrel temperature of 270° C. (Number of revolutions: 295 rpm; output: 80 kg/hr)

MB-1: PPE-1/BNPP=65/35
MB-2: PPE-1/GPPS-1/BNPP=40/40/20

Final compositions comprising HIPS-1, GPPS-1, PPE-1 and BNPP in a proportion of 60/40/7/7 were prepared in the following manners (feed process I, II or III):

I (MB-1 was used): HIPS-1/GPPS-1/NB-1/BN?P

MB-1 and the remaining components other than BNPP were fed through the main feeder in the stage exceeding the extruder where they were melted at a barrel temperature of

TABLE 23

| Example No. | Method of adding resin component and polymer additive | Extruder cylinder temperature (° C.) Pre-stage | Extruder cylinder temperature (° C.) Post-stage | % Polyethylene content in pre-stage resin | Flame retardance UL-94 | Tensile elongation (%) | Extrusion condition | External appearance |
|---|---|---|---|---|---|---|---|---|
| Comparative Example 48 | Simultaneous addition | 300 | | — | V-2 | 8 | Unmolten matter in polymer strand | Unmolten matter |
| Example 162 | Separative addition (resin component and polymer additive separated) | 320 | 220 | 55 | V-2 | 25 | Good | No unmolten matter |
| Comparative Example 49 | Separative addition (resin component and polymer additive separated) | 320 | 180 | 55 | HB* | 25 | Organic phosphorus blown out from die | No unmolten matter |
| Comparative Example 50 | Separative addition (resin component and polymer additive separated) | 240 | 240 | 55 | V-2 | 6 | Unmolten matter in polymer strand | Unmolten matter |
| Comparative Example 51 | Separative addition (resin component and polymer additive separated) | 320 | 320 | 55 | HB* | 3 | Good | No unmolten matter |
| Comparative Example 52 | Separative addition (resin component and polymer additive separated) | 320 | 220 | 40 | V-2 | 7 | Unmolten matter in polymer strand | Unmolten matter |
| Comparative Example 53 | Separative addition (resin component and polymer additive separated) | 370 | 220 | 55 | V-2 | 3 | Good | No unmolten matter |

The following facts can be seen in Table 23.

If the mixture is melt-kneaded without separating the resin component from the polymer additive, unmolten polyphenylene ether is produced, causing a remarkable drop in external appearance and particularly in tensile elongation.

Further, if the polyphenylene ether content of the resin component to be fed in the stage preceding the extruder falls below 50% by weight, no shearing force can be applied, causing the production of unmolten matters.

EXAMPLES 163 TO 170 AND COMPARATIVE EXAMPLES 54 TO 57

Figure 10:
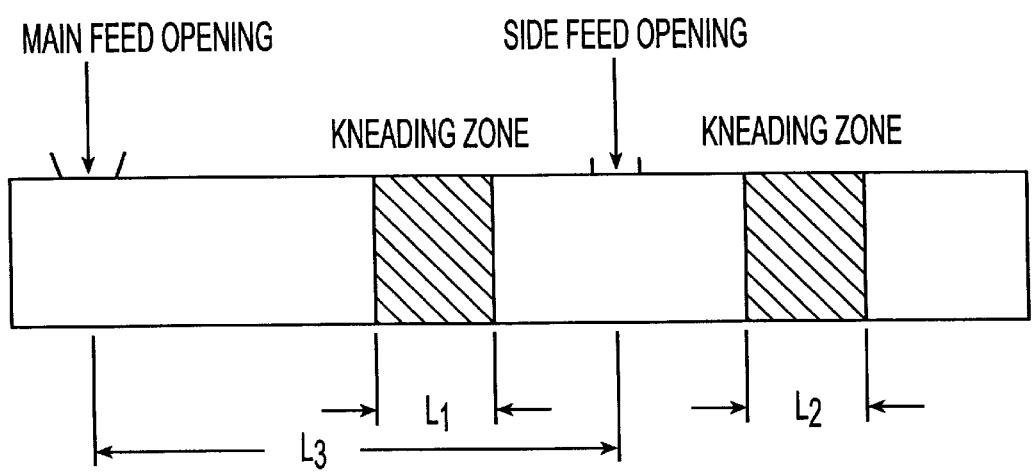
FIG. 10 illustrates a typical example of twin-screw extruder, wherein the shade shows a kneading zone.

The following resin compositions were each mechanically mixed, and then melt-kneaded through a side-feedable twin-screw extruder (ZSK, available from Werner Pfleiderer Corp.; cylinder inner diameter D=40 mm or 70 mm) (see FIG. 10).

For the preparation of master batches (MB-1, MB-2), the resin component was fed through a main feeder in the stage preceding the extruder (above the side feed opening) where 270° C. Subsequently, BNPP was fed through the side feeders in the stage succeeding the extruder where it was melt-kneaded with the foregoing mixture at a barrel temperature of 270° C. (Number of revolutions: 295 rpm; output: 80 kg/hr)

II (NB-2 was used): HIPS-1/GPPS-1/MB-2

All the components were fed through the main feeder, and then melt-kneaded at a barrel temperature of 270° C. (Number of revolutions: 295 rpm; output: 80 kg/hr)

III (no master batches were used): HIPS-1/GPPS-1/PPE-1/BNPP

PPE-1 and GPPS-1 were extruded in a weight proportion of 7/5 in the stage preceding the extruder under the same conditions as the foregoing master batches. Subsequently, in the stage succeeding The extruder the remaining resin com ponents and components other than BNPP were fed through one side feeder while BNPP was fed through another side feeder so that they were extruded under the same conditions as the foregoing composition.

The pellets thus obtained were then processed at a cylinder temperature of 230° C. and a mold temperature of 60° C. by means of the same injection molding machine as described in Example 51 to prepare specimens which were then evaluated for various physical properties. The results are set forth in Table 24.

TABLE 24

| | | Extruder size (apparatus constant) | | | | | |
|---|---|---|---|---|---|---|---|
| Example No. | L/D | Length $L_1$ of kneading zone between main feed and side feed openings | Length $L_2$ of kneading zone between tip and side feed opening | Total Length $L_1 + L_2$ of kneading zone of extruder | Length $L_3$ of space between main feed and side feed openings | Feed process | Extrusion condition |
| Example 163 | 46 | 8.9D | 3.6D | 12.5D | 32.9D | I | Good |
| Example 164 | 46 | 8.9D | 3.6D | 12.5D | 32.9D | II | Good |
| Example 165 | 38 | 6.6D | 4.9D | 11.5D | 22.4D | I | Good |
| Comparative Example 54 | 38 | 0 | 11.5D | 11.5D | 22.4D | I | Unmolten matter of PPE, bentup |
| Comparative Example 55 | 38 | 11.5D | 0 | 11.5D | 22.4D | I | Bentup |
| Comparative Example 56 | 38 | D | 10.5D | 11.5D | 22.4D | I | Unmolten matter of PPE |
| Comparative | 38 | 10.5D | D | 11.5D | 22.4D | I | Bentup |
| Example 166 | 46 | 6.6D | 4.9D | 11.5D | 32.9D | I | Good |
| Example 167 | 46 | 8.9D | 3.6D | 12.5D | 32.9D | I | Good |
| Example 168 | 30 | 4.4D | 6.4D | 10.8D | 12.4D | I | Good |
| Example 169 | 46 | 8.9D | 3.6D | 12.5D | 32.9D | II | Good |
| Example 170 | 46 | 8.9D | 3.6D | 12.5D | 32.9D | III | Good |

EXAMPLES 171 TO 176 AND COMPARATIVE EXAMPLES 58 TO 65

For the preparation of resin compositions comprising HIPS-1, GPPS-1, PPE-1 and BNPP in a proportion of 60/40/7/7, the master batches set forth in Table 25 were each melt-kneaded through a side-feedable twin-screw extruder, subsequently followed by melt kneading in the following feed processes (A, B and C processes).

In the first stage extrusion (preparation of master batch), the resin components were fed through the main feeder, and then melted at a barrel temperature of 320° C. Subsequently, BNPP was fed through the side feeders, and then melt-kneaded with the foregoing resin components at a barrel temperature of 270° C. Subsequently, in the second stage extrusion, the material was melt-kneaded at a barrel temperature of 270° C. in the feed processes A, B and C. (See Table 26) The extrusion conditions in these feed processes-retardance is excellent. Further, the presence of PPE provides improvements in the balance of heat resistance and-comprise 295 rpm and output of 80 kg/hr. at both the first and second stages.

TABLE 25

| | | Master batch formulation | | | |
|---|---|---|---|---|---|
| | Glass transition | | Resin | | Phosphate |
| No. | temperature (° C.) | PPE-1 | HIPS-1 | GPPS-1 | BNPP |
| MB-3 | 65 | | 60 | | 40 |
| MB-4 | 80 | | 65 | | 35 |
| MB-5 | 94 | 41 | 30 | 10 | 19 |
| MB-6 | 104 | 67 | 8 | 8 | 17 |
| MB-7 | 172 | 70 | | 30 | |
| PPE-1 | 226 | 100 | | | |

The pellets thus obtained were each processed at a cylinder temperature of 230° C. and a mold temperature of 60° C. by means of the same injection molding machine as described in Example 45 to prepare specimens which were then evaluated for various physical properties. The results are set forth in Table 26 and FIG. 12.

TABLE 26

| Example | No. | 1st stage extrusion Master batch Glass transition temp. (° C.) | 2nd stage extrusion Feed process | Cylinder dia. D (mm) | Extruder output Q (kg/h) | Number of revolutions N (rpm) | Kneadability* (×10⁻⁷) | Dart impact strength (kgcm) | External appearance | Extrusion stability |
|---|---|---|---|---|---|---|---|---|---|---|
| Example 171 | MB-3 | 94 | A | 37 | 51 | 500 | 6.41 | 39 | Good | Good |
| Example 172 | MB-3 | 94 | A | 73 | 227 | 270 | 6.88 | 40 | Good | Good |
| Example 173 | MB-3 | 94 | A | 40 | 80 | 295 | 13.49 | 38 | Good | Good |
| Example 174 | MB-3 | 94 | A | 40 | 60 | 295 | 10.12 | 39 | Good | Good |
| Example 175 | MB-2 | 80 | A | 40 | 80 | 295 | 13.49 | 35 | Good | Good |
| Comparative Example 58 | MB-4 | 104 | A | 40 | 80 | 295 | 13.49 | 18 | Unmolten matter | Good |
| Comparative Example 59 | MB-4 | 104 | A | 40 | 60 | 295 | 10.12 | 21 | Good | Good |
| Comparative Example 60 | MB-4 | 104 | A | 73 | 216 | 220 | 8.03 | 25 | Good | Good |
| Comparative Example 61 | MB-5 | 172 | A | 40 | 80 | 295 | 13.49 | 5 | Unmolten matter | Good |
| Comparative Example 62 | MB-1 | 65 | A | 40 | 80 | 295 | 13.49 | Hopper blocked by resin | | |
| Example 176 | MB-3 | 94 | B | 40 | 80 | 295 | 13.49 | 28 | Good | Good |
| Comparative Example 63 | MB-4 | 104 | B | 40 | 80 | 295 | 13.49 | 28 | Good | Good |
| Comparative Example 64 | — | — | C | 40 | 80 | 295 | 13.49 | 17 | Unmolten matter | Instable |
| Comparative Example 65 | — | — | A | 40 | 80 | 295 | 13.49 | 5 | Unmolten matter | Instable |

Figure 11:
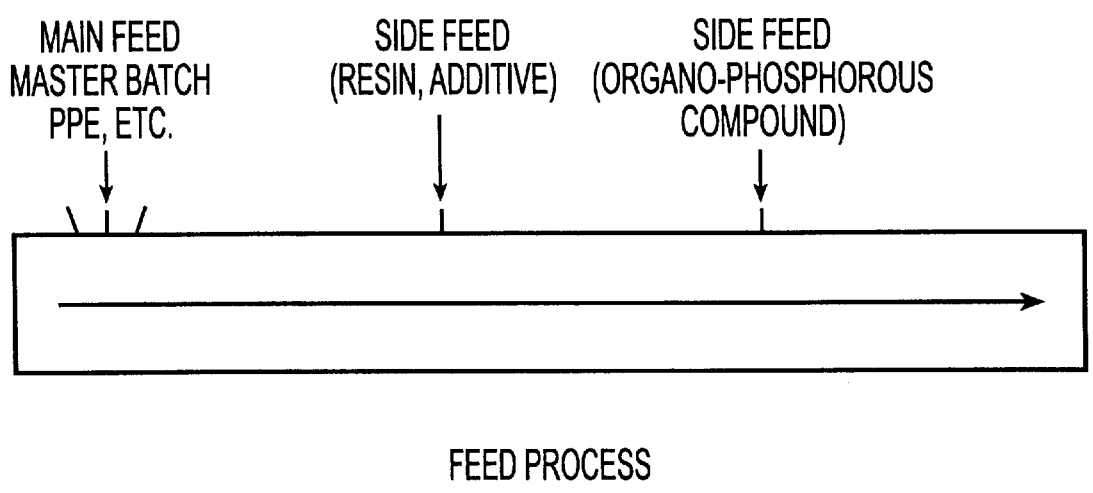
FIG. 11 illustrates feed processes for the various components of the resin composition.

*Kneadability parameter = Extrusion factor/circumferential speed of screw = $(Q/D^2)/\pi ND$ Feed process (See FIG. 11)
Process A: Main feed (components other than BNPP)
  Side feed (BNPP)
Process B: Main feed (master batch)
  Side feed (BNPP)
  Side feed (master batch, components other than BNPP)
Process C: Main feed (PPE/GPPS)
  Side feed (BNPP)
  Side feed (PPE/components other than GPPS and BNPP)

Figure 12:
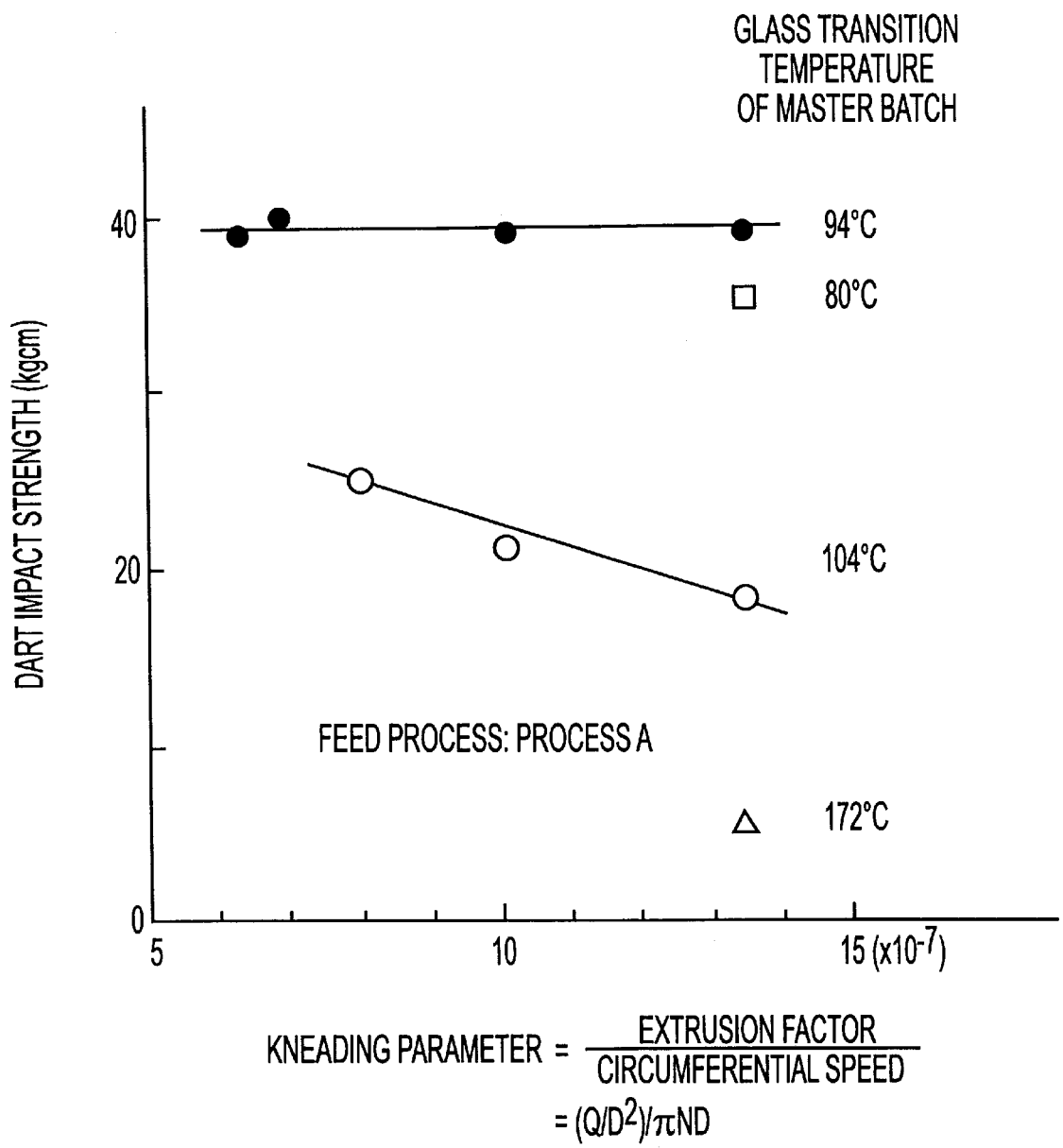
FIG. 12 illustrates the relationship between the kneadability parameter as an index of kneadability and the dart impact strength of examples and comparative examples set forth in Table 26, wherein the ordinate indicates the dart impact strength (kgcm) and the abscissa indicates the kneadability parameter (extrusion factor/circumferential speed)

Table 26 and FIG. 12 show that when the master batch having a glass transition temperature (Tg) of from 70° C. to 100° C. obtained by compounding a polyphenylene ether, a monomeric aromatic phosphate (BNPP), and optionally a rubber-modified styrene resin or rubber-unmodified styrene resin is melt-kneaded with the remaining components, a flame retardant resin composition having an excellent dart impact strength can be obtained. It can also be seen that if the glass transition temperature of the master batch exceeds 100° C., the resulting resin composition shows a great dependence of dart impact strength on the kneadability parameter.

The incorporation of the low volatility flame retardant for styrene resin of the present invention in a styrene resin composition can provide a resin composition which causes remarkably little mold deposit even after a prolonged continuous molding and exhibits excellent flame retardance, impact resistance, heat resistance, melt flowability, water-resistance gloss retention, and surface hardness of molded product.

The resin composition comprising the low volatility flame retardant for styrene resin is suitable for housing, shassis or parts of household appliance such as VTR, panel baord, T-V, audio player, capacitor, power outlet, radio-tape player/recorder, video tape housing, video disk player, air conditioner, air moistener and electric heater; housing, shassis or parts of OA (office automation) apparatus such as main frame (mechanical shassis) of CDROM, printer, facsimile, PPC, CRT, word processor, copying machine, electronic cash register, office computer system, floppy disk drive, keyboard, typewriter, ECT, calculator, toner cartridge and telephone; electric and electronic parts such as connector, coil bobbin, switch, relay, relay socket, LED, variable condenser, AC adaptor, FBT high-voltage bobbin, FET case, IFT coil bobbin, jack, volume shaft and motor part; automoble parts such as instrument panel, radiator grill, cluster, speaker grill, louver, console box, defroster garnish, ornament, fuse box, relay case and connector shift tape; and other various usage.

We claim:

1. A low volatility flame retardant for a styrene resin comprising an aromatic phosphate represented by formula (I):

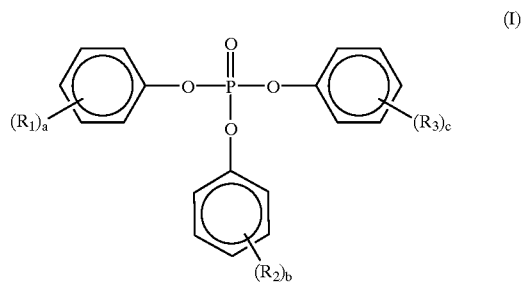

wherein a, b, and c each independently represent an integer of from 1 to 3; and $R_1$, $R_2$, and $R_3$ each independently represent a hydrogen atom or a halogen-free alkyl group having from 1 to 30 carbon atoms, which is not an isopropyl group, the total number of carbon atoms in the substituents represented by $R_1$, $R_2$ and $R_3$ being from 12 to 25 on an average in one molecule of said aromatic phosphate, provided that when said flame retardant comprises a plurality of aromatic phosphates having different substituents, the total number of carbon atoms in the substituents R₁, R₂ and R₃ of said flame retardant is represented by a number average in the whole of said flame retardant, which is the sum of the products of the weight fraction of respective aromatic phosphate and the total number of carbon atoms in the substituents in respective aromatic phosphate, and wherein the flame retardant further comprises at least one metal selected from the group consisting of aluminum, magnesium, sodium and antimony, and the total content of the metal in said flame retardant is from about 1.4 to 1,000 ppm by weight.

2. A flame retardant as claimed in 1, wherein the total number of carbon atoms in the substituents R₁, R₂ and R₃ is from 14 to 22.

3. A flame retardant as claimed in 1, said flame retardant further comprises a hindered phenol anitoxidant in an amount of from 1 to 1,000 ppm by weight.

4. A flame retardant as claimed in claim 1, said flame retardant is a dripping flame retardant.

5. A resin composition comprising 100 parts by weight of a styrene resin and from 1 to 50 parts by weight of said flame retardant as claimed in claim 1.

6. A resin composition as claimed in claim 5, wherein said resin composition comprises 100 parts by weight of a styrene resin and from 1 to 20 parts by weight of said flame retardant.

7. A resin composition as claimed in claim 6, wherein said resin composition comprises 100 parts by weight of a styrene resin and from 3 to 8 parts by weight of said flame retardant.

8. A resin composition as claimed in claim 5, wherein said resin composition further comprises a polyphenylene ether and/or an aromatic polycarbonate in an amount of from 1 to 500 Darts by weight per 100 parts by weight of said styrene resin.

9. A resin composition as claimed in any one of claims 5 to 7, wherein said resin composition further comprises a polyphenylene ether in an amount of from 1 to 40 parts by weight Per 100 parts by weight of said styrene resin.

10. A resin composition as claimed in claim 9, wherein the amount of said polyphenylene ether is from 3 to 8 parts by weight per 100 parts by weight of said styrene resin.

11. A resin composition as claimed in claim 5, said resin composition further comprises a polyorganosiloxane in an amount of from 0.01 to 10 parts by weight per 100 parts by weight of said styrene resin.

12. A resin composition as claimed in claim 11, wherein said polyorganosiloxane is a polydimethylsiloxane.

13. A resin composition as claimed in claim 5, wherein the reduced viscosity ηSP/C of said styrene resin is from 0.4 to 0.6 dl/g.

14. A resin composition as claimed in claim 8, said resin composition further comprises a polyphenylene ether having a reduced viscosity ηSP/C of from 0.3 to 0.6 dl/g.

15. A resin composition as claimed in claim 5, wherein said styrene resin is a rubber-modified styrene resin comprising a small size particulate rubber having a weight-average particle diameter of from 0.1 to 0.9 μm and a large size particulate rubber having a weight-average particle diameter of from 1.0 to 3.0 μm.

16. A flame retardant resin composition comprising 100 parts by weight of a styrene resin and from 3 to 30 parts by weight of a flame retardant comprising an aromatic phosphate represented by formula (I):

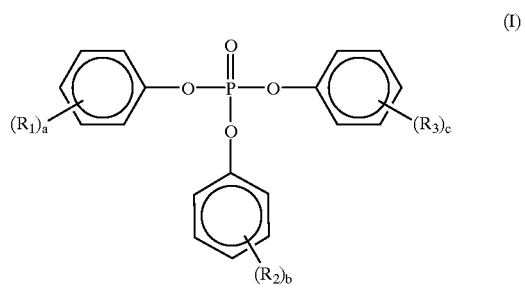

wherein a, b, and c each independently represent an integer of from 1 to 3; and at least one of by R₁, R₂ and R₃ represent an aryl group, the others of R₁, R₂, R₃ each independently represent a hydrogen atom or a halogen-free alkyl group having from 1 to 30 carbon atoms, which is not an isopropyl group, the total number of carbon atoms in the substituents represented by R₁, R₂ and R₃ being from 12 to 25 on an average in one molecule of said aromatic phosphate, provided that said flame retardant comprises a plurality of aromatic phosphates having different substituents, the total number of carbon atoms in the substituents R₁, R₂ and R₃ of said flame retardant is represented by a number average in the whole of said flame retardant, which is the sum of the products of the weight fraction of respective aromatic phosphate and the total number of carbon atoms in the substituents in respective aromatic phosphate, wherein the total content of aromatic vinyl monomers and dimerization and trimerization products of aromatic vinyl monomers remaining in said resin composition is not more than 1% by weight.

17. A flame retardant resin composition as claimed in claim 16, wherein said resin composition further comprises a polyphenylene ether in an amount of from 1 to 10 parts by weight per 100 pares by weight of said styrene resin.

18. A flame retardant resin composition as claimed in claim 17, wherein said styrene resin has a reduced viscosity ηSP/C of from 0.4 to 0.6 and said polyphenylene ether has a reduced viscosity ηSP/C of from 0.3 to 0.6.

19. A flame retardant resin composition as claimed in any one of claims 16 to 18, wherein said aryl group represented by R₁, R₂ and R₃ is selected from the group consisting of a phenyl group, a benzyl group, and a cumyl group.

20. A flame retardant resin composition as claimed in either of claims 5 to 19, wherein said flame retardant resin composition is a dripping flame retardant resin composition.

21. A process for producing a resin composition as claimed in either of claims 8 or 17, said process comprising the steps of:

dividing a styrene resin into two batches;
preparing a first resin composition comprising one of said two batches of said styrene resin and a polyphenylene ether in an amount of not less than 50% by weight based on the amount of said first resin composition;
melting said first resin composition at a temperature of from 250° C. to 350° C. in a former stage of a twin-screw extruder; and
melt-extruding said first resin composition with a second resin composition comprising the other of said two batches of said styrene resin and said flame retardant as claims 17 to 19 at a temperature of from 200° C. to 300° C. in a latter stage of said twin-screw extruder.

22. A process as claimed in claim 21, wherein said twin-screw extruder has an L/D ratio of from 20 to 50, in which D represents an inner diameter of cylinder and L represents a length of screw, and a plurality of feed openings including a main feed opening and a side feed openings each disposed at different distances from a tip of said twin-screw extruder; and kneading zones are provided between said plurality of feed openings and between said tip of the twin-screw extruder and the feed opening nearest to said tip of the twin-screw extruder, said kneading zones each having a length of from 3 D to 10 D.

23. A process for producing a resin composition as claimed in any one of claims 8 or 17, said process comprising the steps of:

preparing a master batch comprising a resin composition comprising a polyphenylene ether and a flame retardant as claimed in any one of claims 1 to 4 or as used in any one of claims 17 to 19, or preparing a master batch comprising said resin composition and a styrene resin and/or a rubber-modified styrene resin, adding to said master batch the remainder of the components of asid resin composition as claimed in any one of claims 8 to 15 and 17 to 20 to form a mixture, and melt-kneading said mixture, said master batch having a glass transition temperature (Tg) of from 70° C. to 100° C.

24. A flame retardant resin composition comprising 100 parts by weight of a styrene resin and from 3 to 30 parts by weight of tris(nonylphenyl) phosphate flame retardant wherein the total content of aromatic vinyl monomers and dimerization and trimerization products of aromatic vinyl monomers remaining in said resin composition is not more than 1% by weight.

* * * * *